(12) United States Patent
Wan et al.

(10) Patent No.: US 11,125,468 B2
(45) Date of Patent: Sep. 21, 2021

(54) WATER HEATER SYSTEM AND CONTROL METHOD THEREFOR

(71) Applicant: A.O. SMITH (CHINA) WATER HEATER CO., LTD., Jiangsu Province (CN)

(72) Inventors: Huaxin Wan, Nanjing (CN); Hua Wang, Nanjing (CN); Tao Du, Nanjing (CN); Zhenhu Yao, Nanjing (CN); Mingming Chen, Nanjing (CN)

(73) Assignee: A. O. SMITH CORPORATION, Milwaukee, WI (US)

( * ) Notice: Subject to any disclaimer, the term of this patent is extended or adjusted under 35 U.S.C. 154(b) by 389 days.

(21) Appl. No.: 16/279,807

(22) Filed: Feb. 19, 2019

(65) Prior Publication Data

US 2019/0186787 A1    Jun. 20, 2019

Related U.S. Application Data

(63) Continuation of application No. PCT/CN2017/092898, filed on Jul. 14, 2017.

(30) Foreign Application Priority Data

Jul. 14, 2016    (CN) .......................... 201610555194.0
Jul. 14, 2016    (CN) .......................... 201620741638.5
(Continued)

(51) Int. Cl.
*F24H 9/20*    (2006.01)
*F24H 1/20*    (2006.01)
*F24H 9/00*    (2006.01)

(52) U.S. Cl.
CPC ............. *F24H 9/2007* (2013.01); *F24H 1/20* (2013.01); *F24H 9/0015* (2013.01)

(58) Field of Classification Search
CPC .................................................. F24H 9/2007
See application file for complete search history.

(56) References Cited

U.S. PATENT DOCUMENTS 4,911,107 A * 3/1990 Crispin ................. F22D 11/003
                                                                122/1 R
9,284,652 B2 * 3/2016 Aggelopoulos ......... C25B 15/08
(Continued)

FOREIGN PATENT DOCUMENTS

CN        201268615 Y      7/2009
CN        104058492 A      9/2014
(Continued)

OTHER PUBLICATIONS

International Search Report and Written Opinion for Application No. PCT/CN2017/092898 dated Oct. 12, 2017 (13 pages, English translation included).

(Continued)

*Primary Examiner* — Nathaniel Herzfeld
(74) *Attorney, Agent, or Firm* — Michael Best & Freidrich LLP

(57) ABSTRACT

The invention discloses a water heater system and a control method thereof. The water heater system comprises a heating unit capable of heating water; a tank capable of communicating with the heating unit, the tank provided with at least one inlet and outlet, the inlet being capable of supplying at least one of gas and water into the tank; a pressurizing source capable of pressurizing the tank, the pressurizing source being capable of providing a pressure at which the gas and water in the tank are mixed. The invention provides a water heater system which can be applied to any existing water heater, including an electric water heater, a gas water heater, a solar water heater, an air energy water heater, and the like, which is capable of generating microbubble water for use by a user, the microbubble water has strong cleaning performance, thereby greatly improving the user experience.

4 Claims, 42 Drawing Sheets

(30) Foreign Application Priority Data

Jan. 26, 2017 (CN) .......................... 201710057567.6
Mar. 31, 2017 (CN) .......................... 201710205529.0

(56) References Cited

U.S. PATENT DOCUMENTS

| | | | | |
|---|---|---|---|---|
| 2009/0269240 A1* | 10/2009 | Tanaka | .................... | C01B 13/11 |
| | | | | 422/24 |
| 2010/0193977 A1* | 8/2010 | Yamamoto | .......... | B01F 3/04503 |
| | | | | 261/151 |
| 2011/0239959 A1* | 10/2011 | Chuang | .................. | F24V 40/10 |
| | | | | 122/26 |
| 2012/0297530 A1 | 11/2012 | Huang | | |

FOREIGN PATENT DOCUMENTS

| | | |
|---|---|---|
| CN | 204599682 U | 9/2015 |
| CN | 105258264 A | 1/2016 |
| JP | 2017127345 A | 7/2017 |

OTHER PUBLICATIONS

Indian Patent Office Examination Report for Application No. 201917005688 dated Feb. 1, 2021 (6 pages).

\* cited by examiner

WATER HEATER SYSTEM AND CONTROL METHOD THEREFOR

CROSS-REFERENCE

This application claims priority of Chinese Patent application No. 201610555194.0 filed on Jul. 14, 2016, which is entitled "Water Heater System", the Chinese patent application No. 201620741638.5 filed on Jul. 14, 2016, which is entitled "Water Heater System", the Chinese patent application No. 201710057567.6 filed on Jan. 26, 2017, which is entitled "Water Heater System," and the Chinese patent application No. 201710205529.0 filed on Mar. 31, 2017, which is entitled "Water Heater System and Its Control Method", the entire content of which is incorporated by reference in this application.

TECHNICAL FIELD

The invention relates to the field of water heaters, in particular to a water heater system and a control method thereof.

BACKGROUND OF THE INVENTION

At present, the domestic water heater products mainly include electric water heaters, gas water heaters, solar water heaters and air energy water heaters. Among them, the field of water heater is mainly dominated by traditional electric water heaters and gas water heaters.

With the improvement of people's living standard, people's demand for water heater is getting higher and higher. In addition to that basic requirement of safety and reliability, the user also put forward further requirements such as water-saving, environmental protection, comfort and health, etc.

Therefore, it is necessary to improve the current water heater to better meet the user's requirements and improve the user's experience.

SUMMARY OF THE INVENTION

An object of the present invention is to provide a water heater system and a control method thereof, which can generate microbubble water for use by users, not only can save water and environmental protection, but also has strong cleaning performance, which greatly improves the user's experience.

The above object of the present invention can be achieved by adopting the following technical solutions:
a water heater system, comprising:
a heating unit for heating water;
a tank which is in communication with the heating unit, the tank being provided with at least one inlet and outlet, wherein at least one of gas and water enters the tank through the inlet;
a pressurizing source for pressurizing the tank, the pressurizing source providing a pressure at which the gas and water in the tank are mixed.

A water heater system, comprising:
a heating unit for heating water;
a tank being in communication with the heating unit;
an importing mechanism being in communication with the tank, for importing the water flowed therein into a region of the tank where gas is stored, and having the imported water and the gas mixed in the tank;
a pressurizing source for pressurizing the tank, the pressurizing source providing a pressure at which the gas and water in the tank are mixed.

A method for controlling a water heater system, comprising the steps of:
controlling a gas supply unit to be in communication with a tank to input gas from the gas supply unit into the tank, and simultaneously discharging the water in the tank;
when the discharged water or the supplied gas reaches a predetermined amount, controlling the importing mechanism to be in communication with a water supply pipe, and the importing mechanism importing the water flowed therein into a region of the tank where gas is stored and gas-liquid mixed with the gas in the tank, while a pressurizing source applying a predetermined pressure to the gas and water in the tank for gas-liquid mixing.

A water heater system, comprising:
an inner container for storing a predetermined amount of gas and water;
a tank being coupled to the inner container and storing a predetermined amount of gas and water, wherein the inner container and the tank are in communication with each other to form a gas storage mechanism;
a pressurizing source for providing a predetermined pressure for compressing the gas in the gas storage mechanism and mixing the water in the gas storage mechanism to form a gas-liquid mixture;
a heating element for heating the water in the inner container and the tank.

It can be seen from the technical solution provided by the above embodiments of the present application that a tank communicating with a heating unit and a pressurizing source for pressurizing the contents in the tank are provided, wherein the tank is provided with inlets through which at least one of the water and gas enters the tank. In use, gas and water can be filled into the tank through the inlet, and a pressure for mixing the gas and water is provided to the tank by means of the pressurizing source, so that microbubble water can be formed in the tank to be supplied to the user. With the same amount of flow, water can be significantly saved because the water supplied to the user is mixed with gas. In addition, the microbubble water has better performance in terms of cleaning and sterilization as compared with ordinary water, and therefore, user experience is greatly improved.

A DESCRIPTION OF THE DRAWINGS

Figure 3A:
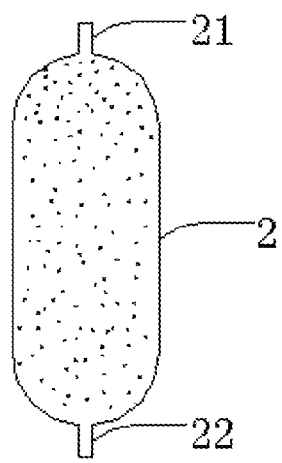
Figure 3B:
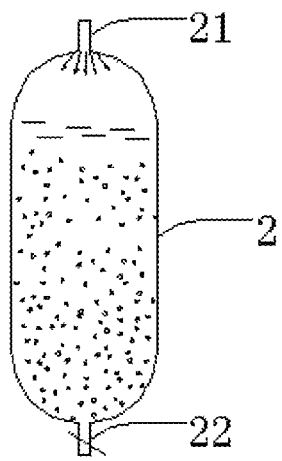
Figure 3C:
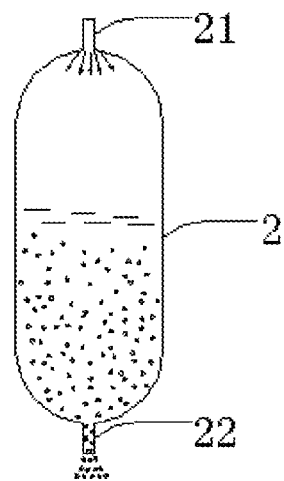
Figure 4:
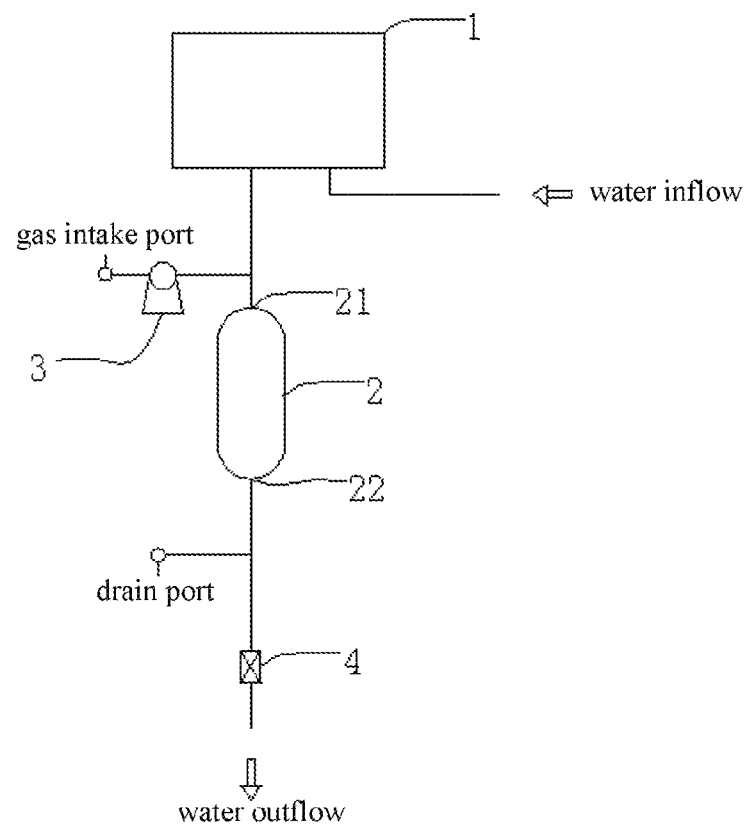
Figure 5A:
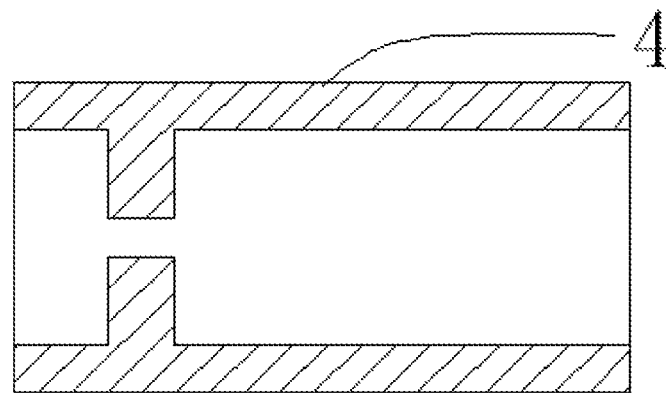
Figure 5B:
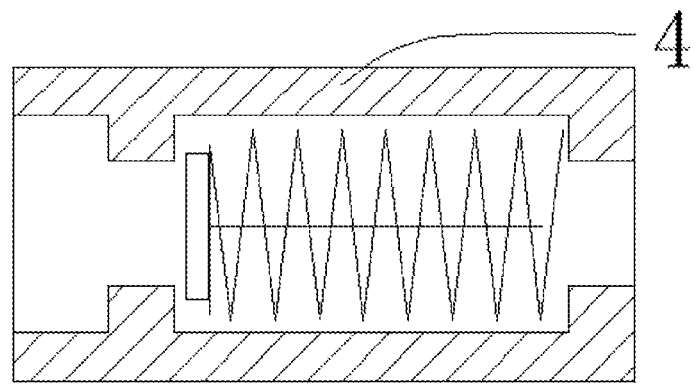
Figure 6:
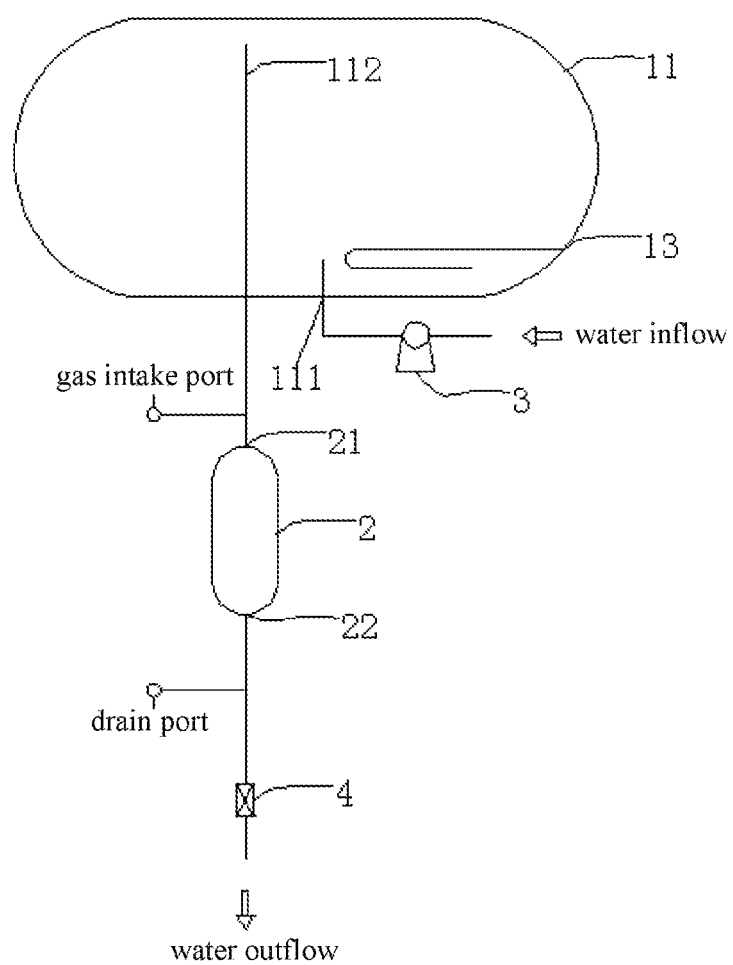
Figure 7:
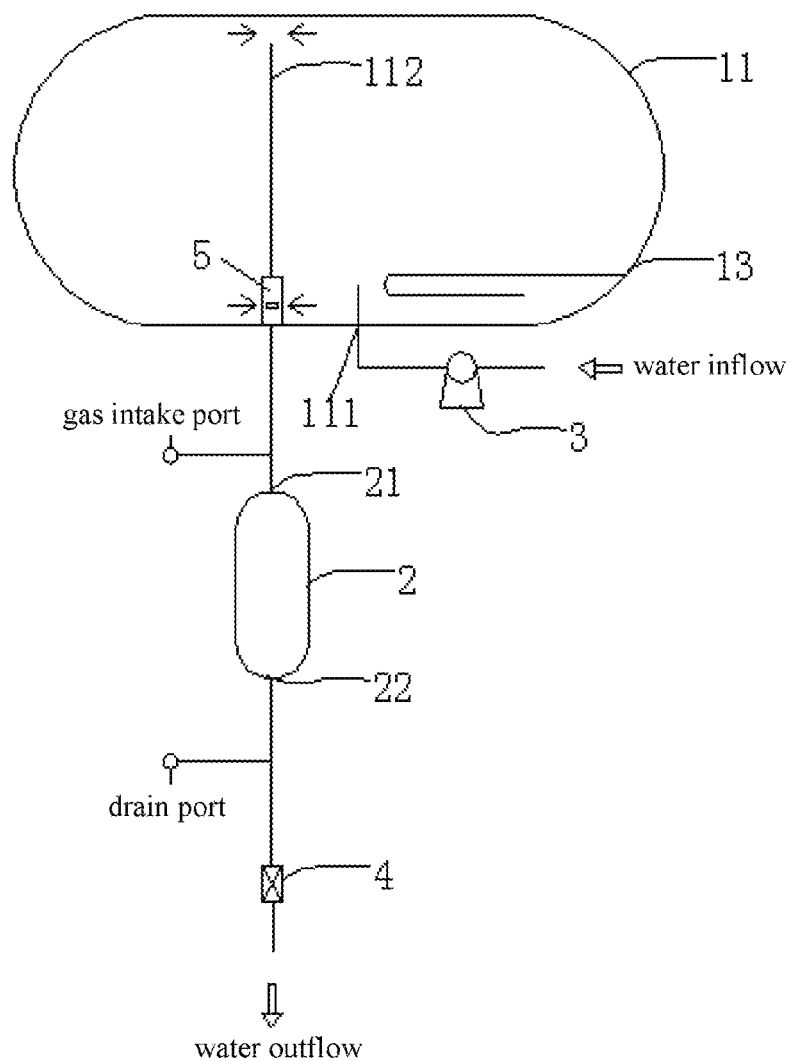
Figure 8:
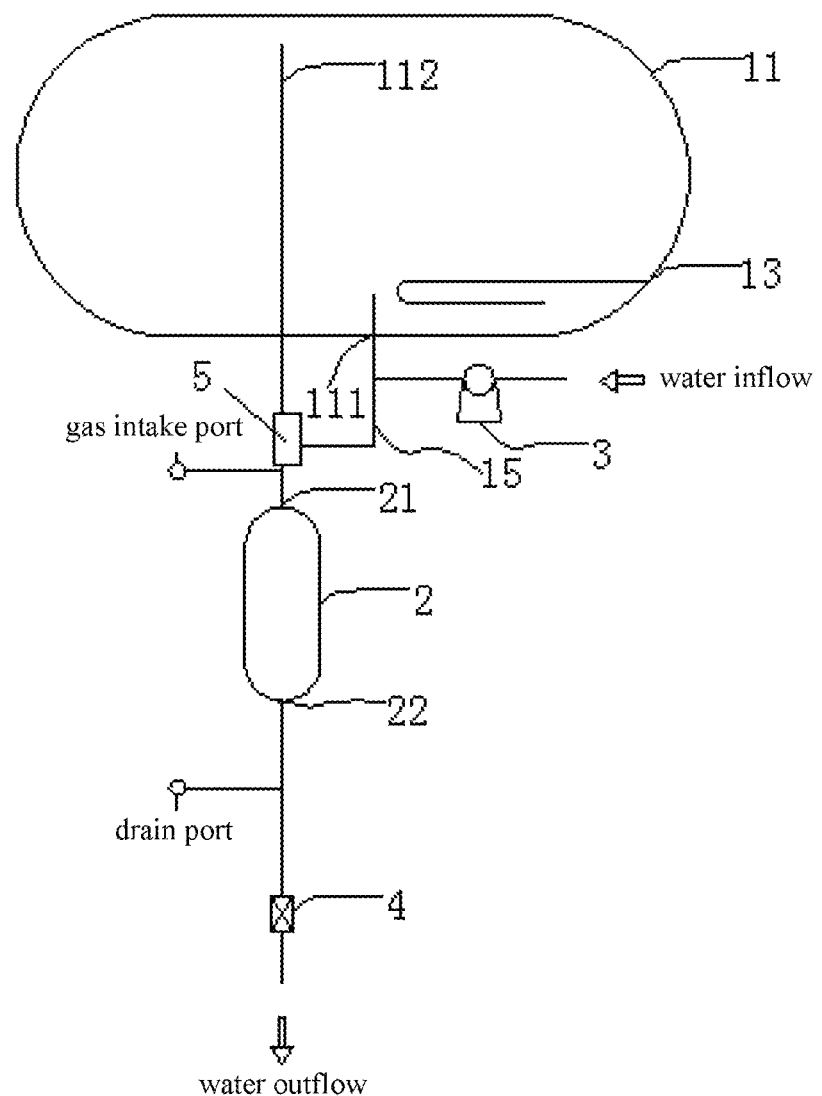
Figure 9:
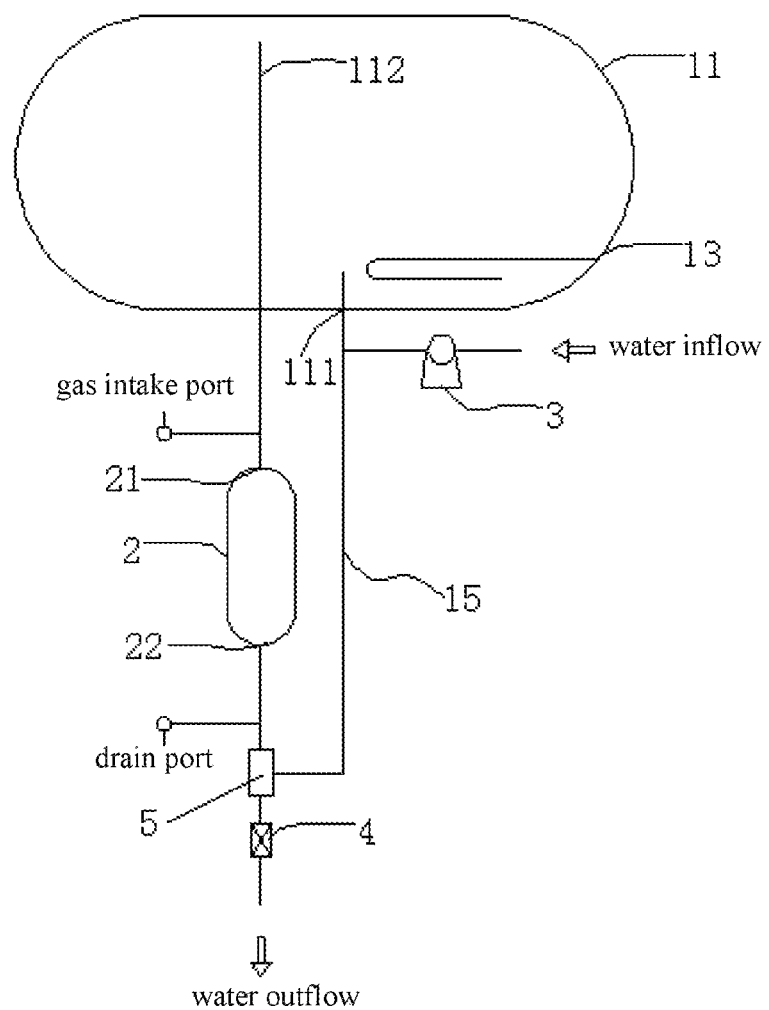
Figure 10:
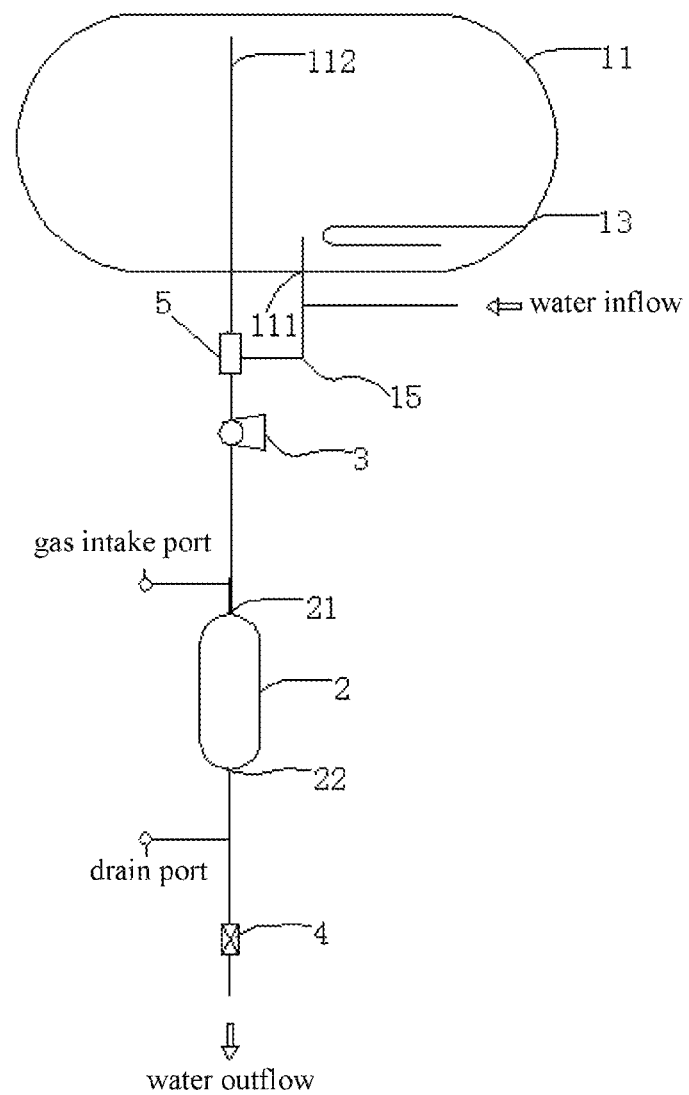
Figure 11:
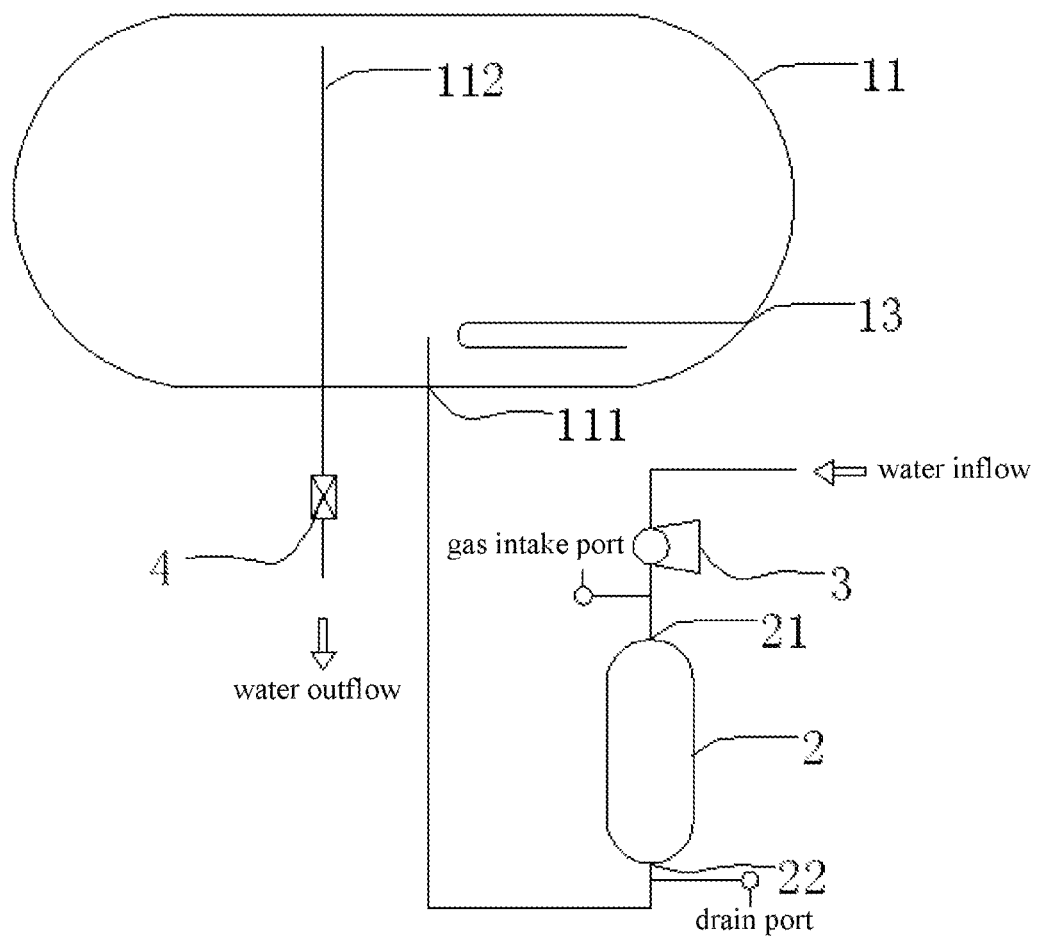
Figure 12:
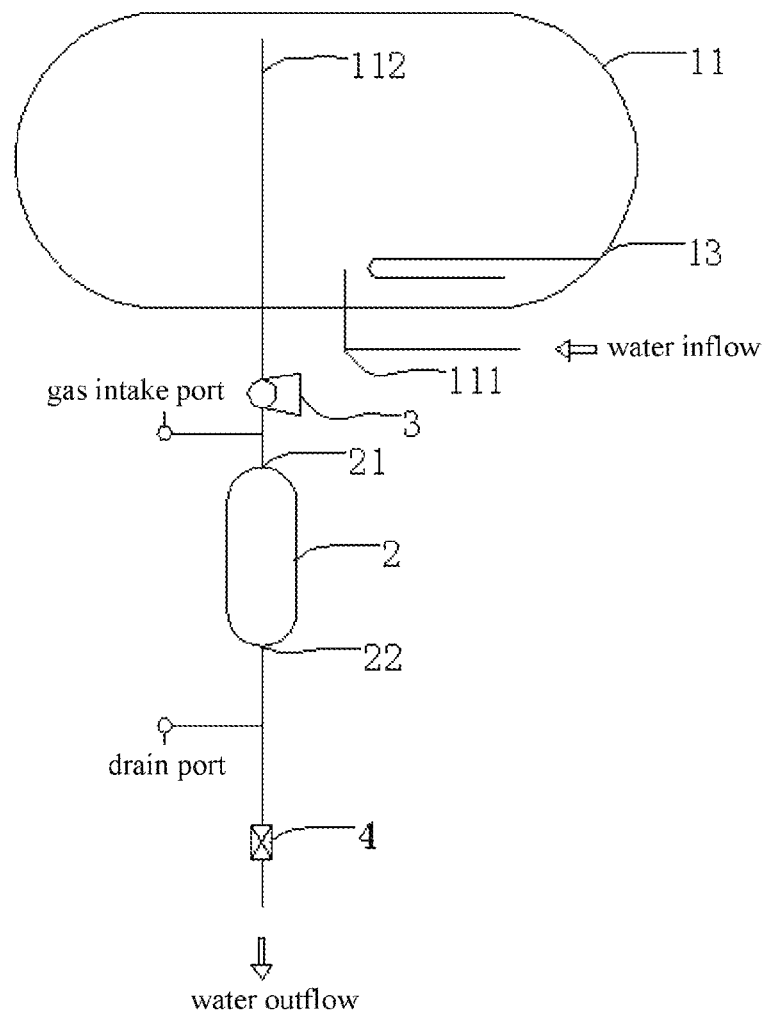
Figure 13:
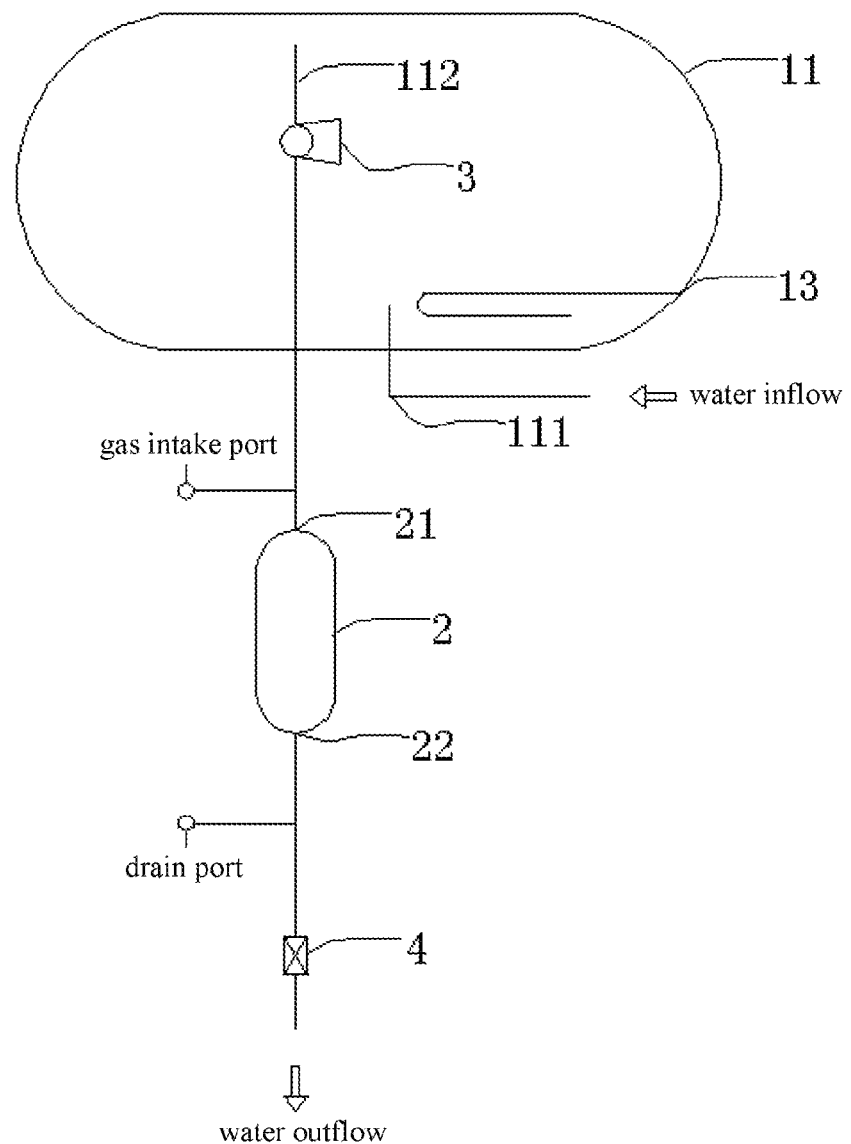
Figure 14:
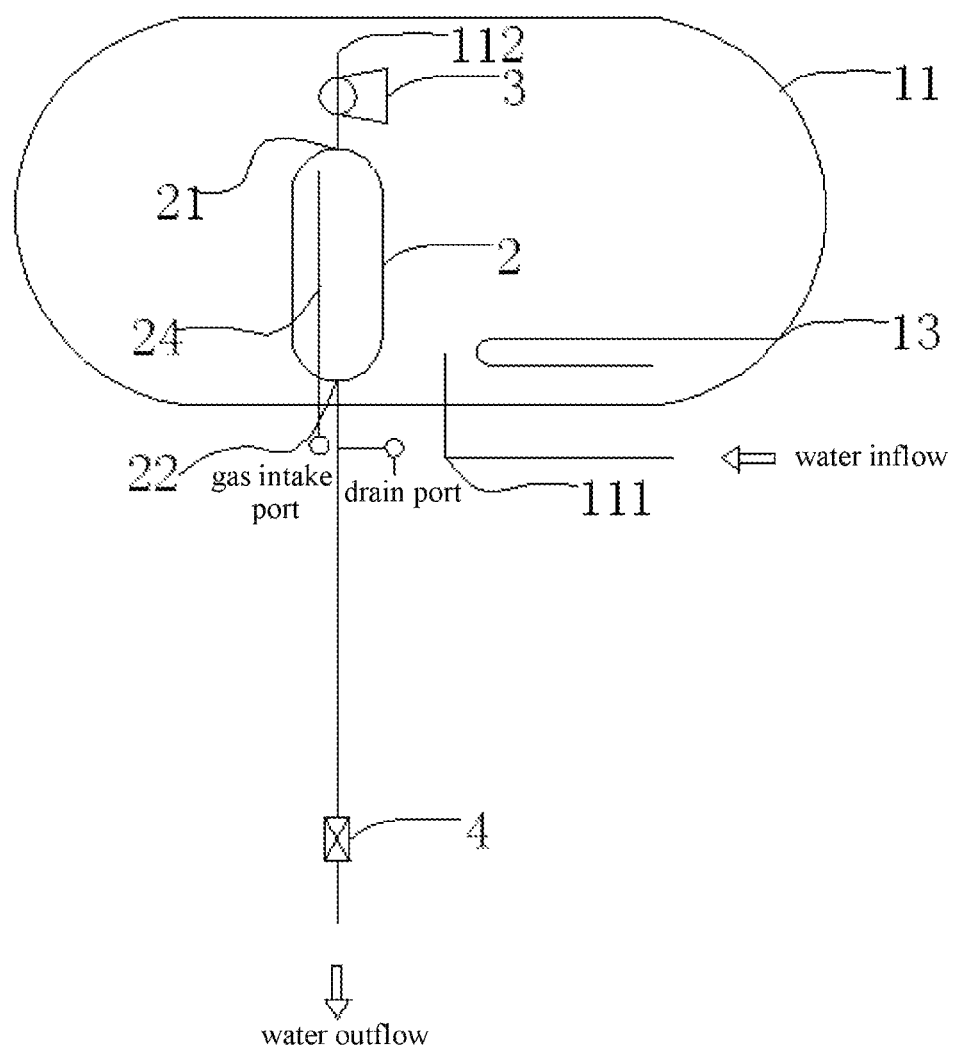
Figure 15:
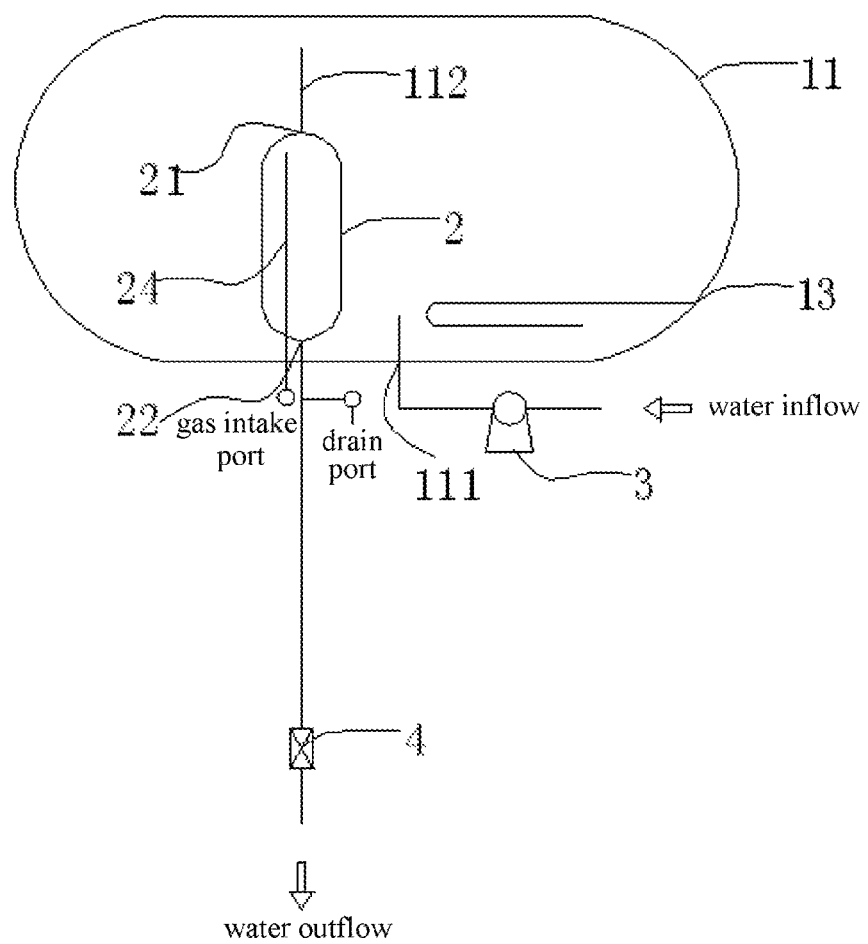
Figure 16:
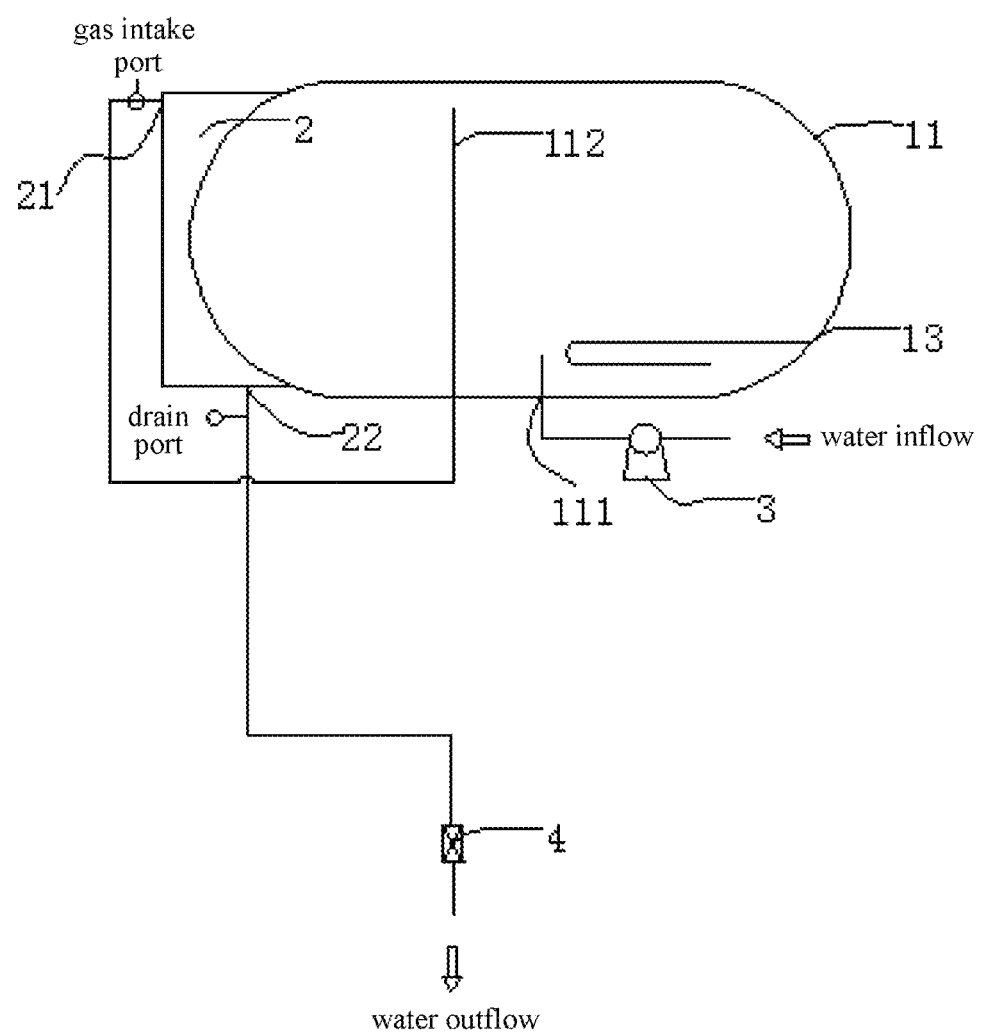
Figure 17:
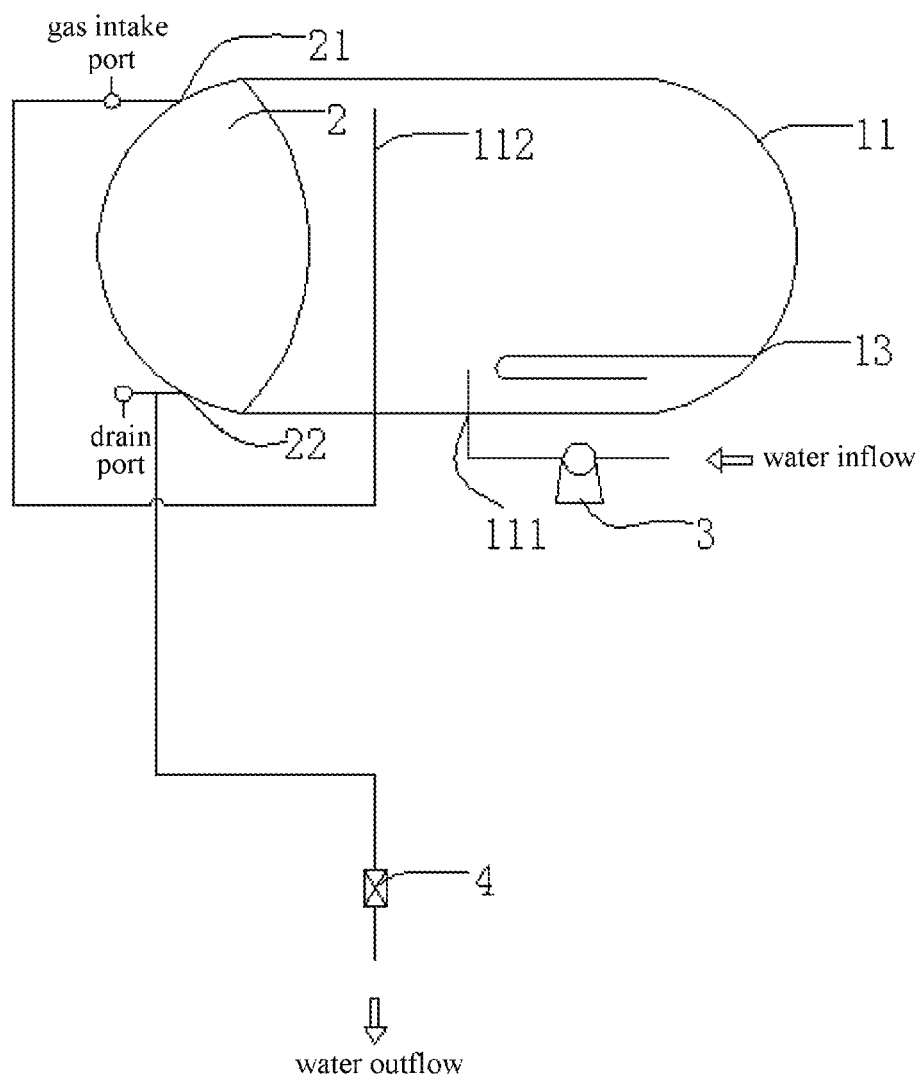
Figure 18:
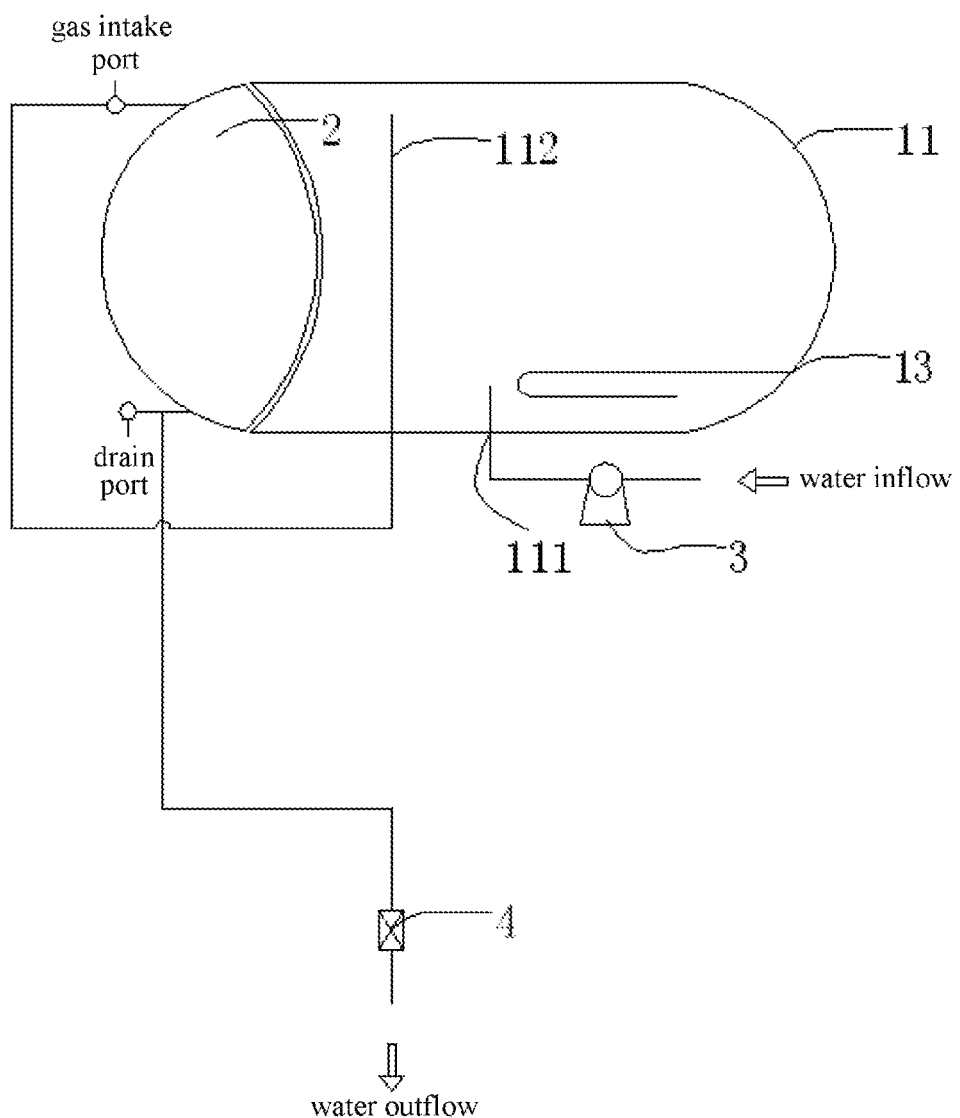
Figure 19:
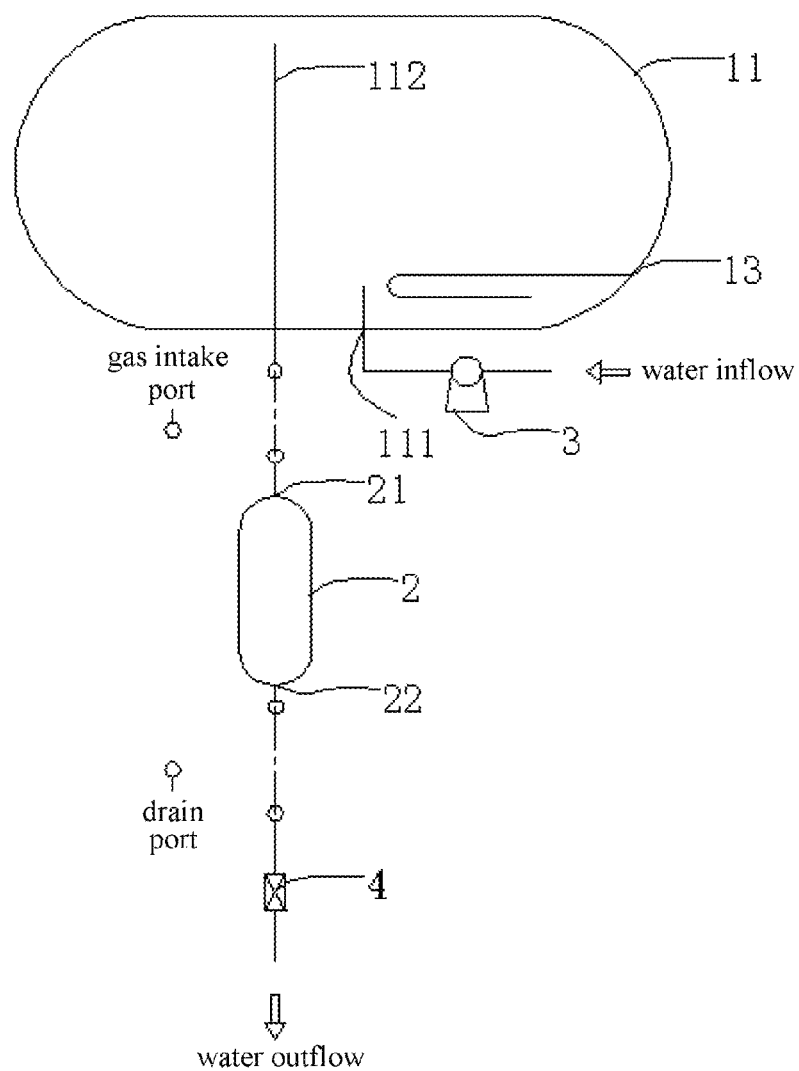
Figure 20:
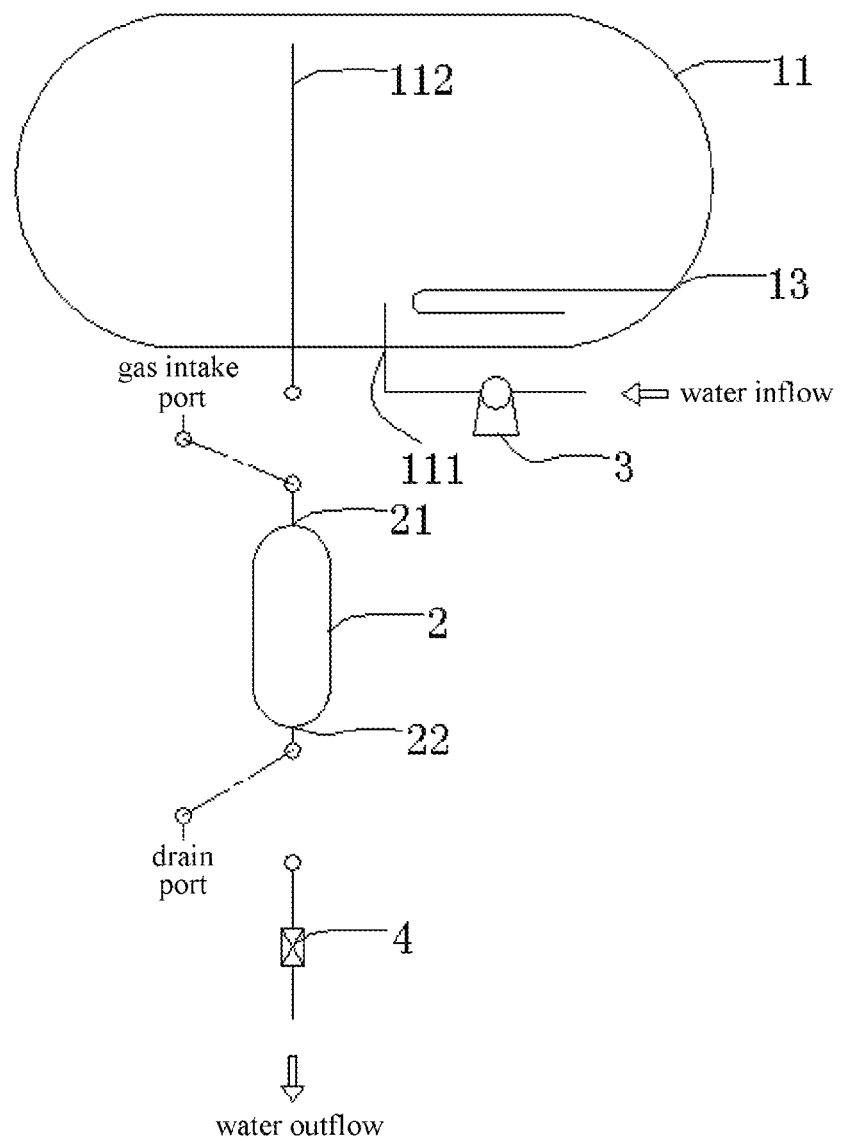
Figure 21:
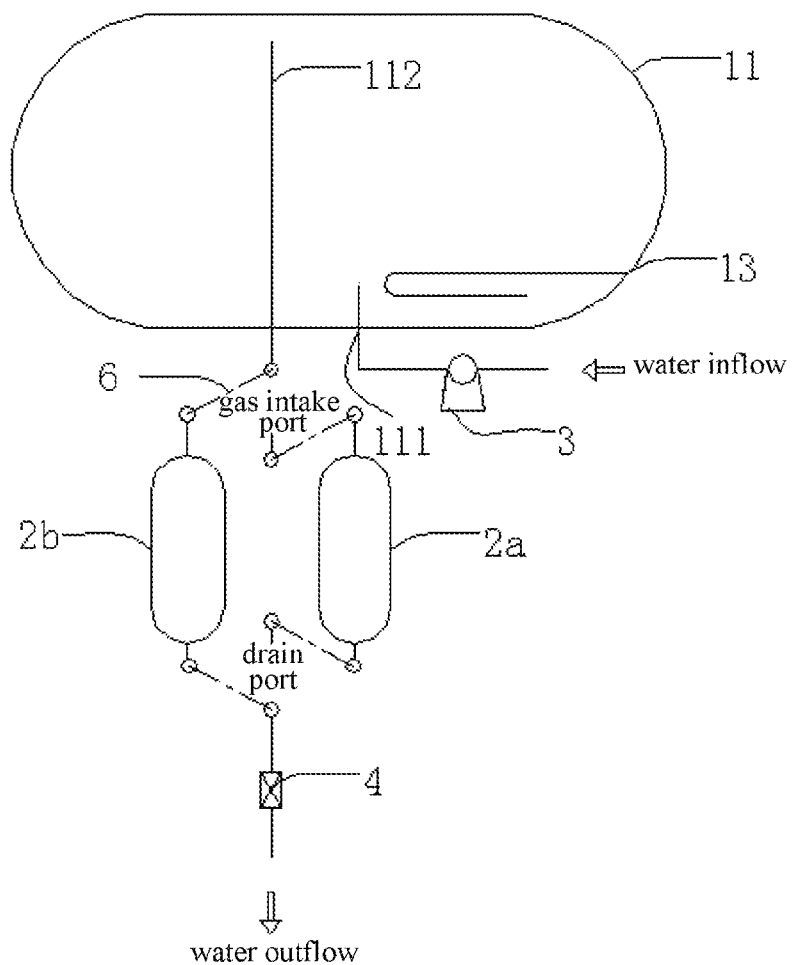
Figure 22:
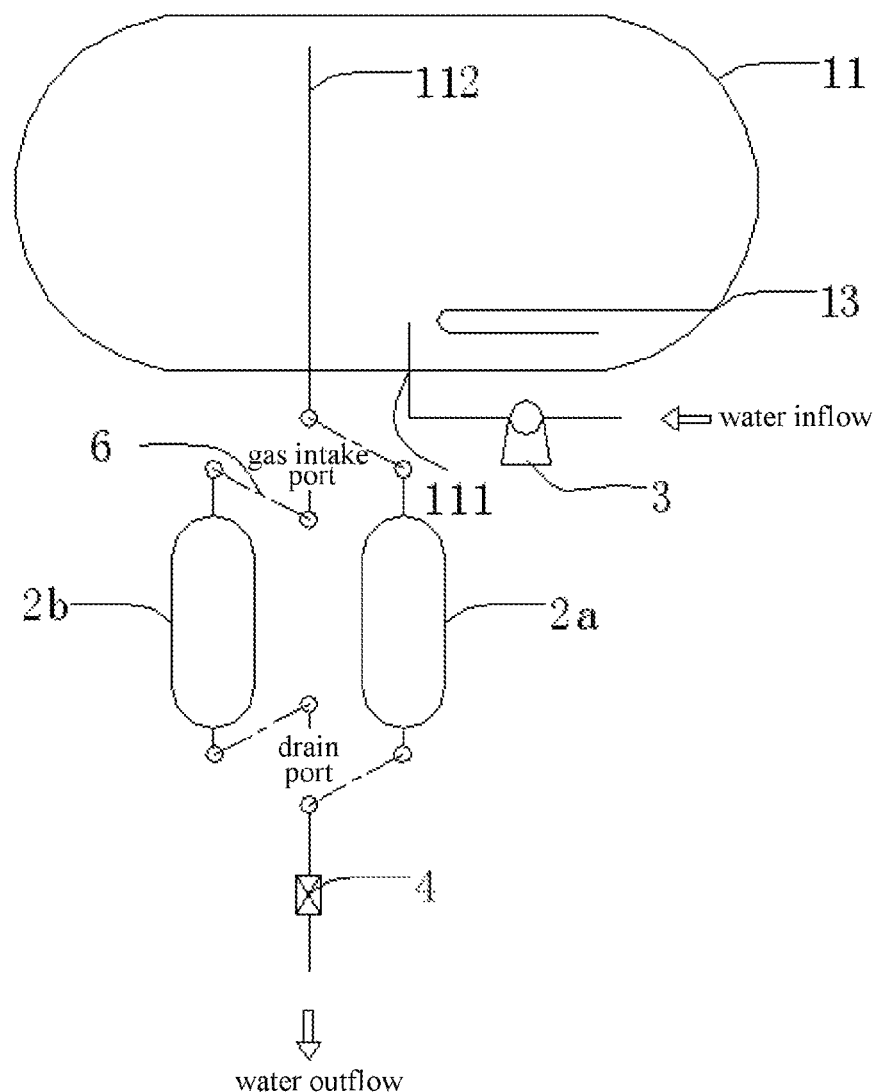
Figure 23:
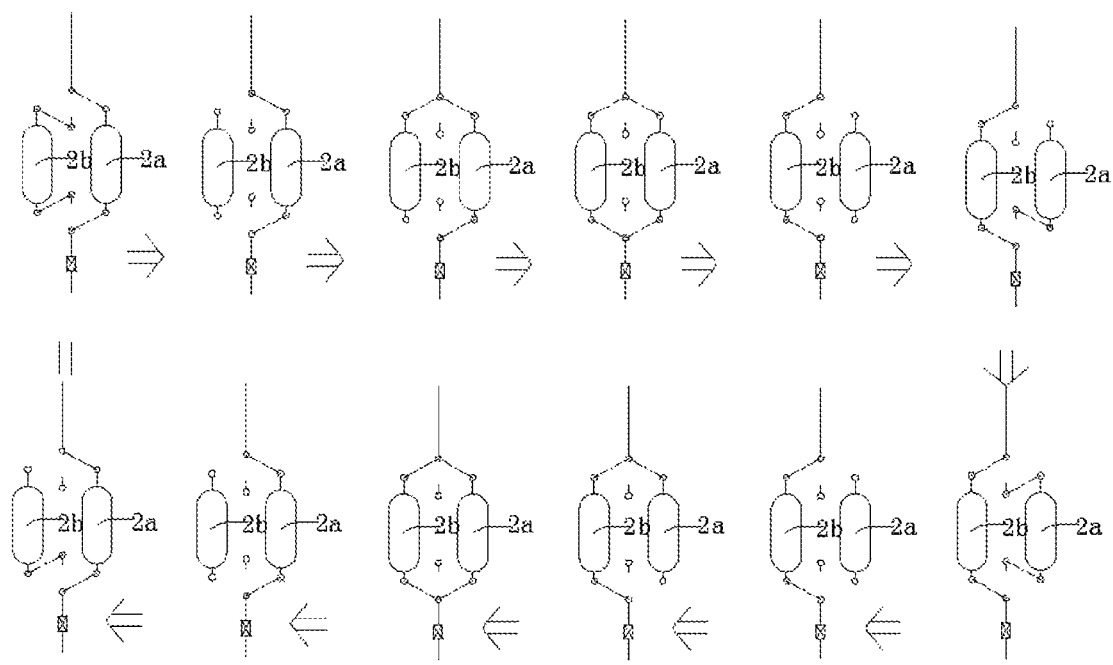
Figure 24:
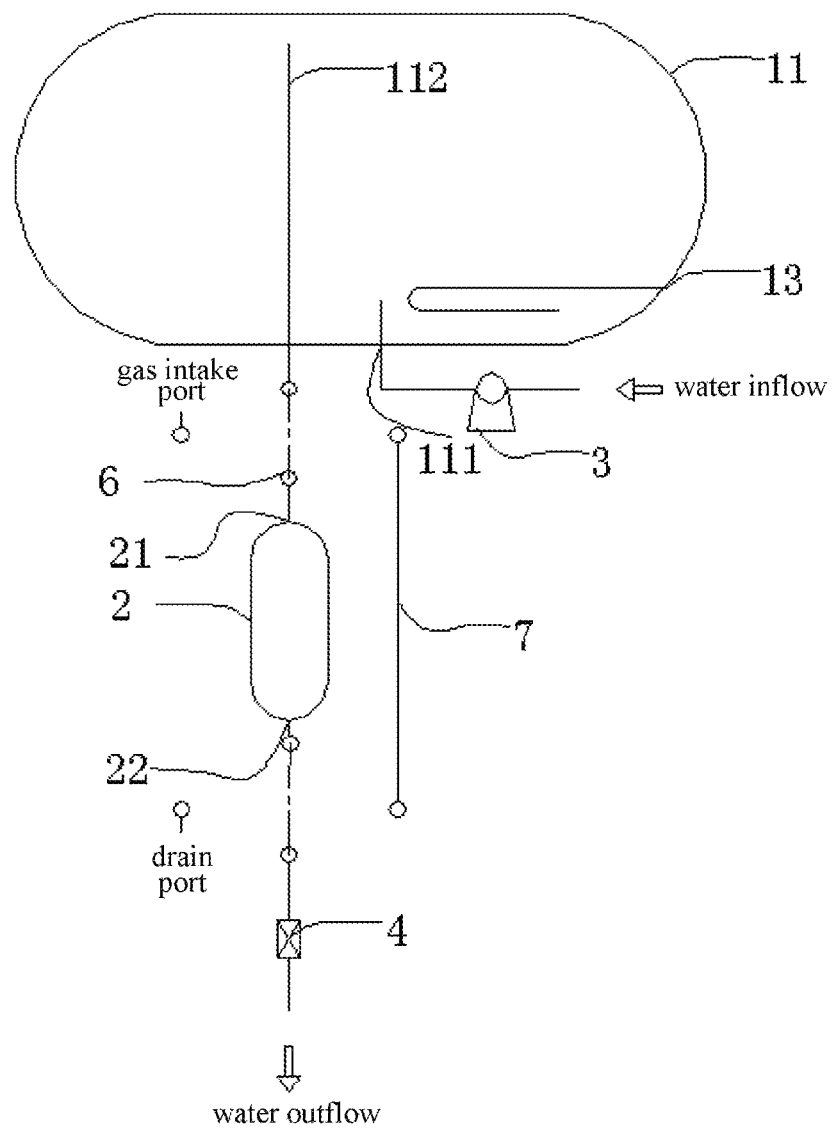
Figure 25:
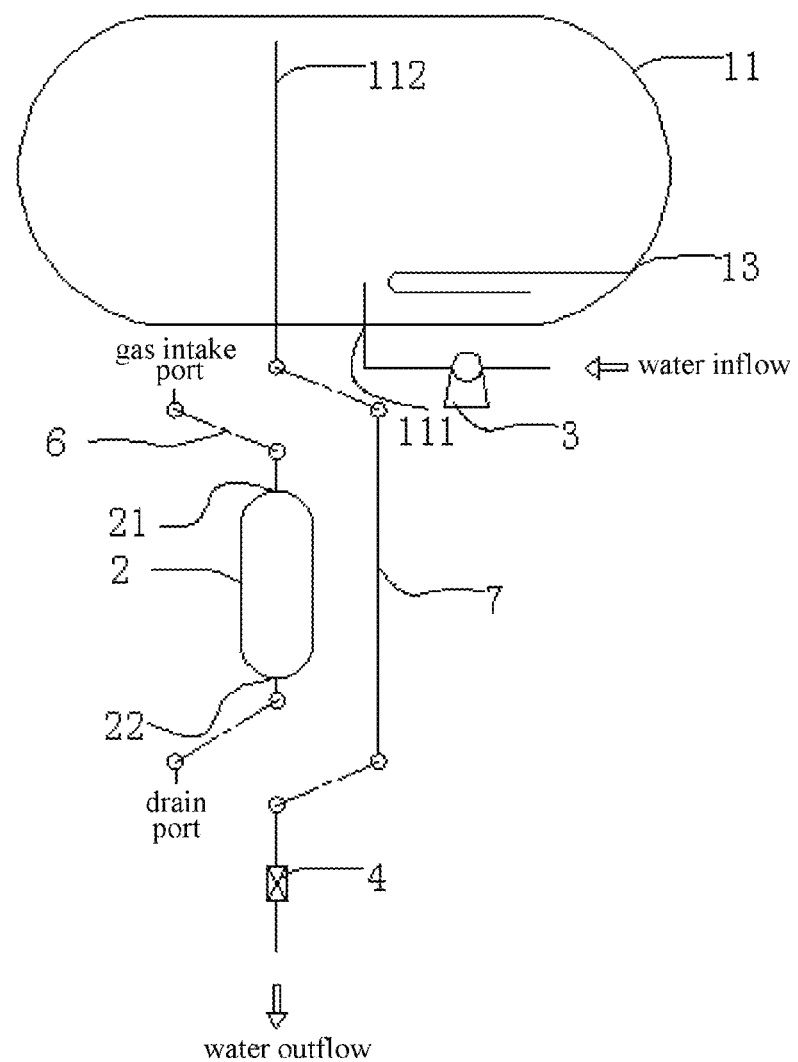
Figure 26:
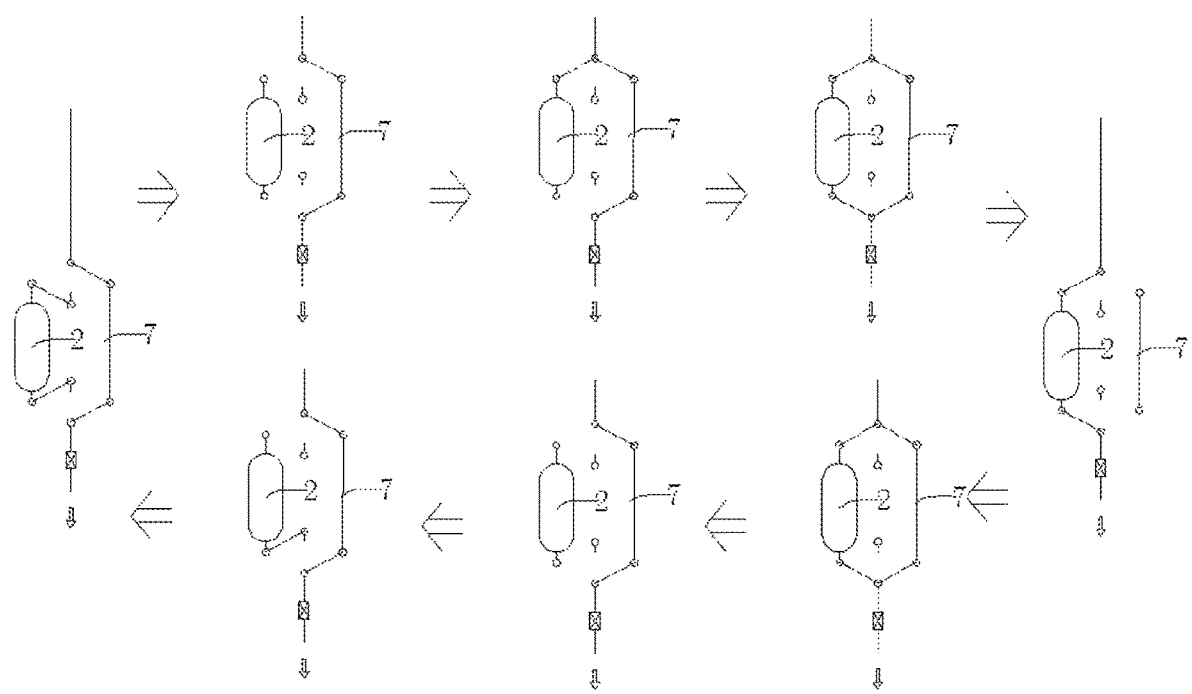
Figure 27:
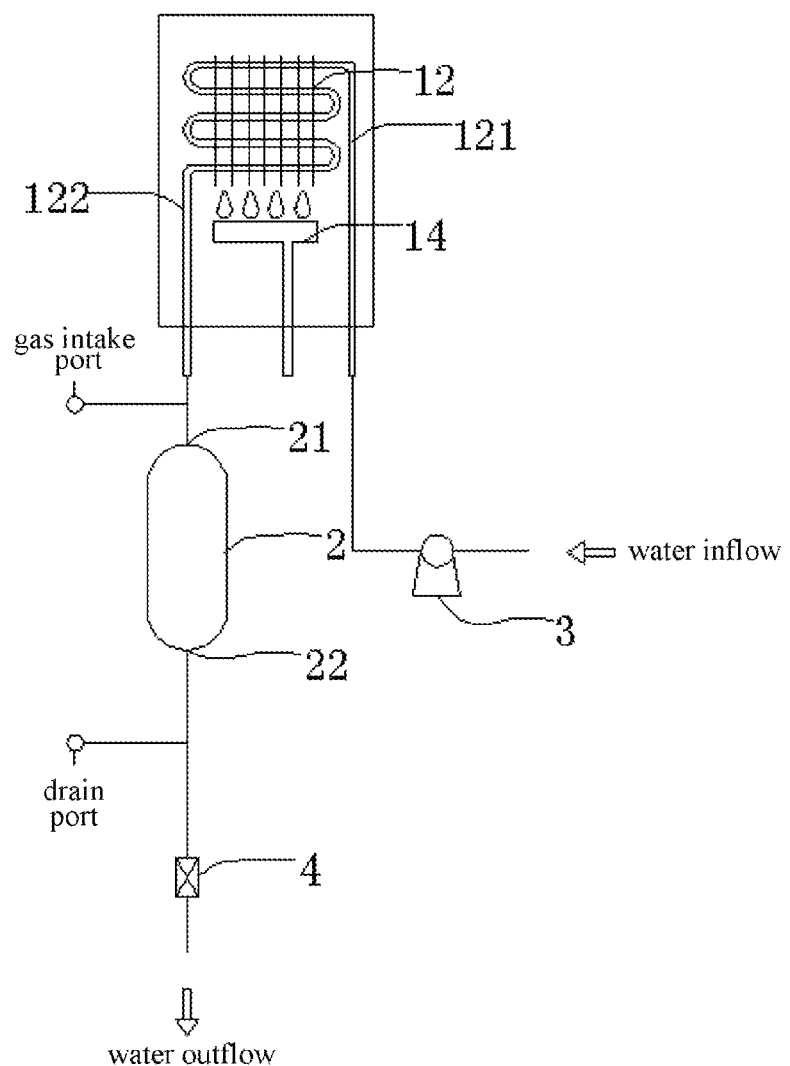
Figure 28:
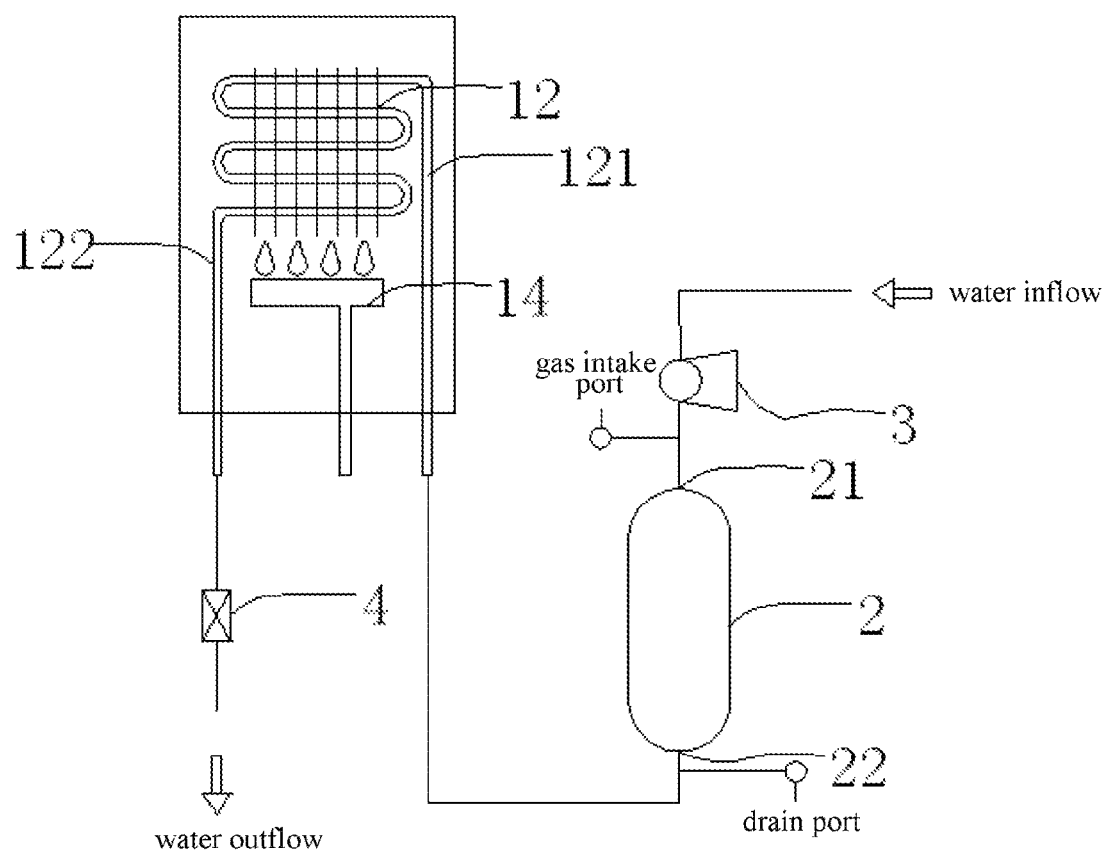
Figure 29:
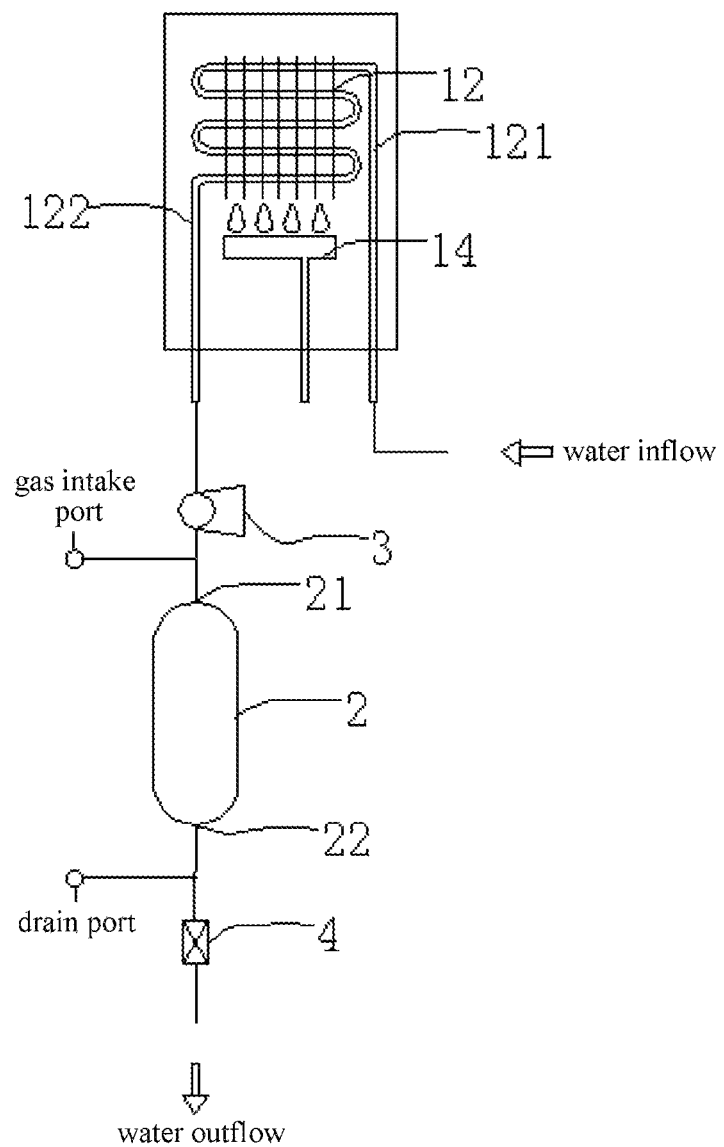
Figure 30:
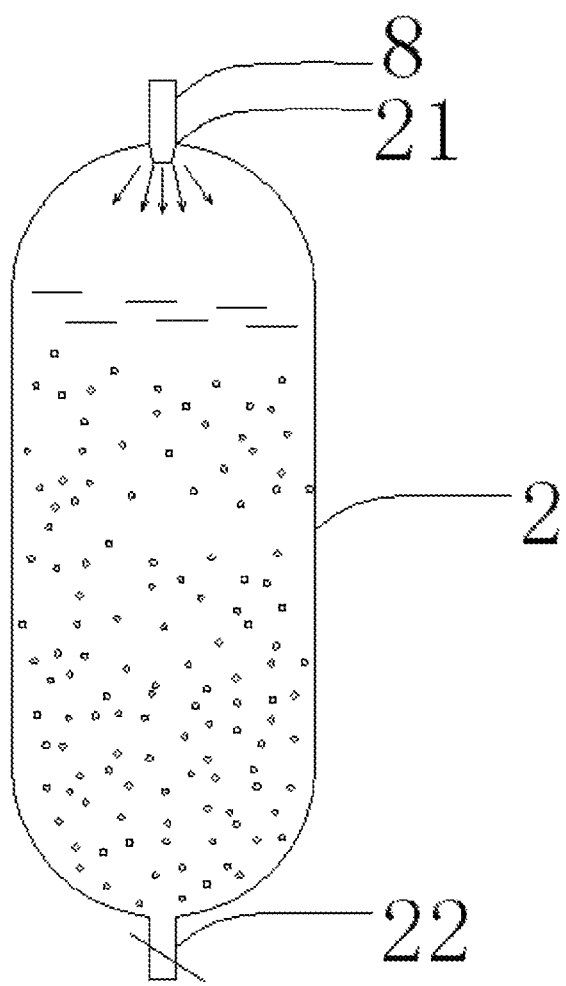
Figure 31A:
Figure 31B:
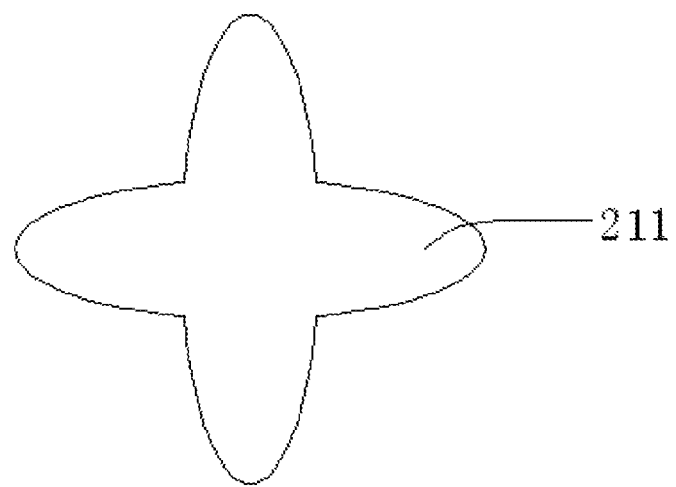
Figure 31C:
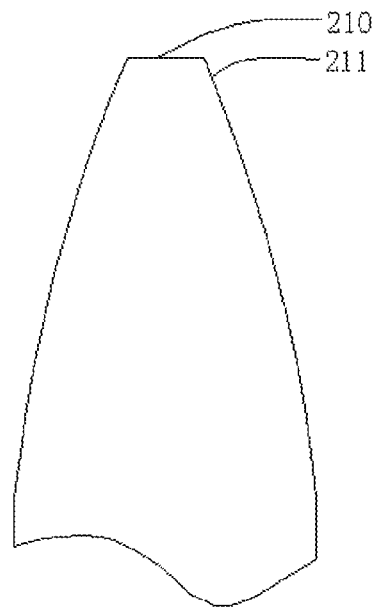
Figure 31D:
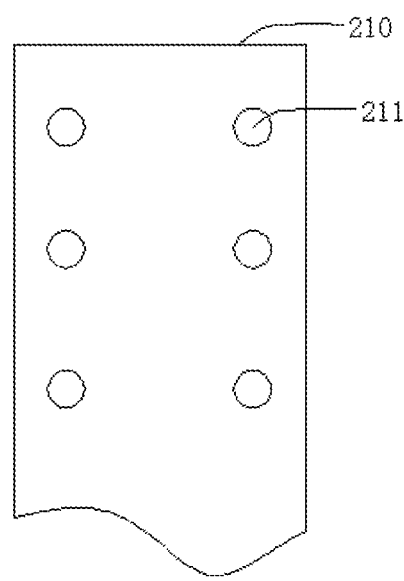
Figure 32:
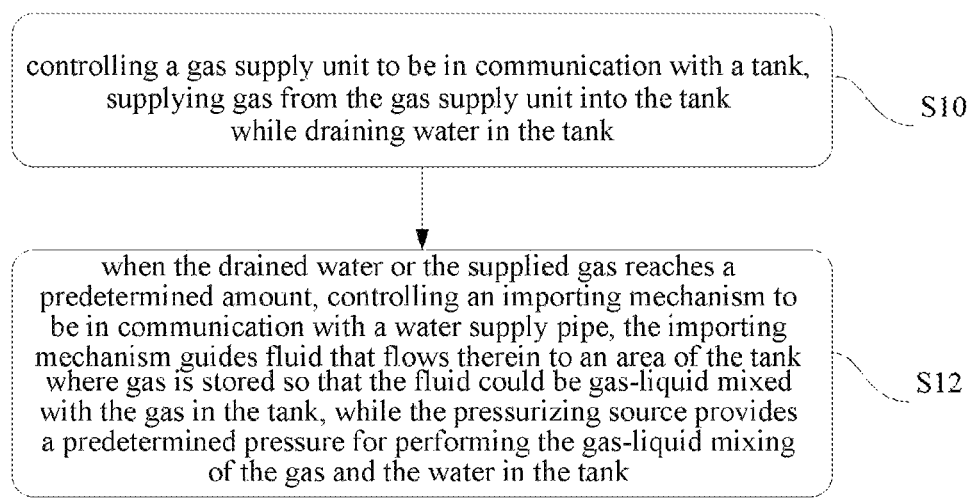
Figure 33:
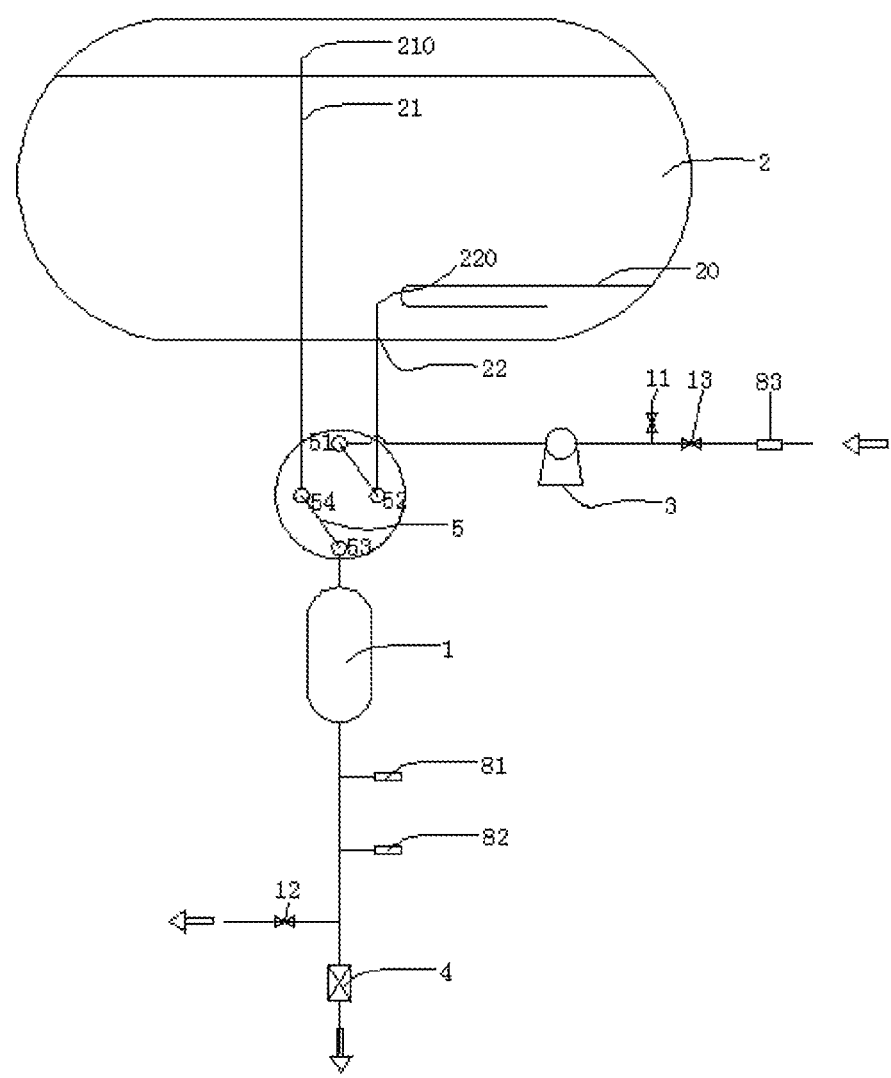
Figure 34A:
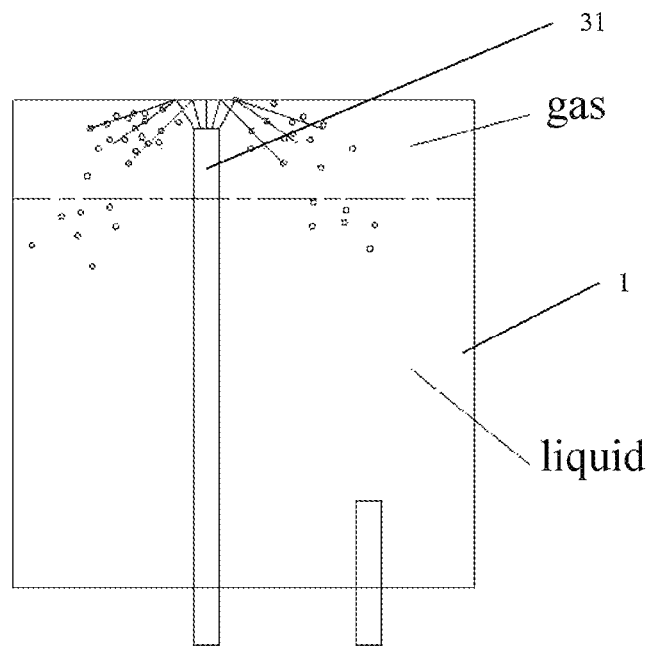
Figure 34B:
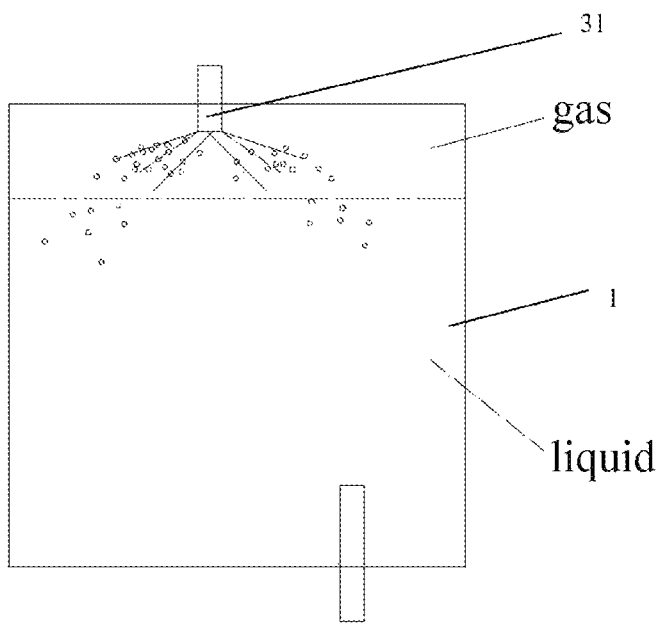
Figure 35A:
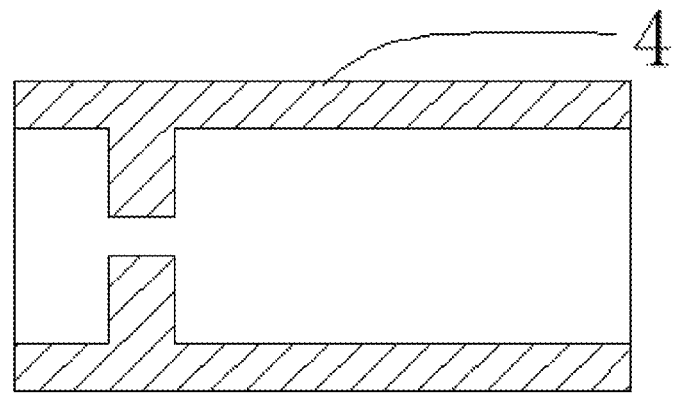
Figure 35B:
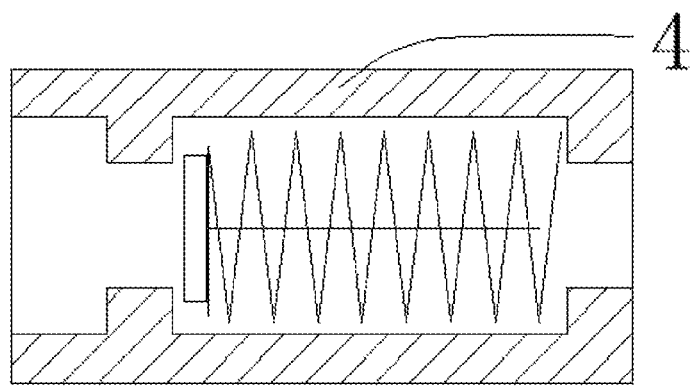
Figure 36A:
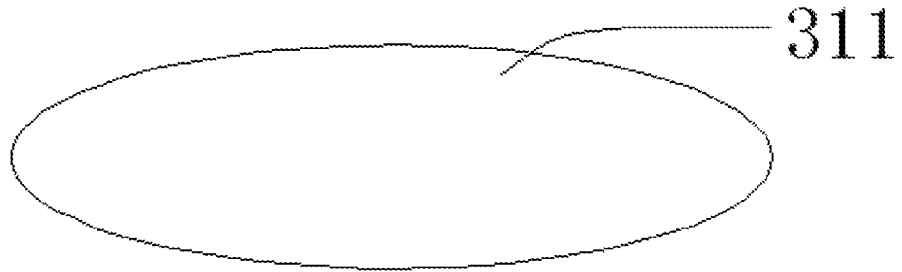
Figure 36B:
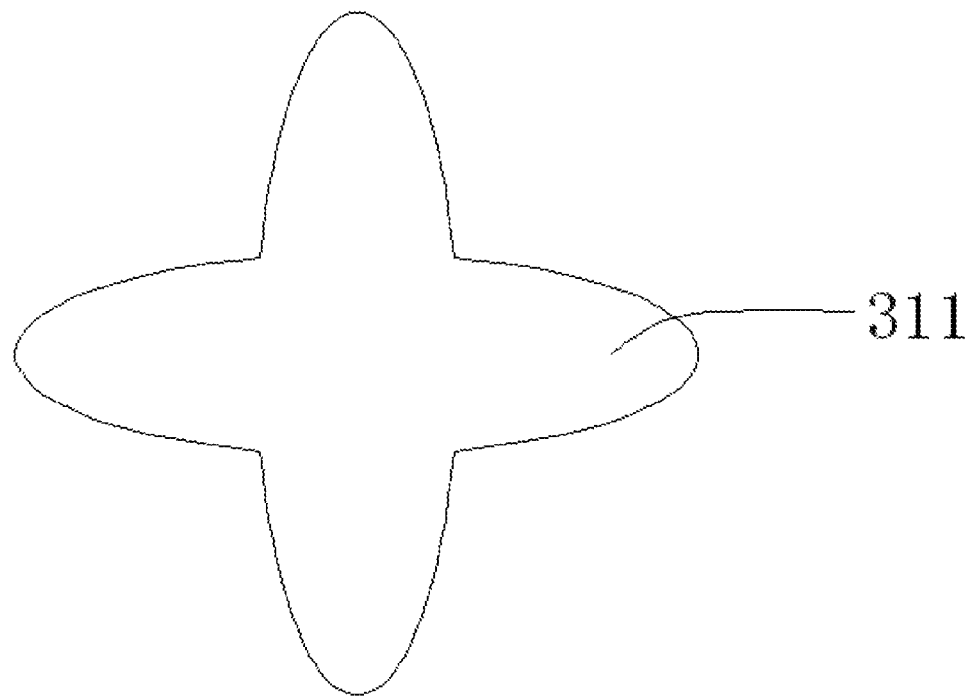
Figure 36C:
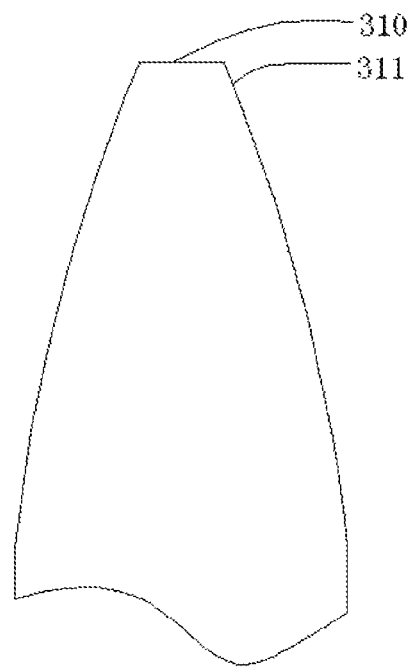
Figure 36D:
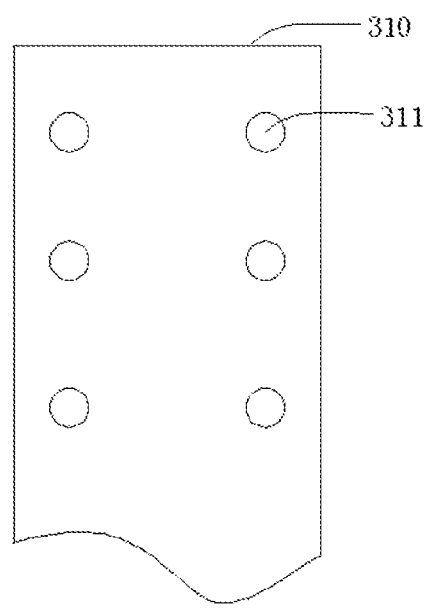
Figure 37:
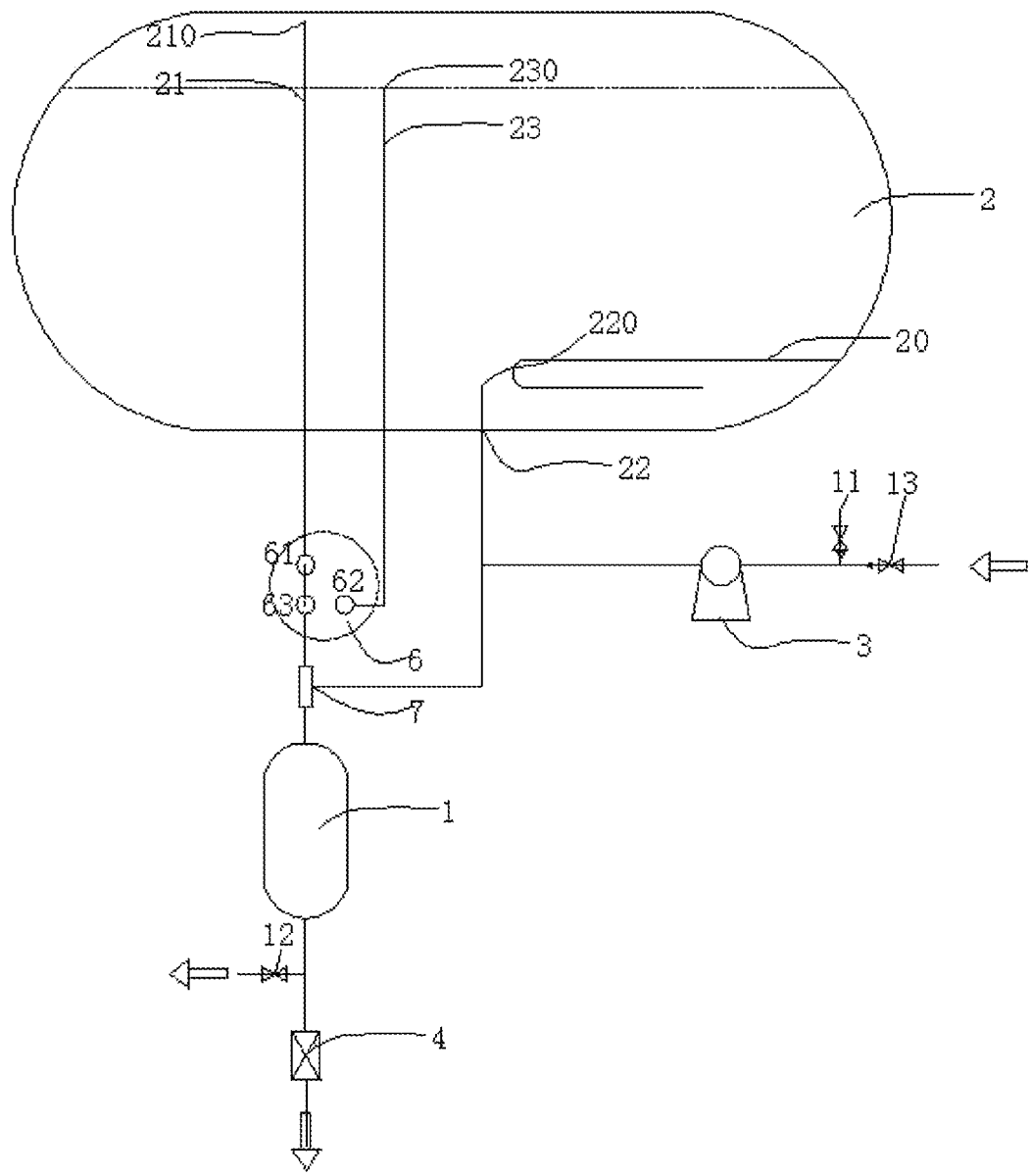
Figure 38:
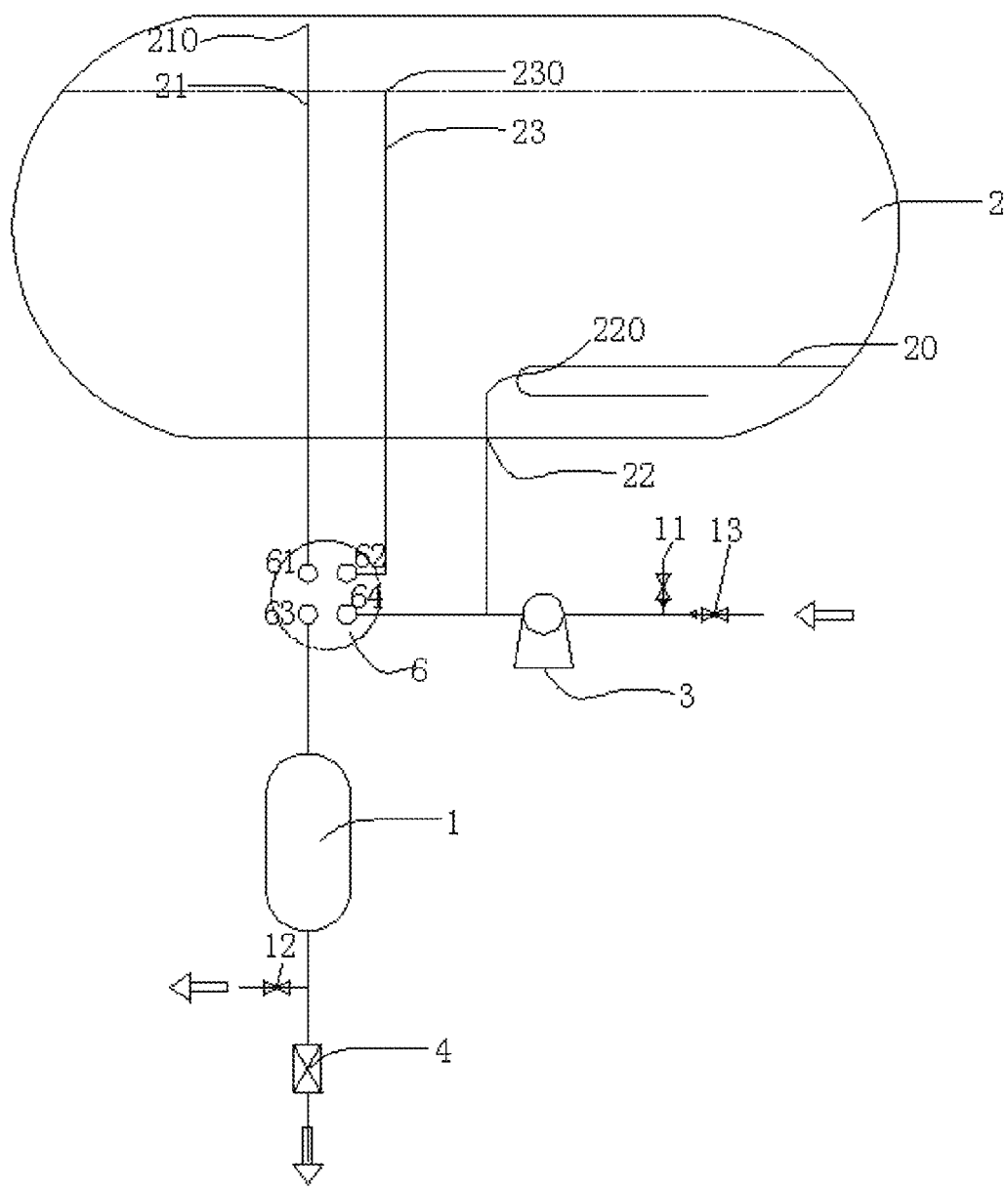
Figure 39:
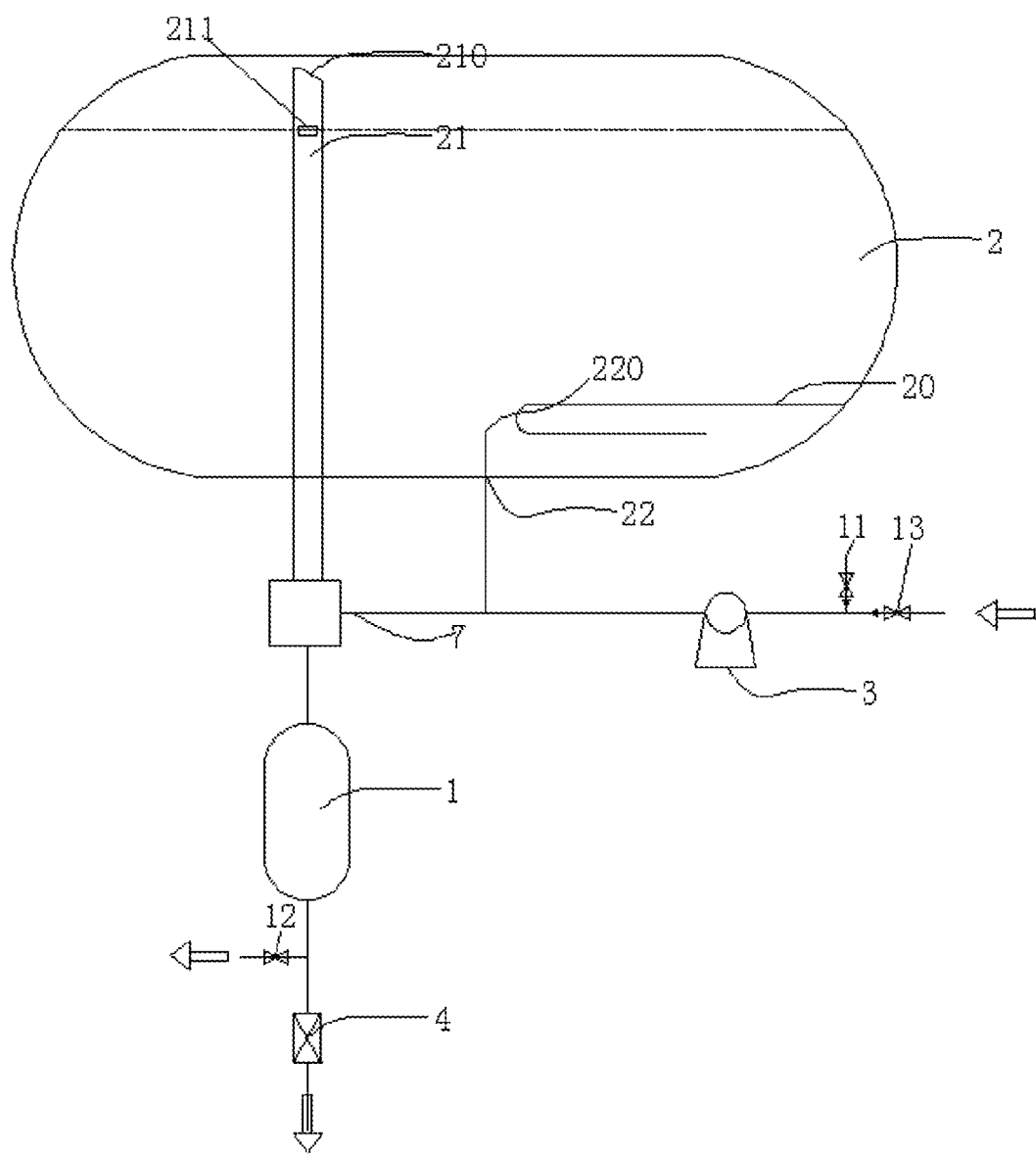
Figure 40:
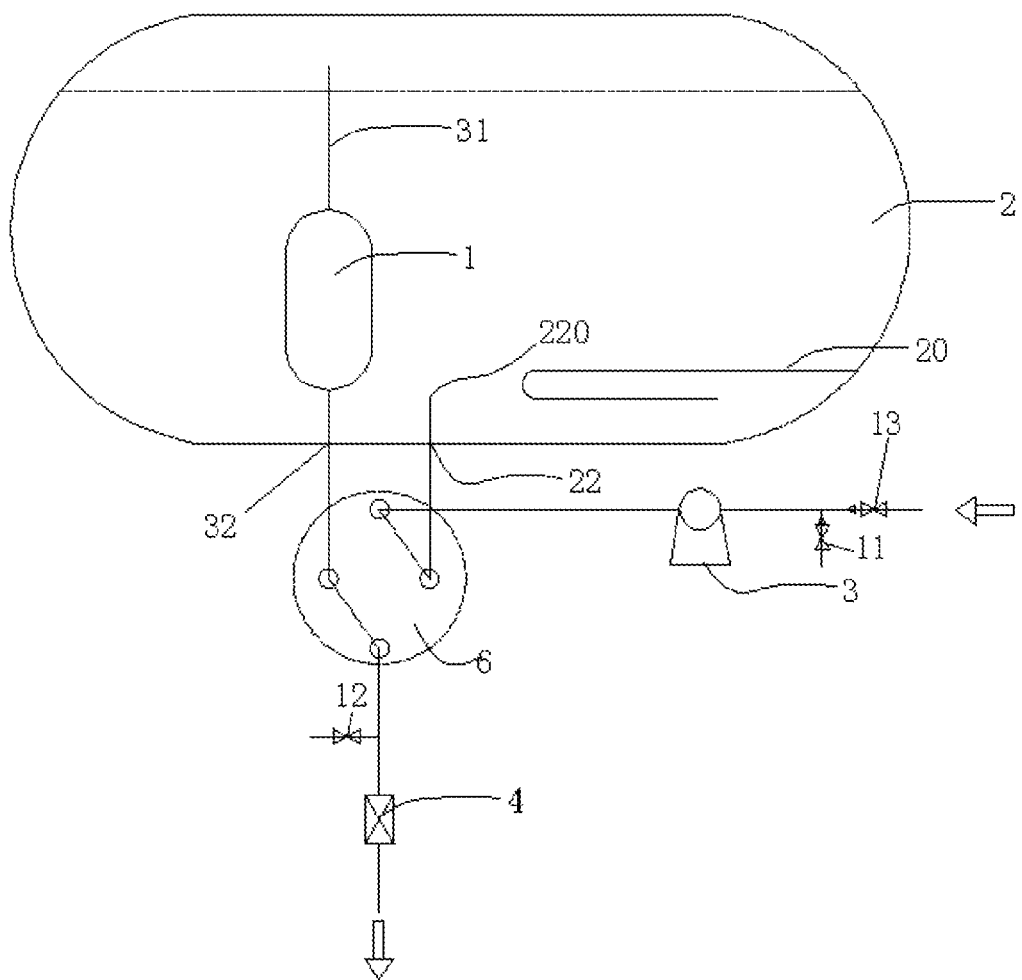

FIG. 3A, FIG. 3B, and FIG. 3C are schematic diagrams of a principle of preparing microbubble water in a tank provided in an embodiment of the present application;

FIG. 4 is a schematic structural diagram of another water heater system provided in an embodiment of the present application;

FIG. 5A is a structural schematic diagram of a pressure regulating device provided in an embodiment of the present application;

FIG. 5B is a structural schematic diagram of a pressure regulating device provided in an embodiment of the present application;

FIG. 6 is a schematic structural diagram of a water heater system with an inner container provided in an embodiment of the present application;

FIG. 7 is a structural schematic diagram of still another water heater system with an inner container provided in an embodiment of the present application;

FIG. 8 is a structural schematic diagram of still another water heater system with an inner container provided in an embodiment of the present application;

FIG. 9 is a schematic structural diagram of still another water heater system with an inner container provided in an embodiment of the present application;

FIG. 10 is a schematic structural diagram of still another water heater system with an inner container provided in an embodiment of the present application;

FIG. 11 is a structural schematic diagram of still another water heater system with an inner container provided in an embodiment of the present application;

FIG. 12 is a structural schematic diagram of still another water heater system with an inner container provided in an embodiment of the present application;

FIG. 13 is a schematic structural diagram of still another water heater system with an inner container provided in an embodiment of the present application;

FIG. 14 is a schematic structural view of still another water heater system with an inner container provided in an embodiment of the present application;

FIG. 15 is a schematic structural view of still another water heater system with an inner container provided in an embodiment of the present application;

FIG. 16 is a schematic structural view of still another water heater system with an inner container provided in an embodiment of the present application;

FIG. 17 is a schematic structural view of still another water heater system with an inner container provided in an embodiment of the present application;

FIG. 18 is a schematic structural view of still another water heater system with an inner container provided in an embodiment of the present application;

FIG. 19 is an operation diagram of a single tank of a water heater system with an inner container provided in an embodiment of the present application;

FIG. 20 is an operation diagram of a single tank of a water heater system with an inner container provided in an embodiment of the present application;

FIG. 21 is a schematic operation diagram of a water heater system with an inner container provided in an embodiment of the present application;

FIG. 22 is an operational schematic diagram of a water heater system with an inner container provided in an embodiment of the present application;

FIG. 23 is a schematic diagram of a dual tank switching principle of a water heater system provided in an embodiment of the present application;

FIG. 24 is an operational schematic diagram of a water heater system provided in an embodiment of the present application;

FIG. 25 is an operational schematic diagram of a water heater system provided in an embodiment of the present application;

FIG. 26 is a schematic diagram of the switching principle of a single tank and a bypass pipe in a water heater system provided in an embodiment of the present application;

FIG. 27 is a schematic structural view of a water heater system without an inner container provided in an embodiment of the present application;

FIG. 28 is a schematic structural view of another water heater system without an inner container provided in an embodiment of the present application;

FIG. 29 is a schematic structural view of another water heater system without an inner container provided in an embodiment of the present application;

FIG. 30 is a schematic structural view of a combination of an importing mechanism and a tank provided in an embodiment of the present application;

FIG. 31A is a cross-sectional view of a cross-sectional area changed portion of an importing mechanism provided in an embodiment of the present application;

FIG. 31B is a schematic cross-sectional view of a cross-sectional area changed portion of another importing mechanism provided in the embodiment of the present application;

FIG. 31C is a schematic structural view of a cross-sectional area changed portion of still another importing mechanism provided in the embodiment of the present application;

FIG. 31D is a schematic structural diagram of a cross-sectional area changed portion of still another importing mechanism provided in the embodiment of the present application;

FIG. 32 is a flow chart of a control method of a water heater system provided in an embodiment of the present application;

FIG. 33 is a schematic structural diagram of a first water heater system provided in an embodiment of the present application;

FIG. 34A is a schematic diagram of a state of gas-liquid mixing in the water heater system provided in the embodiment of the present application;

FIG. 34B is a schematic diagram of a state of gas-liquid mixing in the water heater system provided in the embodiment of the present application;

FIG. 35A is a schematic structural view of a pressure regulating device;

FIG. 35B is a schematic structural view of another pressure regulating device;

FIG. 36A is a schematic cross-sectional view of a cross-sectional area changed portion of a first pipe provided in an embodiment of the present application;

FIG. 36B is a cross-sectional view of a cross-sectional area changed portion of another first pipe provided in an embodiment of the present application;

FIG. 36C is a schematic structural view of a cross-sectional area changed portion of still another first pipe provided in an embodiment of the present application;

FIG. 36D is a schematic structural view of a cross-sectional area changed portion of still another first pipe provided in an embodiment of the present application;

FIG. 37 is a schematic structural diagram of a second water heater system provided in an embodiment of the present application;

FIG. 38 is a schematic structural diagram of a third water heater system provided in an embodiment of the present application;

FIG. 39 is a schematic structural diagram of a fourth water heater system provided in an embodiment of the present application;

FIG. 40 is a schematic structural diagram of a fifth water heater system provided in an embodiment of the present application.

DETAILED DESCRIPTION OF THE INVENTION

The technical scheme of the present invention will be described in detail below with reference to the accompanying drawings and specific examples, which are understood to be used only to illustrate the present invention and not to limit the scope of the present invention, Modifications to various equivalent forms of the invention by those skilled in the art fall within the scope defined by the appended claims.

It should be noted that when the element is referred to as being "disposed" to another element, it may be directly on the other element or there may be an interposed element. When an element is considered to be "connected" to another element, it may be directly connected to the other element or an interposed element may be present at the same time. The terms "vertical", "horizontal", "top", "bottom", "left", "right" and the like are used herein for illustrative purposes only and are not intended to represent the only implementation.

Unless defined otherwise, all technical and scientific terms used herein have the same meaning as commonly understood by those skilled in the art belonging to the present application. The terms used herein in the specification of the present application are used for the purpose of describing specific embodiments only and are not intended to limit the present application. As used herein, the term "and/or" includes any and all combinations of one or more related listed items.

The invention provides a water heater system and a control method thereof, being capable of generating microbubble water for user use, not only saving water and environmental protection, but also improving water cleaning performance and greatly improving the user's experience.

Figure 1:
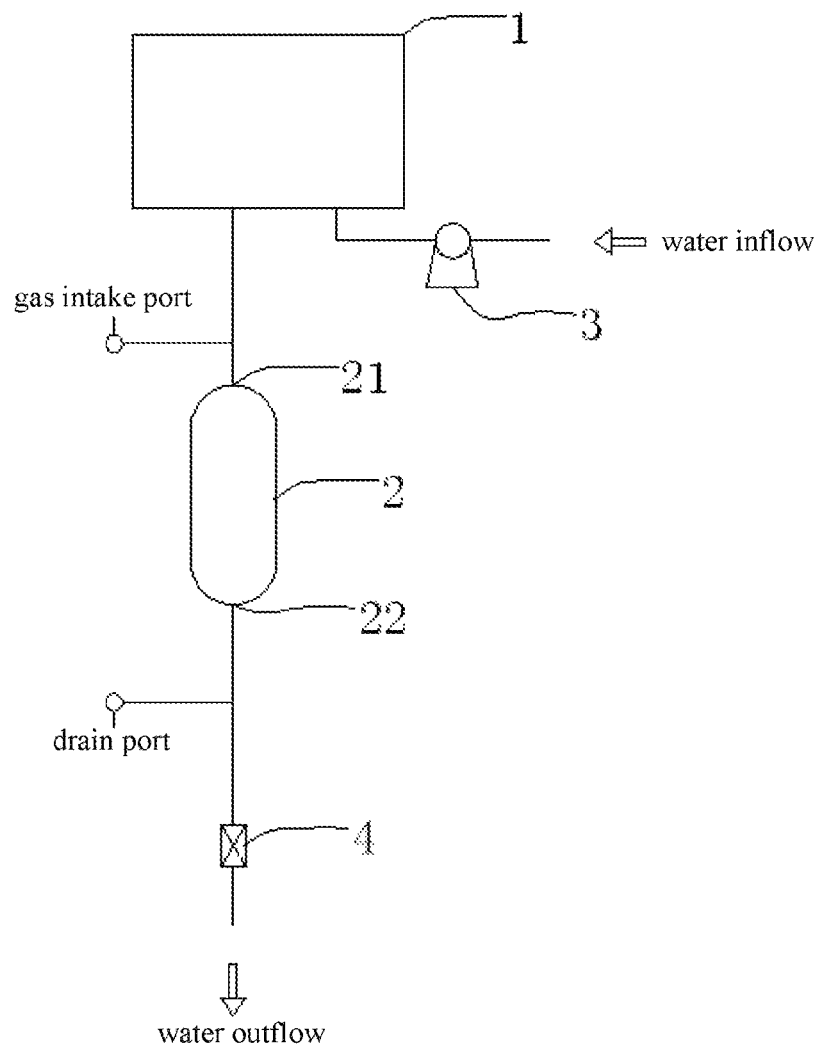
FIG. 1 is a schematic structural diagram of a water heater system provided in an embodiment of the present application.
Figure 2:
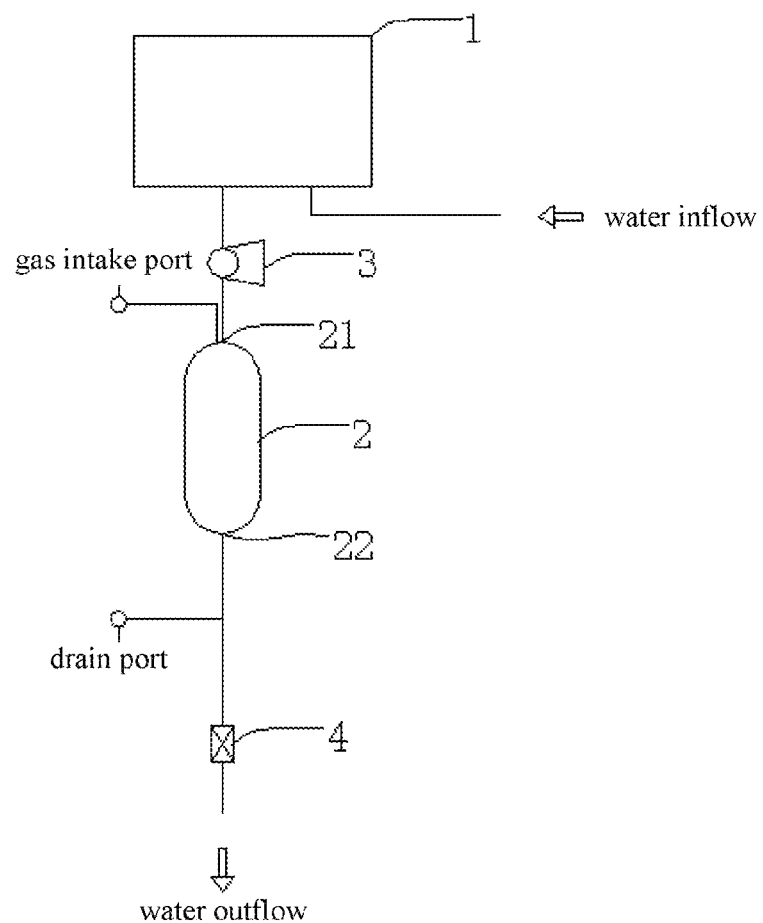
FIG. 2 is a schematic structural diagram of another water heater system provided in an embodiment of the present application.

Referring to FIGS. 1 to 2, a water heater system provided in an embodiment of the present application may include a heating unit 1 capable of heating water; a tank 2 capable of communicating with the heating unit 1, the tank 2 being provided with at least one inlet 21 and an outlet 22, the inlet 21 being capable of supplying at least one of gas and water into the tank 2; A pressurizing source capable of pressurizing the tank 2, the pressurizing source being capable of providing a pressure at which the gas and water in the tank 2 are mixed.

In this embodiment, the water heater system can be used in any existing water heaters, including electric water heaters, gas water heaters, solar water heaters, air energy water heaters, and the like, and the application is not particularly limited herein.

In this embodiment, the pressurizing source may provide a desired pressure for mixing of the gas and water in the tank 2. Specifically, the pressurizing source may include at least one of following: a pressurizing device 3 capable of communicating with the tank 2 and providing a predetermined pressure to water flowed into the tank 2, water having a predetermined pressure, or the like.

In the present embodiment, the heating unit 1 can be used for heating water. The form of the heating unit 1 may be different according to the specific type of the water heater, and is not particularly limited in this application. For example, if the water heater is an electric water heater, the heating unit 1 may include an inner container and an electric heating rod in the inner container. If the water heater is a gas water heater, the heating unit 1 may include a burner and a heat exchanger.

In this embodiment, the tank 2 can communicate with the heating unit 1. The tank 2 may be provided with at least one inlet. The inlet 21 allows at least one of gas and water to enter the tank 2. Specifically, as shown in FIG. 1, when the tank 2 is provided with an inlet, the inlet 21 can be used to allow inflow of both gas and water. As shown in FIG. 2, when the tank 2 is provided with two inlets, one of the inlets may be communicated a gas intake port for the inflow of the gas and the other inlet may be used for the inflow of water. In addition, the number of outlets on the tank 2 may be one or more, and the present application is not particularly limited herein. When the number of the outlets is one, it can communicate with a drain pipe or a water terminal.

In the present embodiment, the tank 2 may have a hollow cylindrical shape having opposed top and bottom ends. The top end and the bottom end may be provided with arc transitions. The tank 2 is in the use position with its top end on the top and the bottom end on the bottom. Wherein the inlet 21 may be provided near the top end and the outlet 22 may be provided near the bottom end. Of course, the shape of the tank 2 may be other forms, and the present application is not particularly limited herein.

In the present embodiment, the pressurizing device 3 may pressurize the tank 2. Specifically, the pressurizing device 3 may be in the form of a water pump or an air pump, and may of course be another device capable of pressurizing, and the present application is not particularly limited herein. When the tank 2 is in a state in which microbubble water is being prepared, the pressurizing device 3 can provide the tank 2 with a pressure required for mixing gas and water for preparing microbubble water.

The water heater system of the present application can prepare microbubble water by means of cooperation of the tank 2 and the pressurizing device 3. The principle of producing microbubbles in the tank 2 can be explained with reference to FIGS. 3A to 3C.

When it is necessary to prepare microbubble water in the tank 2, as shown in FIG. 3A, the tank 2 may be filled with air first. As shown in FIG. 3*b*, the outlet 22 is then closed, and pressurized water is injected from the inlet 21 into the air in the tank 2 by the pressurization of the pressurizing device 3. As the pressurized water is continuously injected from the inlet 21, the pressure in the tank 2 increases, and the water and the gas in the tank 2 come into contact with each other and then are compressed and mixed under pressure. As shown in FIG. 3C, by opening the outlet 22, the microbubble water can be discharged and provided to the user.

The water heater system described in the present application is capable of producing and supplying microbubble water supply to a user by utilizing the tank 2 and the pressurizing device 3 in communication with the heating unit 1. Microbubbles refer to bubbles that are several or several tens of microns in size. The surface of the microbubbles has weak negative charges in the water, which can adsorb substances such as fat and protein, so as to carry them away from the skin, hair and so on. When using microbubble water with microbubbles for bathing, a large number of microbubbles can penetrate into the root of hair and other parts of the hair that are difficult to clean, thus thoroughly remove the accumulated dirt such as sebum and grease.

In addition, the microbubble water also has a unique effect in terms of sterilization. Specifically, the sterilization process of the microbubble water includes an absorption process and an extermination process, the microbubbles carry static electricity, which can adsorb bacteria and viruses in the water. Then, as the bubbles burst, a large amount of free radicals are excited around the bubbles and the super high temperature and pressure generated by the burst exterminates the adsorbed bacterial virus. The above extermination process is a complete physical extermination process, which is essentially different from the conventional sterilization method, so that it is more environment-friendly and healthy as compared with the conventional chemical sterilization method.

In the water heater system according to the embodiment of the present application, by providing the tank 2 communicating with the heating unit 1 and the pressurizing device 3 capable of pressurizing the tank 2, in practice, the pressurizing device 3 cooperates with the tank 2 so that microbubble water can be prepared in the tank 2 and supplied to a user. At the same flow rate, the amount of water used can be effectively saved since the water supplied to the user is mixed with air. In addition, the microbubble water has better performance in terms of cleaning and physical sterilization compared with ordinary water, and therefore, the user experience is greatly improved.

Referring to FIG. 4, in one embodiment, a water supply pipe and a gas supply pipe are provided upstream of an inlet of the tank 2, and the inlet can communicate with the water supply pipe and/or the gas supply pipe, the pressurizing device 3 is in communication with the water supply pipe and/or the gas supply pipe.

In this embodiment, the number of the inlet of the tank 2 may be one, and a water supply pipe and a gas supply pipe that can communicate with the inlet are provided upstream of the inlet. When the inlet is in communication with the gas supply pipe, the gas supply pipe can fill the tank 2 with gas. Generally, the gas may be air, although the gas is not limited to air, and the present application is not particularly limited herein. When the inlet is in communication with the water supply pipe, the water supply pipe can fill the tank 2 with water. In the present embodiment, the pressurizing device 3 may communicate with at least one of the water supply pipe and the gas supply pipe.

Referring to FIG. 1 or FIG. 2, in a specific embodiment, the pressurizing device 3 can communicate with the water supply pipe, and the pressurizing device 3 may be a water pump.

In this embodiment, when the pressurizing device 3 communicates with the water supply pipe, the pressurizing device 3 may be specifically a water pump. When the water pump is in operation, the water pump may pressurize the water flowing therethrough, and may also pressurize the tank 2 in communication therewith. That is, when the tank 2 is producing microbubble water, the water pump can provide the pressure required for mixing gas and water. In addition, the water pump may also serve as a power device for water circulation of the water heater system.

Generally, a water pump may be provided in the water heater system to provide power for water circulation. In this embodiment, when the pressurizing device 3 is a water pump, it can utilize an existing water pump in the water heater system without adding the pressurizing device 3 separately, thereby saving cost and space of the entire water heater system, and optimizing the product structure.

In one embodiment, the pressurizing device 3 may be a water pump in communication with the heating device and the tank 2, the water pump comprises a first water pump and a second water pump which is connected in series or in parallel with the first water pump.

In this embodiment, the specific form of the pressurizing device 3 may be a water pump, which communicates with the heating device and the tank 2. Specifically, the number of the water pumps may be 2 or more, and the present application is not particularly limited herein. For example, the water pump may include a first water pump and a second water pump, and the first water pump and the second water pump may be connected in parallel or in series.

When the pressure required by the water heater system is large, the first water pump and the second water pump may be selectively connected in series. The pressure which can be provided when the first water pump and the second water pump are connected in series is greatly increased with respect to the pressure which can be provided by a single water pump, so that the pressure demand of the water heater system can be met.

When the required flow rate of the water heater system is large, the first water pump and the second water pump may be selectively connected in parallel. When the first water pump and the second water pump are connected in parallel, a relatively large amount of flow can be provided with respect to that of a single water pump, so that the flow demand of the water heater system can be met.

In addition, in general, the water heater system needs to be provided in a casing, and two small water pumps can flexibly utilize the scattered space in the casing having limited space. In addition, the overall occupied space of the water heater system can also be reduced to a certain extent.

Referring to FIG. 4, in a specific embodiment, the pressurizing device 3 communicates with the gas supply pipe, and the pressurizing device 3 is an air pump.

In this embodiment, when the pressurizing device 3 communicates with the gas supply pipe, the pressurizing device 3 may be specifically an air pump. When the air pump is turned on, the air pump may pressurize the air flowing therethrough, and may also pressurize the tank 2 in communication therewith, i.e., when the tank 2 is producing microbubble water, the air pump can provide a pressure required for mixing gas and water.

In one embodiment, the water heater system may further comprise a pressure regulating device 4 arranged downstream of the tank 2.

In the present embodiment, the pressure regulating device 4 is used to maintain the pressure between the tank 2 and the pressure regulating device 4 within a predetermined range. Specifically, the pressure regulating device 4 may be in the form of one of pressure regulating valves, such as a self-operated pressure regulating valve. It can also be a hydraulic pressure control valve, such as a relief valve. It can also be an electronic expansion valve, a thermal expansion valve, etc., whose pressure can be controlled, or other forms, and the present application is not particularly limited herein.

In a specific embodiment, the pressure regulating device 4 is capable of maintaining the pressure between the tank 2 and the pressure regulating device 4 above 0.1 MPa when the pressurizing device 3 is on.

In the present embodiment, the pressure regulating device 4 provided downstream of the tank 2 can control the pressure between the tank 2 and the pressure regulating device 4 within a predetermined pressure range when the pressurizing device 3 is on. Specifically, the control principle of the pressure regulating device 4 may be different depending on the specific structure of the pressure regulating device 4, and the present application is not particularly limited herein.

The predetermined pressure range may be 0.1 MPa or more. When the pressure between the tank 2 and the pressure regulating device 4 is controlled to be 0.1 MPa or more by the pressure regulating device 4, the pressure can facilitate the generation and maintenance of the generated micro bubbles. Specifically, on the one hand, when the pressure is above 0.1 MPa, it is advantageous for more air to be dissolved in water to form microbubble water having a higher solubility, and on the other hand, when the microbubble water flows in the pipeline, the state of the microbubble water is maintained, and the bubble in the water is prevented from gradually becoming large.

Of course, the range of the predetermined pressure is not limited to the above list, and the person skilled in the art may make other changes under the inspiration of the technical essence of the application, and shall be covered by the scope of this application as long as the functions and effects achieved are the same or similar to the present application.

In a particular embodiment, the pressure regulating device 4 has opposite inlet and outlet ends, the interior of which is provided with a pressure regulating mechanism such that the pressure at the inlet end is greater than the pressure at the outlet end.

When the relatively high-pressure gas-liquid mixture flows through the pressure regulating device 4, the pressure of the gas-liquid mixture is rapidly reduced under the regulation of the pressure regulating device 4, so that the gas volume in the gas-liquid mixture becomes large, the formed microbubbles are mixed in the water, that is, microbubble water.

Specifically, the pressure regulating device 4 is formed with at least a throttle mechanism whose flow cross-sectional area is stepwise or abruptly changed in the direction of fluid flow, that is, the pressure regulating mechanism may be a throttle structure. By using the throttle mechanism, the pressure can be rapidly reduced and the air can be released.

Referring to FIG. 5A, for example, in the direction of fluid flow, at least one variable aperture structure is provided, and the pressure regulating device 4 comprises a hollow tube in which at least one throttle member is disposed. The throttle member may be a structure having an aperture smaller than the inner diameter of the pipe. In addition, that flow hole may be sequentially opened in order along the fluid flow direction in the throttle plate, so that the flow cross-sectional area is gradually increased along the fluid flow direction as a whole. When the fluid flows through the throttle mechanism, since the flow cross-sectional area suddenly decreases, the pressure of the fluid increases accordingly, so that the function of maintaining the pressure can be realized.

Referring to FIG. 5B, the pressure regulating device 4 may be further provided with a back-pressure spring or other throttle mechanism with varying flow cross-sectional area, and the application is not particularly limited herein. Those skilled in the art may make other changes under the technical essence of this application, and shall be covered by the scope of this application as long as the functions and effects achieved are the same or similar to the present application.

Referring to FIG. 6, in one embodiment, the heating unit 1 may include an inner container 11 capable of storing water, and a heating member 13 for heating water contained in the inner container 11. The pressurizing device 3 is a water pump, which communicates with the inner container 11 and the tank 2. The water pump can drive water to flow into the tank 2 and provide the tank 2 with a pressure required for mixing water and gas. A pressure regulating device 4 is arranged downstream of the tank 2.

In the present embodiment, the water heater system may be applied to a water heater provided with an inner container 11. Specifically, the heating unit 1 may include an inner container 11 and a heating member 13. The inner container 11 can be used for storing water. Specifically, the inner container 11 may be a hollow cylindrical housing as a whole, of course, it may have other forms, and the present application is not particularly limited herein. The arrangement of the inner container 11 may be horizontal or vertical, and the present application is not particularly limited herein.

The type and arrangement of the heating element 13 may be different depending on the type of the water heater. For example, when the water heater is an electric water heater, the heating member 13 may be an electric heating rod. The electric heating rod can be fixed on the wall of the inner container 11 at one end and extend into the inner container 11 at the other end to heat the water in the inner container 11. When the water heater is a heat pump water heater, the heating member 13 may be a heat exchanger provided on the inner container 11. For example, the heat exchanger may be wrapped around the outer wall of the inner container 11, and high temperature and high-pressure refrigerant flows through the heat exchanger. When the high temperature and high-pressure refrigerant flows through the heat exchanger, heat can be transferred to the water in the inner container 11.

In this embodiment, the pressurizing device 3 may be a water pump, and the water pump communicates with the inner container 11 and the tank 2. The water pump can both drive the flow of water into the tank 2 and also provide the tank 2 with the pressure required for mixing water and gas.

In this embodiment, the water heater system may further be provided with a detection unit electrically communicated with a control device. The detection unit is configured to send the start signal to the control device after detecting the start signal, and the start of the water pump is controlled by the control device.

Specifically, the detection unit may be at least one of a flow switch, a pressure switch, or a temperature probe. For example, when the detection unit is a flow switch, an electrical signal may be transmitted to the control device if the flow detected by the flow switch is greater than a predetermined value. When the detection unit is a pressure switch, a control signal may be issued to the control device if the pressure fluctuation detected by the pressure switch is greater than a predetermined value. When the detection unit is a temperature probe, an electrical signal may be transmitted to the control device if the temperature detected by the temperature probe is greater than a predetermined value. Of course, the detection unit is not limited to the above examples, and the conditions for starting the operation of the water pump are not limited to the manner detected by the detection unit described above. Other changes may be made, and shall be covered by the scope of this application as long as the functions and effects achieved are the same or similar to the present application.

In this embodiment, a water heater provided with an inner container 11, such as an electric water heater, a heat pump water heater and the like with an inner container, may be provided with a pressure regulating device 4 downstream of the tank 2.

In the present embodiment, the pressure regulating device 4 is used to maintain the pressure between the tank 2 and the pressure regulating device 4 within a predetermined range. Specifically, the pressure regulating device 4 may be in the form of one of pressure regulating valves, such as a self-operated pressure regulating valve. It can also be a hydraulic pressure control valve, such as a relief valve. It can also be an electronic expansion valve, a thermal expansion valve, etc., whose pressure can be controlled, or other forms, and the present application is not particularly limited herein.

In the present embodiment, when the water pump 2 is turned on, the pressure regulating device 4 provided downstream of the tank 2 can control the pressure between the tank 2 and the pressure regulating device 4 within a predetermined pressure range. Specifically, the control principle of the pressure regulating device 4 may be different depending on the specific structure of the pressure regulating device 4, and the present application is not particularly limited herein.

The inner container 11 is a pressure-bearing inner container, and the pressure of the inner container 11 is between 0.1 MPa and 0.8 MPa. In this embodiment, since the inner container 11 communicates with the water pump, the inner container 11 is influenced by the water pump 2 and is subjected to a certain pressure. In addition, due to the change of the water temperature in the inner container 11, the effect of thermal expansion and contraction also requires the inner container 11 to have a certain pressure-bearing capacity. In summary, the inner container 11 in communication with the water pump 2 is subjected to a predetermined pressure during use. Specifically, the pressure may range from 0.1 MPa to 0.8 MPa. For example, when the water pump 2 is located downstream of the inner container 11, the pressure range of the inner container 11 may be relatively small. When the water pump 2 is located upstream of the inner container 11, since the microbubble water output from the water pump 2 flows through the inner container 11, the range of the pressure may be relatively large to maintain the required pressure of the microbubble water.

In the present embodiment, when the water in the inner container 11 is heated by the heating member 13, the pressure in the inner container 11 also increases as the temperature increases based on the principle of thermal expansion and contraction. For example, when the tank 2 is located downstream of the inner container 11 and the tank 2 is in a state where microbubble water is prepared, water having a higher pressure flows out of the inner container 11 to be supplied to the tank 2, it is quickly mixed with the air in the tank 2 to form microbubble water. On the other hand, after the water in the inner container 11 is heated, the pressure in the inner container 11 is increased, which means that a pre-load is formed in the inner container 11 before the pressurizing device 3 is turned on. Since the pre-load can provide the required pressure for the mixing of the gas and water in the tank 2, when the pressurizer 3 is activated and the user opens the water terminal, it is only required to discharge the water existing in the pipe from the tank 2 to the water terminal. The ideal microbubble water can be obtained, the time for obtaining the microbubble water is significantly reduced, and the user experience is improved.

Referring to FIG. 6, in one embodiment, the inner container 11 is provided with an inlet pipe 111 for water inflow and an outlet pipe 112 for water outflow. The water pump is disposed upstream of the inlet pipe 111, and the tank 2 is disposed downstream of the outlet pipe 112.

In this embodiment, the inner container 11 is provided with an inlet pipe 111 for water inflow and an outlet pipe 112 for water outflow. The room-temperature water supplied from the water supply pipe may enter the inner container 11 through the inlet pipe 111 and be heated, and then the heated water may flow out of the outlet pipe 112.

In this embodiment, the water pump 2 may be disposed upstream of the water inlet pipe 111 of the inner container 11. When the water pump 2 is disposed upstream of the water inlet pipe 111 of the inner container 11, the heated water in the inner container 11 does not flow through the water pump 2. Instead, the water flowing through the water pump 2 is water at room temperature, which is supplied from the water supply pipe. Therefore, there is no requirement for high temperature resistance of the water pump 2. In addition, since the water flowing through the water pump 2 is at room temperature, the calcium and magnesium plasma in the water does not easily precipitate, so that the inside of the water is not easily scaled.

In the present embodiment, the tank 2 may be disposed downstream of the outlet pipe 112. When the tank 2 is disposed downstream of the water outlet pipe 112, the microbubble water flowing out of the tank 2 can be directly supplied to the user's water terminal after passing through the pressure regulating device 4. Specifically, when the tank 2 is disposed downstream of the water outlet pipe 112, the microbubble water flowing out of the tank 2 does not flow through the inner container 11, so that the user can obtain the microbubble water in a short time. On the other hand, it is also possible to prevent the microbubble water from being diluted by the water stored in the inner container 11 or heated by the heating member 13 after entering the inner container 11, causing temperature rise fluctuation interference.

Referring to FIGS. 7 to 9, in one embodiment, the inner container 11 is provided with an inlet pipe 111 for water inflow and an outlet pipe 112 for water outflow; The water heater system further comprises a temperature regulating device 5 arranged between the outlet pipe 112 and the pressure regulating device 4 or on the outlet pipe 112.

In this embodiment, the inner container 11 is provided with an inlet pipe 111 for water inflow and an outlet pipe 112 for water outflow. The room-temperature water supplied from the water supply pipe may enter the inner container 11 through the inlet pipe 111 and be heated, and then the heated water may flow out of the outlet pipe 112.

In the present embodiment, the heating unit 1 may further comprise a temperature regulating device 5, which may be used to regulate the water temperature flowing into or out of the tank 2. Specifically, the temperature regulating device 5 may be a mechanical temperature regulating device 5, which can adjust the temperature manually. It may be an electronic temperature regulating device 5, which may automatically adjust the temperature according to a control program of the control device. The temperature setting range of the temperature regulating device 5 may be fixed or adjustable. Specifically, when the temperature setting range of the temperature regulating device 5 is fixed, the outflow temperature of the water is fixed within the setting range. When the temperature setting range of the temperature regulating device 5 is adjustable, the outflow temperature can be adjusted as needed. Specifically, the temperature regulating device 5 may be in the form of a water mixing valve, a thermostatic valve, etc., or a thermostatic water outlet structure provided on the water outlet pipe 112 of the inner container 11. Of course, the form of the temperature regulating device 5 is not limited to the above list, and the person skilled in the art may make other changes under the spirit of the present application, and shall be covered by the scope of this application as long as the functions and effects achieved are the same or similar to the present application.

In the present embodiment, the temperature regulating device 5 may be provided between the outlet pipe 112 and the pressure regulating device 4 or on the outlet pipe 112 for regulating the water temperature flowing into or out of the tank 2 so that the water temperature becomes close to an outlet water temperature set by the user. When the water flowing into the tank 2 approaches the temperature set by the user, the microbubble water obtained by mixing the water and the gas at this temperature also approaches the user's set temperature. At this time, no or only a small amount of cold water is required to be added into the microbubble water to reach the outlet water temperature set by the user. When no or a small amount of cold water is added to the microbubble water, the content of the microbubbles in the microbubble water can be better ensured, and the user can obtain the microbubble water with a higher concentration. Similarly, when the microbubble water flowing out of the tank 2 approaches the user's set temperature, no or only a small amount of cold water is required to be added into the microbubble water to reach the outlet water temperature set by the user. When no or a small amount of cold water is added to the microbubble water, the content of the microbubbles in the microbubble water can be better ensured, and the user can obtain the microbubble water with a higher concentration.

Referring to FIG. 7, in one embodiment, the temperature regulating device 5 may be disposed on the outlet pipe. Specifically, the temperature regulating device 5 may be a thermostat structure disposed on the outlet pipe 112, and the thermostat structure can automatically adjust the outlet temperature of the outlet pipe 112. When the tank 2 is located downstream of the temperature regulating device 5, it is possible to ensure that the water entering the tank 2 from the outlet pipe 112 is within a predetermined range to approach the user's set outlet water temperature.

Referring to FIG. 8, in a specific embodiment, the water heater system may further include a cold water pipe 15 communicating with the inlet pipe 111, the tank 2 being disposed downstream of the outlet pipe 112, The temperature regulating device 5 is disposed between the outlet pipe 112 and the tank 2, and includes a first port communicating with the outlet pipe 112, a second port communicating with the cold water pipe 15, and a third port communicating with the tank 2.

In the present embodiment, the water pump may be disposed upstream of the water inlet pipe 111. When the water pump 2 is disposed upstream of the water inlet pipe 111 of the inner container 11, the heated water in the inner container 11 does not flow through the water pump 2. Instead, the water flowing through the water pump 2 is room temperature water supplied from the water supply pipe. Therefore, there is no requirement for high temperature resistance of the water pump 2. In addition, since the water flowing through the water pump 2 is at room temperature, the calcium and magnesium plasma in the water does not easily precipitate, so that the inside of the water is not easily scaled.

When the tank 2 is disposed downstream of the water outlet pipe 112, the microbubble water flowing out of the tank 2 can be directly supplied to the user's water terminal after passing through the pressure regulating device 4. Specifically, when the tank 2 is disposed downstream of the water outlet pipe 112, the microbubble water flowing out of the tank 2 does not flow through the inner container 11, so that the user can obtain the microbubble water in a short time. On the other hand, it is also possible to prevent the microbubble water from being diluted by the water stored in the inner container 11 or heated by the heating member 13 after entering the inner container 11, thereby causing temperature fluctuation interference of the temperature rise.

The water heater system further includes a cold-water pipe 15 communicating with the water inlet pipe 111. When the water pump is started, the cold-water pipe 15 communicating with the water inlet pipe 111 circulates the cold water flowing from the water inlet. The temperature regulating device 5 is disposed on a pipe between the outlet pipe 112 and the tank 2. Specifically, the temperature regulating device 5 may include a first port communicating with the outlet pipe 112, a second port communicating with the cold-water pipe 15, and a third port communicating with the tank 2. The water outlet pipe 111 may supply the hot water heated by the heating unit 1 to the temperature regulating device 5 through the first port. The cold-water pipe 15 may supply to the temperature regulating device 5 through the second port the cold water flowing in from the water inlet. When the temperature of the hot water flowing out from the water outlet pipe 111 is too high, the cold water may be mixed into the hot water to obtain water close to the water temperature set by the user after mixing. The third port is a water outlet for allowing the water mixed by the temperature regulating device 5 flow into the tank 2 at a temperature close to a temperature set by a user.

Specifically, at least one of the first port and the second port may be a port whose opening degree can be adjusted. The temperature regulating device 5 may be provided with a temperature sensing unit, and when the temperature of the water sensed by the temperature sensing unit exceeds the set outlet water temperature by the user, the second port may be opened. By adjusting the opening degree of the second port or the opening degrees of the first port and the second port at the same time, the temperature of the water flowing into the tank 2 from the third port of the temperature regulating device 5 is close to the set outlet water temperature of the user. When the water flowing into the tank 2 approaches the user's set outlet temperature, the microbubble water obtained by mixing the water and the gas at this temperature also approaches the user's set temperature. At this time, no or a small amount of cold water is added into the microbubble water to reach the water outlet water temperature set by the user. When no or a small amount of cold water is added to the microbubble water, the content of the microbubbles in the microbubble water can be better ensured, and the user can obtain the microbubble water with a higher concentration.

Referring to FIG. 9, in a specific embodiment, the water heater system may further include a cold-water pipe 15 communicating with the inlet pipe, the tank 2 being disposed downstream of the outlet pipe 112. The temperature regulation device 5 is arranged between the tank 2 and the pressure regulation device 4, and comprises a first port communicating with the tank 2, a second port communicating with the cold-water pipe 15, and a third port communicating with the pressure regulating device 4.

In the present embodiment, the water pump may be disposed upstream of the water inlet pipe 111. When the water pump 2 is disposed upstream of the water inlet pipe 111 of the inner container 11, the heated water in the inner container 11 does not flow through the water pump 2. Instead, the water flowing through the water pump 2 is room temperature water supplied from the water supply pipe. Therefore, there is no requirement for high temperature resistance of the water pump 2. In addition, since the water flowing through the water pump 2 is at room temperature, the calcium and magnesium plasma in the water does not easily precipitate, so that the inside of the water is not easily scaled.

When the tank 2 is disposed downstream of the water outlet pipe 112, the microbubble water flowing out of the tank 2 can be directly supplied to the user's water terminal after passing through the pressure regulating device 4. Specifically, when the tank 2 is disposed downstream of the water outlet pipe 112, the microbubble water flowing out of the tank 2 does not flow through the inner container 11, so that the user can obtain the microbubble water in a short time. On the other hand, it is also possible to prevent the microbubble water from being diluted by the water stored in the inner container 11 or heated by the heating member 13 after entering the inner container 11, thereby causing temperature fluctuation interference of the temperature rise.

The water heater system further includes a cold-water pipe 15 communicating with the water inlet pipe 111. When the water pump is started, the cold-water pipe 15 communicating with the water inlet pipe 111 circulates the cold water flowing in from the water inlet. The temperature regulating device 5 is arranged between the tank 2 and the pressure regulating device 4. Specifically, the temperature regulating device 5 may include a first port communicating with the tank 2, a second port communicating with the cold-water pipe 15, and a third port communicating with the pressure regulating device 4. The tank 2 can supply microbubble water into the temperature regulating device 5 through the first port. The cold-water pipe 15 may supply the cold water flowing in from the water inlet to the temperature regulating device 5 through the second port. When the temperature of the microbubble water flowing out of the tank 2 is too high, the cold water can be mixed into the microbubble water to obtain water close to the outlet water temperature set by the user after mixing. The third port is a water outlet for discharging the water whose temperature mixed by the temperature regulating device 5 is close to the temperature set by the user, and the water is supplied to the user after passing through the pressure regulating device 4. Specifically, at least one of the first port and the second port may be a port whose opening degree can be adjusted. The temperature regulating device 5 may be provided with a temperature sensing unit, and when the temperature of the water sensed by the temperature sensing unit exceeds the set outlet water temperature by the user, the second port may be opened. By adjusting the opening degree of the second port or the opening degrees of the first port and the second port at the same time, the temperature of the water flowing out from the third port of the temperature regulating device 5 becomes close to the set outlet water temperature of the user.

In the present embodiment, when the microbubble water formed in the tank 2 is in the supersaturated state, for example, the concentration of the normal microbubble water is 5%, and in the supersaturated state, the concentration of the microbubbles is greater than 5%. Since the temperature regulating device 5 is located upstream of the pressure regulating device 4, the pressure in the temperature regulating device 5 can also reach the pressure required for the preparation of microbubble water under the maintenance of the pressure of the pressure regulating device 4. When cold water is added into the supersaturated microbubble water from the second port, the cold water may form new microbubble water with the excess bubbles in the microbubble water. The above process of secondary generation of microbubble water can not only ensure that the microbubble water supplied to the user terminal satisfies a predetermined concentration requirement, but also can improve the yield of the microbubble water under the same volume of gas.

Moreover, for air, as the temperature decreases, the solubility increases accordingly. When cold water is added into the saturated microbubble water from the second port, the temperature of the microbubble water can be lowered, thereby improving the solubility of air. At this time, excess air in the tank can be further dissolved in the microbubble water doped with cold water, and the solubility reduction phenomenon caused by the addition of the cold water into the microbubble water can be canceled or effectively reduced. The microbubble water supplied to the user terminal is guaranteed to meet a predetermined concentration requirement.

Referring to FIG. 10, in a specific embodiment, the water heater system may further include a cold-water pipe 15 communicating with the inlet pipe 111, and the tank 2 is disposed downstream of the outlet pipe 112. The temperature regulating device 5 is disposed between the outlet pipe 112 and the water pump, and includes a first port communicating with the outlet pipe 112, a second port communicating with the cold-water pipe 15, and a third port communicating with the water pump.

In the present embodiment, the water pump may be disposed downstream of the outlet pipe 112. When the water pump is disposed downstream of the water outlet pipe 112, the pressurized water supplied by the water pump may be directly supplied to the tank 2 without passing through the inner container 11. When the pressurized water supplied by the water pump does not pass through the inner container 11, the water pump can accurately control the pressure of the water flowing into the tank 2 to prevent the water from being disturbed by the pressure fluctuation of the inner container 11 when flowing through the inner container 11.

When the tank 2 is disposed downstream of the outlet pipe 112, the gas-liquid mixture flowing out of the tank 2 can be directly supplied to the user's water terminal after passing through the pressure regulating device 4. Specifically, when the tank 2 is disposed downstream of the water outlet pipe 112, the gas-liquid mixture flowing out of the tank 2 does not flow through the inner container 11, so that the user can obtain microbubble water in a short time. On the other hand, it is also possible to prevent the gas-liquid mixture from being diluted by the water stored in the inner container 11 or heated by the heating member 13 after entering the inner container 11, thereby causing temperature fluctuation interference of the temperature rise.

The water heater system further includes a cold-water pipe 15 communicating with the water inlet pipe 111. When the water pump is started, the cold-water pipe 15 communicating with the water inlet pipe 111 circulates the cold water flowing from the water inlet. The temperature regulating device 5 is disposed between the outlet pipe 112 and the water pump. Specifically, the temperature regulating device 5 may include a first port communicating with the outlet pipe 112, a second port communicating with the cold-water pipe 15, and a third port communicating with the water pump. The water outlet pipe 112 may supply the hot water heated by the heating unit 1 to the temperature regulating device 5 through the first port. The cold-water pipe 15 may supply to the temperature regulating device 5 through the second port the cold water flowing in from the water inlet. When the temperature of the hot water flowing out of the water outlet pipe 112 is too high, the cold water may be mixed into the hot water to obtain water close to the water temperature set by the user after mixing. The third port is a water outlet for allowing water mixed by the temperature regulating device 5 at a temperature close to a user set temperature flow into the water pump, pressurized by the water pump, and flow into the tank 2 located downstream of the water pump.

Specifically, at least one of the first port and the second port may be a port whose opening degree can be adjusted. The temperature regulating device 5 may be provided with a temperature sensing unit, and when the temperature of the water sensed by the temperature sensing unit exceeds the set outlet water temperature of the user, the second port may be opened. By adjusting the opening degree of the second port or the opening degrees of the first port and the second port at the same time, the temperature of the water flowing into the tank 2 from the third port of the temperature regulating device 5 becomes close to the set outlet water temperature by the user. When the water flowing into the tank 2 approaches the user's set outlet water temperature, the gas-liquid mixture obtained by mixing the water and the gas at this temperature also approaches the user's set temperature. In this case, no or a small amount of cold water is added into the gas-liquid mixture to reach the water outlet water temperature set by the user. When no or a small amount of cold water is added to the microbubble water, the content of the gas in the gas-liquid mixture can be better ensured, and the user can obtain the high concentration of the microbubble water.

In a specific application scenario, cold water entering from an inlet pipe may enter the water pump directly through the cold-water pipe 15 and be supplied to the tank 2 after being pressurized by the water pump. In the above case, the pressurized water supplied to the tank 2 for preparing the microbubble water is entirely supplied from the cold-water pipe 15, and the inner container 11 does not supply the hot water to the temperature regulating device. Further, in another case, the pressurized water supplied to the tank 2 for preparing the microbubble water may be entirely supplied from the inner container 11, at which time the cold-water pipe 15 does not feed the cold water to the temperature regulating device. That is, the pressurized water supplied to the tank 2 by the water pump is all hot water.

Referring to FIG. 11, in one embodiment, the inner container 11 is provided with an inlet pipe 111 for inlet water and an outlet pipe 112 for outlet water. The water pump and the tank 2 are disposed upstream of the inlet pipe 111, and the water pump is arranged upstream of the tank 2.

In this embodiment, the inner container 11 is provided with an inlet pipe 111 for inlet water and an outlet pipe 112 for outlet water. The room-temperature water supplied from the water supply pipe may enter the inner container 11 through the inlet pipe 111 and be heated, and then the heated water may flow out of the outlet pipe 112.

In this embodiment, the water pump 2 may be disposed upstream of the water inlet pipe 111 of the inner container 11. When the water pump 2 is disposed upstream of the water inlet pipe 111 of the inner container 11, the heated water in the inner container 11 does not flow through the water pump 2. Instead, the water flowing through the water pump 2 is room temperature water supplied from the water supply pipe. Therefore, there is no requirement for high temperature resistance of the water pump 2. In addition, since the water flowing through the water pump 2 is at room temperature, the calcium and magnesium plasma in the water does not easily precipitate, so that the inside of the water is not easily scaled.

In this embodiment, the tank 2 may also be disposed upstream of the inlet pipe 111 of the inner container 11 and downstream of the water pump. When the tank 2 is located between the water pump and the inlet pipe 111 of the inner container 11, the heated water in the inner container 11 does not flow through the tank 2. Instead, the water flowing through the tank 2 is room temperature water supplied from the water supply pipe. Therefore, there is no requirement for high temperature resistance for the tank 2. In addition, since the water flowing through the tank 2 is room temperature water, the calcium and magnesium plasma in the water does not easily precipitate, so that the inside of the water is not easily scaled.

Referring to FIG. 12, in one embodiment, the inner container 11 is provided with an inlet pipe 111 for inlet water and an outlet pipe 112 for outlet water. The water pump and the tank 2 are disposed downstream of the outlet pipe 112, and the water pump is arranged upstream of the tank 2.

In this embodiment, the inner container 11 is provided with an inlet pipe 111 for inlet water and an outlet pipe 112 for outlet water. The room-temperature water supplied from the water supply pipe may enter the inner container 11 through the inlet pipe 111 and be heated, and then the heated water may flow out of the outlet pipe 112.

In this embodiment, the water pump and the tank 2 may be disposed downstream of the water outlet pipe 112.

When the water pump is disposed downstream of the water outlet pipe 112, the pressurized water supplied by the water pump may be directly supplied to the tank 2 without passing through the inner container 11. When the pressurized water supplied by the water pump does not pass through the inner container 11, the water pump can accurately control the pressure of the water flowing into the tank 2 to prevent the water from being disturbed by the pressure fluctuation in the inner container 11 when flowing through the inner container 11.

When the tank 2 is disposed downstream of the outlet pipe 112, the gas-liquid mixture flowing out of the tank 2 can release pressure after passing through the pressure regulating device 4 to form microbubble water to be directly supplied to the user's water terminal. Specifically, when the tank 2 is disposed downstream of the water outlet pipe 112, the gas-liquid mixture flowing out of the tank 2 does not flow through the inner container 11, so that the user can obtain microbubble water in a short time. On the other hand, it is also possible to prevent the gas-liquid mixture from being diluted by the water stored in the inner container 11 or heated by the heating member 13 after entering the inner container 11, thereby causing temperature fluctuation interference of the temperature rise.

Referring to FIG. 13, in one embodiment, the inner container 11 is provided with an inlet pipe 111 for inlet water and an outlet pipe 112 for outlet water, and the water pump is disposed in the inner container 11, and the tank 2 is disposed downstream of the outlet pipe 112.

In this embodiment, the inner container 11 is provided with an inlet pipe 111 for inlet water and an outlet pipe 112 for outlet water. The room-temperature water supplied from the water supply pipe may enter the inner container 11 through the inlet pipe 111 and be heated, and then the heated water may flow out of the outlet pipe 112.

In the present embodiment, the water pump may be disposed in the inner container 11, and the tank 2 may be disposed downstream of the water outlet pipe 112.

When the water pump is disposed in the inner container 11, the volume of the water heater system may be reduced, the occupied space required for the water heater system may be reduced, and the miniaturization of the structure may be facilitated. Specifically, the water pump may be disposed on the outlet pipe of the inner container 11. When the water pump is located on the water outlet pipe 112, it can draw hot water heated in the inner container 11 into the water outlet pipe 112, increasing the rate at which the hot water in the inner container 11 flows into the water outlet pipe 112.

When the tank 2 is disposed downstream of the outlet pipe 112, the gas-liquid mixture flowing out of the tank 2 can release pressure after passing through the pressure regulating device 4 to form microbubble water to be directly supplied to the user's water terminal. Specifically, when the tank 2 is disposed downstream of the water outlet pipe 112, the gas-liquid mixture flowing out of the tank 2 does not flow through the inner container 11, so that the user can obtain microbubble water in a short time. On the other hand, it is also possible to prevent the microbubble water from being diluted by the water stored in the inner container 11 or heated by the heating member 13 after entering the inner container 11, thereby causing temperature fluctuation interference of the temperature rise.

Referring to FIG. 14, in one embodiment, the inner container 11 is provided with an inlet pipe 111 for inlet water and an outlet pipe 112 for outlet water. Both the water pump and the tank 2 are arranged in the inner container 11. The water pump is arranged upstream of the tank 2, and the gas-liquid mixed water in the tank 2 can flow out of the inner container 11 through the water outlet pipe 112.

In this embodiment, the inner container 11 is provided with an inlet pipe 111 for inlet water and an outlet pipe 112 for outlet water. The room-temperature water supplied from the water supply pipe may enter the inner container 11 through the inlet pipe 111 and be heated, and then the heated water may flow out of the outlet pipe 112.

In this embodiment, both the water pump and the tank 2 may be disposed in the inner container 11.

When the water pump is disposed in the inner container 11, the volume of the water heater system may be reduced, the occupied space required for the water heater system may be reduced, and the miniaturization of the structure may be facilitated. Specifically, the water pump may be disposed on the outlet pipe of the inner container 11. When the water pump is located on the water outlet pipe, it can draw the heated hot water in the inner container 11 into the water outlet pipe, increasing the flow rate at which the hot water in the inner container 11 flows into the water outlet pipe.

When the tank 2 is also disposed in the inner container 11, the volume of the water heater system can be further reduced, the occupied space required for the water heater system is reduced, and the miniaturization of the structure is facilitated. In particular, the tank 2 may be arranged on the outlet pipe and downstream of the water pump. For example, the number of the inlets of the tank 2 may be two. One of the inlets may be used for inlet water. Another inlet may be used for gas intake. The inlet for gas intake may be provided with a duct 24 which extends into the interior of the tank 2 in order to supply the gas required for the preparation of microbubble water into the tank 2.

Referring to FIG. 15, in one embodiment, the inner container 11 is provided with an inlet pipe 111 for inlet water and an outlet pipe 112 for outlet water. The tank 2 is disposed inside the inner container 11, and the water pump is disposed upstream of the inlet pipe 111.

In this embodiment, the inner container 11 is provided with an inlet pipe 111 for inlet water and an outlet pipe 112 for outlet water. The room-temperature water supplied from the water supply pipe may enter the inner container 11 through the inlet pipe 111 and be heated, and then the heated water may flow out of the outlet pipe 112.

In this embodiment, the tank 2 is disposed inside the inner container 11, and the water pump is disposed upstream of the water inlet pipe 111.

When the tank 2 is disposed in the inner container 11, the volume of the water heater system can be further reduced, the occupied space required for the water heater system is reduced, and the miniaturization of the structure is facilitated. Specifically, the inlet of the tank 2 is connected to the outlet pipe and is located downstream of the water pump. For example, the number of the inlets of the tank 2 may be two. One of the inlets is connected to the outlet pipe for inlet water. Another inlet may be used for gas intake. The inlet for gas intake may be provided with a duct 24 which extends into the interior of the tank 2 in order to supply the gas required for the generation of microbubble water into the tank 2.

In this embodiment, the water pump 2 may be disposed upstream of the water inlet pipe 111 of the inner container 11. When the water pump 2 is disposed upstream of the water inlet pipe 111 of the inner container 11, the heated water in the inner container 11 does not flow through the water pump 2. Instead, the water flowing through the water pump 2 is room temperature water supplied from the water supply pipe. Therefore, there is no requirement for high temperature resistance of the water pump 2. In addition, since the water flowing through the water pump 2 is at room temperature, the calcium and magnesium plasma in the water does not easily precipitate, so that the inside of the water is not easily scaled.

Referring to FIG. 16, in one embodiment, the inner container 11 includes first and second opposite ends, and an end cap is disposed adjacent to the first end or the second end, the end cap cooperates with a first end or a second end of the inner container 11 to form the tank 2.

In this embodiment, the inner container 11 may be a hollow cylinder as a whole, of course, it may have other forms, and the present application is not particularly limited herein. The inner container 11 has a first end and a second end as two opposite ends. Generally, at least one of the first end and the second end of the inner container 11 has an arc rather than a flat structure.

In the present embodiment, an end cap may be provided near the first end or the second end having an arc structure. The end cap cooperates with the first end or the second end of the inner container 11 to form the structure of the tank 2. Since a part of the side wall of the tank 2 is formed by utilizing the end face of the inner container 11 having an arc shape, the space outside the end face having the arc shape is effectively utilized, that is, a scattered space which cannot be used is utilized for accommodating the tank 2. This is helpful to the reduction of the volume of the water heater system, the compact structure and the miniaturization of the water heater system.

Referring to FIG. 17, in one embodiment, the inner container 11 includes a first end and a second end opposite to each other. The first end or the second end has a concave surface, and an end cap is disposed facing the concave surface. The end cap cooperates with the concave surface to form the tank 2.

In this embodiment, the inner container 11 may be a hollow cylinder as a whole, of course, it may have other shapes, and the present application is not particularly limited herein. The inner container 11 has a first end and a second end as two opposite ends. At least one of the first end and the second end of the inner container 11 has a concave surface rather than a flat surface.

In that present embodiment, an end cap may be provided at a position facing the concave surface using the inner concave surface. The end cap cooperates with the concave surface to form the tank 2. Because a part of the side wall of the tank 2 is formed with the end face having the concave surface of the inner container 11, that is, the tank 2 is provided by using the scattered space outside the concave surface which cannot be used conventionally, it facilitates the reduction of the volume of the water heater system and a compact and miniaturized structure.

Referring to FIG. 18, in one embodiment, the inner container 11 includes opposing first and second ends, the first end or the second end has a concave surface. At least part of the outer wall surface of the tank 2 is fitted to the concave surface and disposed at the concave surface.

In this embodiment, the inner container 11 may be a hollow cylinder as a whole, of course, it may have other shapes, and the present application is not particularly limited herein. The inner container 11 has a first end and a second end as two opposite ends. At least one of the first end and the second end of the inner container 11 has a concave surface rather than a flat surface.

In the present embodiment, the tank 2 may be provided at the concave surface. At least part of the outer wall surface of the tank 2 is fitted to the concave surface and disposed at the concave surface. The curvature of at least a portion of the outer wall surface of the tank 2 may be the same as or close to the curvature of the concave surface. When the tank 2 is fixed to the end having the concave surface, they can coincide.

In this embodiment, the shape of the end cap may be set based on the shape of the concave surface of the end portion of the inner container 11 such that a part of the outer wall surface of the end cap is fitted with the concave surface. Because the side wall of the tank 2 is formed on the end surface of the inner container 11 having the concave surface, that is, the tank 2 is arranged by utilizing the scattered space outside the concave surface which cannot be used conventionally, it facilitates the reduction of the volume of the water heater system and a compact and miniaturized structure.

Referring to FIGS. 19 to 20, in one embodiment, the water heater system may further include a control device, and the number of tanks 2 is at least one. The tank 2 is provided with an inlet and an outlet. The water heater system has at least a first operating state enabling the tank 2 to provide microbubble water to the water terminal and a second operating state capable of draining and refilling gas in the tank 2. In the first operating state, the control device can control the inlet of the tank 2 to communicate with the water pump, and control the outlet of the tank 2 to communicate with the water terminal. In the second operating state, the control device can control the inlet of the tank 2 to communicate with the gas passage, and control the outlet of the tank 2 to communicate with the water outlet pipe.

In the present embodiment, the water heater system may be provided with a control device which may be used to control the connection states of the inlet and the outlet of the tank 2 to change the operation state of the water heater system.

In this embodiment, the number of the tanks 2 may be one. The tank 2 may be provided with an inlet and an outlet. A control valve may be provided at the inlet and outlet of the tank 2. The control valve may be electrically connected to the control device. The control device can control the operating state of the tank 2 by controlling the communication state of the control valve. In particular, the water heater system may have a first operating state in which the tank 2 is in a supply of microbubble water and a second operating state in which the gas in the tank 2 is drained and refilled.

As shown in FIG. 19, in the first operating state, the control device can control the inlet of the tank 2 to communicate with the water pump, and control the outlet of the tank 2 to communicate with the water terminal. At this time, the user can use water, and the water pump provides power for the microbubble water flow to flow to the user water terminal for use by the user.

When the microbubble water in the tank 2 is used up or nearly used up, the microbubble water can be newly prepared in the tank 2 using a period during which the user does not use water.

As shown in FIG. 20, the control device controls the tank 2 to drain and refill. Specifically, the inlet of the tank 2 is controlled to communicate with the gas passage, and the outlet thereof is controlled to communicate with the water outlet pipe to refill the tank 2 with gas. When the pressurized water enters the tank 2, it may be mixed with the gas in the tank 2 to regenerate microbubble water.

Referring to FIG. 21, in one embodiment, the tank 2 further includes a first tank 2a and a second tank 2b connected in parallel. The second tank 2a is provided with an inlet and an outlet.

The water heater system has a first operating state enabling the first tank 2a to provide microbubble water to the water terminal and a second operating state capable of draining the first tank 2a and refilling with gas. There is also a third operating state in which the second tank 2b can supply microbubble water to the water terminal and a fourth operating state in which the second tank 2b can be drained and refilled with gas.

In the first operating state, the control device can control the inlet of the first tank 2a to communicate with the water pump, and control the outlet of the first tank 2a to communicate with the water terminal. In the second operating state, the control device can control the inlet of the first tank 2a to communicate with the gas passage, and control the outlet of the first tank 2a to communicate with the drain pipe.

In the third operating state, the control device can control the inlet of the second tank 2b to communicate with the water pump, and control the outlet of the second tank 2b to communicate with the water terminal. In the fourth operating state, the control device can control the inlet of the second tank 2b to communicate with the gas passage, and control the outlet of the second tank 2b to communicate with the water outlet pipe.

In this embodiment, the number of the tanks 2 may be two or more, and the present application is not particularly limited herein. For example, the number of the tanks 2 may be two, and includes a first tank 2a and a second tank 2b. The detailed arrangement and control principle of the first tank 2a can refer to the description in the above embodiments, and will be not repeated here. Further, the specific arrangement and control principle of the second tank 2b is similar to that of the first tank 2a, and reference can also be made to the above-described embodiments.

Referring to FIG. 21 to FIG. 22, the water heater system may further include a control valve 6 electrically connected to the control device. The control device, according to a first predetermined signal, controls the control valve 6 to switch the water heater system to a first operating state and a fourth operating state, or controls the water heater system to switch to a second operating state and a third operating state.

In the present embodiment, the water heater system may include a control valve 6 electrically connected to the control device. The control valve 6 may be disposed at the inlet and outlet of the tank 2. The control device may control the communication state of the control valve 6 according to the first predetermined signal, and switch the operation state of the water heater system.

Specifically, the first predetermined signal may be at least one of a timing signal, a flow rate signal obtained by the detection unit, a fluid level signal in the tank 2, and a concentration signal of gas in the gas-liquid mixture. Of course, the first predetermined signal may be in other forms, and the present application is not particularly limited herein.

For example, when the first predetermined signal is a timing signal, the volume of the remaining microbubble water in the tank can be estimated by counting the time when the user starts using water. When the microbubble water in one tank is nearly used up, the control valve 6 is switched to use the other tank. As shown in FIG. 21 or 22, when one tank is in use, the other tank may be in a state where the other tank is drained and refilled with gas, so that microbubble water can be continuously supplied to the user by switching between the two tanks.

For example, when the first predetermined signal is a flow rate signal obtained by the detection unit, the principle of its control is similar to that of timing. A flow rate detection unit may be provided on the main path through which the water flows for detecting a flow rate signal. The time shall be counted when the user starts to use water, and the fluid level in the tank shall be determined according to the relationship between time and flow rate. When the water level in one tank reaches a predetermined level, for example close to running out, the control valve 6 is switched to use the other tank. When one tank is in use, the other tank may be in a state where the other tank is drained and refilled with gas, so that the microbubble water can be continuously supplied to the user by switching between the two tanks.

Referring to FIG. 23, in a specific embodiment, the control valve 6 includes a first four-way valve and a second four-way valve, and the first tank 2a and the second tank 2b are each provided with an inlet and an outlet. The first port of the first four-way valve communicates with the outlet pipe of the inner container 11, the second port of the first four-way valve communicates with the inlet of the first tank 2a, the third port of the first four-way valve communicates with the gas passage, and the fourth port of the first four-way valve communicates with the inlet of the second tank 2b. The first port of the second four-way valve communicates with the water terminal, the second port of the second four-way valve communicates with the outlet of the first tank 2a, the third port of the second four-way valve communicates with the water outlet pipe, and the fourth port of the second four-way valve communicates with the outlet of the second tank 2b. The control device, according to a first predetermined signal, controls the first port and the second port of the first four-way valve to communicate with each other and controls the first port and the second port of the second four-way valve to communicate with each other, and meanwhile controls the third port and the fourth port of the first four-way valve to communicate with each other and controls the third port and the fourth port of the second four-way valve to communicate with each other. Or the control device, according to the first predetermined signal, controls the first port and the fourth port of the first four-way valve to communicate with each other and controls the first port and the fourth port of the second four-way valve to communicate with each other, and meanwhile controls the second port and the third port of the first four-way valve to communicate with each other and controls the second port and the third port of the second four-way valve to communicate with each other.

In the present embodiment, the control valve 6 may include a first four-way valve and a second four-way valve, and the first tank 2a and the second tank 2b continuously supply microbubble water to the user by means of the switch of the first four-way valve and the second four-way valve.

Specifically, as shown in FIG. 23, the first tank 2a may be in a water passing state, wherein its inlet is communicated with the water outlet pipe of the inner container 11 via the first four-way valve, and its outlet is communicated with the pressure regulating device 4 via the second four-way valve. When the user turns on the water terminal, microbubble water is supplied to the user through the first tank 2a. At this time, the inlet of the second tank 2b communicates with the air inlet, and the outlet of the second tank 2b communicates with the water outlet, and thereby is in a state of draining the tank and refilling gas.

When the water in the second tank 2b is drained, that is, when the gas is filled, the inlet and the outlet of the second tank 2b can be closed.

Further, an inlet of the second tank 2b may be communicated with an outlet pipe of the inner container 11 such that pressurized water enters the second tank 2b through the inlet, and is then mixed with the gas in the second tank 2b to form a gas-liquid mixture.

When the volume of the microbubble water contained in the first tank 2a is smaller than a predetermined value, the outlet of the second tank 2b may be communicated with the pressure regulating device 4 via the second four-way valve. The second tank 2b is in a state of passing water at the same time, that is, the two tanks 2a and 2b supply water to the user terminal at the same time.

When the volume of the microbubble water in the first tank 2 becomes zero or close to zero, the first tank 2a may be closed, and water is supplied to the user terminal by the second tank 2b alone.

Further, the outlet of the first tank 2a may be communicated with a water outlet pipe to release the pressure in the first tank 2a while discharging the water in the tank.

When the second tank 2b is in a water passing state, the inlet of the first tank 2a may be communicated with the gas intake port to refill the gas required for gas-liquid mixing.

Further, the second tank 2b repeats the changing process of the first tank 2a, including: after the gas in the tank is filled, it is closed for a period of time; then, the inlet is communicated with the water outlet pipe of the inner container 11 via the first four-way valve to perform gas-liquid mixing to prepare microbubble water; then, when the volume of the microbubble water contained in the second tank 2b is smaller than a predetermined volume, the outlet of the first tank 2a communicates with the pressure regulating device 4 via the second four-way valve, thereby supplying the microbubble water to the user terminal; when the microbubble water contained in the second tank 2b has been used up or nearly used up, water may be supplied from the first tank 2a alone.

When the first tank 2a supplies water alone, the outlet of the second tank 2b may be communicated with a water outlet pipe via a second four-way valve to release the water and pressure in the second tank 2b. By repeating this process, the first tank 2a and the second tank 2b continuously supply water to the user terminal.

In the embodiment, the function of continuously supplying water to the user terminal by two parallel tanks is realized with two four-way valves, which is not only compact in structure, low in cost, but also simple and reliable in control. In addition, in that process of switching the first tank 2a and the second tank 2b, a state of water passing the first tank 2a and the second tank 2b at the same time is provided. In the above-mentioned switching mode, the switching between the two tanks can be smoothly transitioned so that the user can obtain a stable and comfortable water use experience as compared with a case where a tank through which water passes is directly switched to another tank for water passing.

Referring to FIGS. 24 to 25, in one embodiment, the water heater system may further include a bypass pipe 7 which is connected in parallel with the tank 2, and the bypass pipe 7 has opposite inlet and outlet ends, the water heater system has a fifth operating state. In the fifth operating state, the control device can control the inlet end of the bypass pipe 7 to communicate with the water pump according to a second predetermined signal so that water flows to the water terminal via the bypass pipe 7.

In the present embodiment, the water heater system may further be provided with a bypass pipe 7 connected in parallel with the tank 2 for supplying the water heated by the inner container 11 to the water terminal. Specifically, the bypass pipe 7 has opposite inlet and outlet ends, the inlet end of which can communicate with the outlet pipe of the inner container 11, and the outlet end of which can communicate with the water terminal.

In the present embodiment, the water heater system may further include a fifth operating state, which may be a state in which the water in the inner container 11 is supplied to the user via the bypass pipe 7. Upon receipt of the second predetermined signal, the control device may control the inlet end of the bypass pipe 7 to communicate with the water pump so that the water could flow to the water terminal via the bypass pipe 7. Specifically, the second predetermined signal may be at least one of a timing signal, a flow rate signal obtained by the detection unit, a fluid level signal of the tank 2, and a concentration signal of a gas in the gas-liquid mixture. In addition, the second predetermined signal may be a signal generated when a corresponding water terminal is turned on, or a signal generated according to the temporary setting of the user. Of course, the second predetermined signal may be in other forms, and the present application is not particularly limited herein.

In a specific embodiment, in the fifth operating state, the control device can control the inlet end of the bypass pipe 7 to communicate with the water pump, and control the outlet end of the bypass pipe 7 to communicate with the outlet pipe.

In the present embodiment, the water heater system may further include a fifth operating state, which may be a state in which the water in the inner container 11 is supplied to the user via the bypass pipe 7. When the water heater system needs to enter the fifth operation state, the control device may control the inlet end of the bypass pipe 7 to communicate with the water pump, control the outlet end of the bypass pipe 7 to communicate with the outlet pipe, such that the water flows to the water terminal via the bypass pipe 7.

Referring to FIG. 26, in a specific embodiment, the water heater system may further include a control valve 6 electrically connected to the control device. According to a detected second predetermined signal, the control device controls the control valve 6 to switch the water heater system to a first operating state or controls the water heater system to switch to a fifth operating state and a second operating state.

In this embodiment, the water heater system may further include a control valve 6 electrically connected to the control device, and the water supply switching between the tank 2 and the bypass pipe 7 is realized by controlling the ON/OFF state of the control valve 6.

When the control device receives the second predetermined signal, water could pass through the bypass pipe 7 or the tank 2 under the control on the control valve 6. Specifically, the second predetermined signal may be at least one of a timing signal, a flow rate signal obtained by the detection unit, a fluid level signal of the tank 2, and a concentration signal of a gas in the gas-liquid mixture. In addition, the second predetermined signal may be a signal generated when a corresponding water terminal is turned on, or a signal generated according to the temporary setting of the user. Of course, the second predetermined signal may be in other forms, and the present application is not particularly limited herein.

Specifically, as shown in FIG. 26, the bypass pipe 7 may be in a water passing state where water in the water heater system flows to the water terminal via the bypass pipe 7. At this point, the inlet of the tank 2 can communicate with the air inlet, and the outlet of the tank 2 can communicate with the water outlet pipe, having the tank 2 to transition to a state where its water is drained and gas is refilled. When the intake of air in the tank 2 is completed, the inlet and outlet of the tank 2 can be closed by the control valve 6. Further, the inlet of the tank 2 may be communicated with pressurized water so that the pressurized water could enter the tank 2 and be mixed with the gas in the tank 2 to form gas-liquid mixture.

After the preparation of the microbubble water in the tank 2 is completed, the outlet of the tank 2 can communicate with the water outlet pipe by the control valve 6, so that the tank 2 is in a water passing state.

When the tank 2 is in the water passing state, the bypass pipe 7 can be closed by the control valve 6.

When the volume of the microbubble water in the tank 2 is less than a predetermined volume, the bypass pipe 7 can be re-connected by the control valve 6 so that the water passes through the bypass pipe 7.

The tank 2 can then be closed by the control valve 6. Then, the outlet of the tank 2 communicates with the water outlet pipe by the control valve 6, thereby releasing the pressure and water in the tank 2. By repeating this process, the switching between the tank 2 and the bypass pipe 7 is realized.

In the present embodiment, the switching between the tank 2 and the bypass pipe 7 can be realized by the control valve 6, the user can obtain microbubble water when water passes through the tank 2, and the user can obtain normal hot water when water passes through the bypass pipe 7. The user can choose to use microbubble water to achieve ideal cleaning for example when taking a shower or washing vegetables and fruits by letting water pass through the tank 2, or otherwise choose to use ordinary water when the cleaning function of the water is not required, according to the need.

In one embodiment, the heating unit 1 is provided with a water inlet for water inflow and a water outlet for water outflow. The pressurizing device 3 is a water pump which is arranged upstream of the water inlet. The tank 2 is arranged downstream of the water outlet.

In the present embodiment, the heating unit 1 can be used for heating water. The form of the heating unit 1 may be different according to the specific type of the water heater, and is not particularly limited in this application. For example, when the water heater is an electric water heater, the heating unit 1 may include an inner container and an electric heating rod in the inner container. When the water heater is a gas water heater, the heating unit 1 may include a burner and a heat exchanger.

The heating unit 1 is provided with a water inlet for water inflow and a water outlet for water outflow. Room-temperature water supplied from the water supply pipe may enter the heating unit 1 through the water inlet and be heated, and then the heated water may flow out from the water outlet.

In the present embodiment, the water pump may be provided upstream of the heating unit 1. When the water pump is disposed upstream of the heating unit 1, the water heated by the heating unit 1 does not flow through the water pump. Instead, the water flowing through the water pump is the room temperature water supplied from the water supply pipe. Therefore, there is no requirement for high temperature resistance for the water pump. In addition, since the water flowing through the water pump is at room-temperature, calcium and magnesium ions in the water are not easily precipitated, so that the inside of the water is not easily scaled.

In the present embodiment, the tank 2 may be provided downstream of the heating unit 1. When the tank 2 is arranged downstream of the heating unit 1, the microbubble water flowing out of the tank 2 does not flow through the heating unit 1, and the length of the flow path of the microbubble water is shortened, so that the user can obtain the microbubble water in a short time. On the other hand, it is also possible to prevent the microbubble water from being diluted by the water stored in the heating unit 1 or being heated by the heating unit 1, causing temperature fluctuation disturbance of the temperature rise.

In one embodiment, the heating unit 1 is provided with a water inlet for water inflow and a water outlet for water outflow. The pressurizing device 3 is a water pump. The water pump and the tank 2 are disposed downstream of the water outlet.

In the present embodiment, the heating unit 1 can be used for heating water. The form of the heating unit 1 may be different according to the specific type of the water heater, and is not particularly limited in this application. For example, when the water heater is an electric water heater, the heating unit 1 may include an inner container and an electric heating rod in the inner container. When the water heater is a gas water heater, the heating unit 1 may include a burner and a heat exchanger.

The heating unit 1 is provided with a water inlet for water inflow and a water outlet for water outflow. Room-temperature water supplied from the water supply pipe may enter the heating unit 1 through the water inlet and be heated, and then the heated water may flow out from the water outlet.

In the present embodiment, the water pump may be arranged downstream of the water outlet of the heating unit 1. When the water pump is arranged downstream of the water outlet of the heating unit 1, the pressurized water supplied by the water pump can be directly supplied to the tank 2 without passing through the heating unit 1, thereby facilitating accurate control of the pressure of the water flowing into the tank 2. The water is prevented from being disturbed by fluctuations in its internal pressure as it flows through the heating unit 1.

In the present embodiment, the tank 2 may be arranged downstream of the heating unit 1. When the tank 2 is arranged downstream of the heating unit 1, the microbubble water flowing out of the tank 2 does not flow through the heating unit 1, and the length of the flow path of the microbubble water is shortened, so that the user can obtain the microbubble water in a short time. On the other hand, it is also possible to prevent the microbubble water from being diluted by the water stored in the heating unit 1 or being heated by the heating unit 1, causing temperature fluctuation disturbance of the temperature rise.

In one embodiment, the heating unit 1 is provided with a water inlet for water inflow and a water outlet for water outflow; The pressurizing device 3 is a water pump. The water pump and the tank 2 are arranged upstream of the water inlet.

In the present embodiment, the heating unit 1 can be used for heating water. The form of the heating unit 1 may be different according to the specific type of the water heater, and is not particularly limited in this application. For example, when the water heater is an electric water heater, the heating unit 1 may include an inner container and an electric heating rod in the inner container. When the water heater is a gas water heater, the heating unit 1 may include a burner and a heat exchanger.

The heating unit 1 is provided with a water inlet for water inflow and a water outlet for water outflow. Room-temperature water supplied from the water supply pipe may enter the heating unit 1 through the water inlet and be heated, and then the heated water may flow out from the water outlet.

In the present embodiment, the water pump may be disposed upstream of the heating unit 1. When the water pump is disposed upstream of the heating unit 1, the water heated by the heating unit 1 does not flow through the water pump. Instead, the water flowing through the water pump is the room temperature water supplied from the water supply pipe. Therefore, there is no requirement for high temperature resistance for the water pump. In addition, since the water flowing through the water pump is at room-temperature, calcium and magnesium ions in the water are not easily precipitated, so that the inside of the water is not easily scaled.

In the present embodiment, the tank 2 may be disposed upstream of the heating unit 1. When the tank 2 is disposed upstream of the heating unit 1, the water heated by the heating unit 1 does not flow through the tank 2. Instead, the water flowing through the tank 2 is room temperature water supplied from the water supply pipe. Therefore, there is no requirement for high temperature resistance for the tank 2. In addition, since the water flowing through the tank 2 is room-temperature water, calcium and magnesium ions in the water are not easily precipitated, so that the inside of the water is not easily scaled.

Referring to FIG. 27, in one embodiment, the heating unit 1 includes a heat exchanger 12 capable of circulating a water stream, and a burner 14 for heating the water stream in the heat exchanger 12.

In this embodiment, the water heater system may be a gas water heater system. Specifically, the heating unit 1 may include a heat exchanger 12 and a burner 14. Water to be heated flows through the heat exchanger 12, and one end of the water exchanger 12 communicates with the water inlet and the other end of the heat exchanger 12 communicates with the water outlet. The burner 14 may be used to heat the water in the heat exchanger 12.

In one embodiment, the water heater system may further comprise a pressure regulating device 4 arranged downstream of the tank 2.

In the present embodiment, the pressure regulating device 4 is used to maintain the pressure between the tank 2 and the pressure regulating device 4 within a predetermined range. Specifically, the pressure regulating device 4 may be in the form of one of pressure regulating valves, such as a self-operated pressure regulating valve. It can also be a hydraulic pressure control valve 6, for example a relief valve. It can also be an electronic expansion valve, a thermal expansion valve, etc., whose pressure can be controlled, or other forms, and the present application is not particularly limited herein.

In the present embodiment, when the water pump is turned on, the pressure regulating device 4 disposed downstream of the tank 2 can control the water pressure between the tank 2 and the pressure regulating device 4 within a predetermined pressure range. Specifically, the control principle of the pressure regulating device 4 may be different depending on the specific structure of the pressure regulating device 4, and the present application is not particularly limited herein.

Referring to FIG. 27, in a specific embodiment, the heat exchanger 12 is provided with a water inlet 121 for water inflow and a water outlet 122 for water outflow. The pressurizing device 3 is a water pump. The water pump is arranged upstream of the water inlet 121 and the tank 2 is arranged downstream of the water outlet 122.

In this embodiment, the technical effect of the arrangement where the water pump is disposed upstream of the water inlet 121 and the tank 2 is disposed downstream of the water outlet 122 may refer to the embodiments in which the water pump is disposed upstream of the heating unit 1 and the tank 2 is disposed downstream of the heating unit 1, and will not be repeated again.

Referring to FIG. 28, in a specific embodiment, the heat exchanger 12 is provided with a water inlet 121 for water inflow and a water outlet 122 for water outflow, and the pressurizing device 3 is a water pump. The water pump and the tank 2 are disposed upstream of the water inlet 121.

In this embodiment, the technical effects of the arrangement where the water pump and the tank 2 are disposed upstream of the water inlet 121 can be derived from the embodiments in which the water pump and the tank 2 are disposed upstream of the heating unit 1.

Referring to FIG. 29, in a specific embodiment, the heat exchanger 12 is provided with a water inlet 121 for water inflow and a water outlet 122 for water outflow, and the pressurizing device 3 is a water pump. The water pump and the tank 2 are disposed downstream of the water outlet 121.

In this embodiment, the corresponding technical effects of the arrangement where the water pump and the tank 2 are disposed downstream of the water outlet 121 can be derived from the embodiments in which the water pump and the tank 2 are disposed downstream of the heating unit 1, and will not be repeated herein again.

In one embodiment, a temperature regulating device 5 is also provided in the heating unit 1 or between the heating unit 1 and the pressure regulating device 4.

In that present embodiment, the manner and corresponding technical effect of the arrangement where the temperature regulating device 5 is provided in the heating unit 1 or between the heating unit 1 and the pressure regulating device 4 can be derived from the embodiments in which the temperature regulating device 5 is provided in the water outlet pipe 112 or between the water outlet pipe 112 and the pressure regulating device 4, and will not be repeated again.

Referring to FIGS. 18 to 19, in one embodiment, the number of tanks 2 is one, the pressurizing device is a water pump, and the water heater system further comprises a control device. The water heater system has at least a first state enabling the tank 2 to provide microbubble water to the water terminal and a second state enabling the tank 2 to be drained and refilled with gas. According to a third predetermined signal, the control device can control an inlet of the tank 2 to communicate with the water pump, and controls an outlet thereof to communicate with a water terminal, to provide the water heater system with a first state in which microbubble water is supplied to an outlet pipe through the tank 2, or control the inlet of the tank 2 to communicate with the gas passage and control the outlet of the tank 2 to communicate with the water outlet pipe, so that the water heater system has a second state in which the tank 2 can be drained and refilled with gas.

In the present embodiment, the water heater system may be provided with a control device which may be used to control the connection state of the inlet and the outlet of the tank 2 to change the operation state of the water heater system. The number of the tanks 2 may be one. The control valve may be disposed at the inlet and outlet of the tank 2. The control valve may be electrically connected to the control device. The control device can control the operating state of the tank 2 by controlling the communication state of the control valve. In particular, the water heater system may have a first state in which the tank 2 provides microbubble water and a second state in which the tank 2 is drained and refilled with gas. The specific control method and technical effect of the control device controlling the state of the tank 2 by means of the control valve can refer to the above embodiments with an inner container, and will not be repeated again.

Referring to FIGS. 21 to 22, in one embodiment, the tank comprises a first tank 2a and a second tank 2b connected in a parallel, and the water heater system further comprises a control valve 6 electrically connected to the control device. The control valve 6 is disposed between the inlets and the outlets of the first tank 2a and the second tank 2b. The control device can control the communication state of the control valve 6 according to the third predetermined signal, so that at least one of the first tank 2a and the second tanks 2b is capable of supplying microbubble water to the water terminal.

In this embodiment, the specific manner and the corresponding technical effects of setting the double tanks in parallel and are similar to those of the above embodiments with inner containers, and will not be repeated again.

Specifically, the third predetermined signal includes at least one of a timing signal, a flow rate signal obtained by the detection unit, a fluid level signal of the tank 2, and a concentration signal of a gas in the gas-liquid mixture.

In this embodiment, the specific meaning and acquisition of the third predetermined signal may refer to the first predetermined signal, and will not be repeated again.

Referring to FIGS. 24 to 25, in one embodiment, the water heater system further comprises a bypass pipe 7 in parallel with the tank 2, the bypass pipe 7 having opposite inlet and outlet ends. When the water heater system is in the second state, the control device controls the inlet end of the bypass pipe 7 to communicate with the water pump, and controls the outlet end of the bypass pipe 7 to communicate with the water outlet pipe.

In this embodiment, the specific manner and the corresponding technical effects of connecting the tank 2 and the bypass pipe 7 in parallel are similar to those of the above embodiment with an inner container, and will not be repeated again.

Referring to FIG. 26, in one embodiment, the water heater system further includes a control valve 6 electrically connected to the control device. The control device controls the communication state of the control valve 6 according to a fourth predetermined signal, to switch the water heater system between the first state and the second state.

In that present embodiment, the control device controls the communication state of the control valve 6 according to a received fourth predetermined signal. The specific implementation and corresponding technical effects of switching the water heater system between the first state and the second state can refer to the embodiments with an inner container, and will not be repeated here. The description of the fourth predetermined signal may refer to that of the second predetermined signal, and will not be repeated here.

Referring to FIGS. 1 and 30, an embodiment of the present application further provides a water heater system, which may include a heating unit 1 capable of heating water; a tank 2 capable of communicating with the heating unit 1; an importing mechanism 8 capable of communicating with the tank 2 and importing the fluid flowed into the tank 2 into a region of the tank 2 where gas is stored, and mixing the imported fluid with the gas in the tank 2; a pressurizing source capable of pressurizing the tank 2, the pressurizing source being capable of providing a pressure at which the gas and water in the tank 2 are mixed.

In this embodiment, the pressurizing source may provide a desired pressure for mixing of the gas and water in the tank 2. Specifically, the pressurizing source may include at least one of a pressurizing device 3 capable of communicating with the tank 2 and capable of providing a predetermined pressure to water flowing into the tank 2, water having a predetermined pressure, or the like. Similarly, the heating unit 1 and the tank 2 are the same as those in the above embodiments, and will not be repeated here.

The tank 2 is provided with at least one inlet 21 and an outlet, and the inlet 21 may be fitted with the importing mechanism 8. The importing mechanism 8 can supply at least one of gas and water into the tank 2. A water supply pipe and a gas supply pipe are provided upstream of the importing mechanism 8 of the tank 2, the importing mechanism 8 is capable of communicating with the water supply pipe and the gas supply pipe, wherein the pressurizing source is the pressurizing device 3. The pressurizing device 3 is communicated with the water supply pipe and the gas supply pipe.

In addition, the specific structure and connection of the heating unit 1 and the tank 2 can refer to the above embodiments, and will not be repeated here. In one embodiment, that wat heater system may further include a control device. The water heater system has at least a first operating state enabling the tank 2 to provide microbubble water to the water terminal and a second operating state capable of draining the tank 2 and refilling the tank 2 with gas. In the second operating state, the control device can control the importing mechanism 8 of the tank 2 to communicate with the gas passage, and control the outlet of the tank 2 to communicate with the water outlet pipe to discharge the water contained in the tank 2 and supply gas at the same time. In the first operating state, the control device can control the importing mechanism 8 of the tank 2 to communicate with the water supply pipe, control the outlet of the tank 2 to communicate with the water terminal. By means of the pressurizing source, the gas and water in the tank 2 are gas-liquid mixed.

When tank 2 is drained and refilled with gas, if the pressurizing source is the pressurizing device 3, the pressurizing device 3 may be opened to perform air injection and drainage by the pressurizing action of the pressurizing device 3 to improve the efficiency of the draining and refilling. In addition, if the pressurized source is pressurized water, gravity can be used to naturally drain the tank and refill with gas. When the outlet of the tank 2 is opened, the water in the tank 2 can be discharged by gravity, and at the same time, gas can enter the tank 2 through the inlet 21, in order to complete the water discharging and gas refilling.

The specific form and control principle of the control device can refer to the specific description in the above embodiments, and will not be repeated here.

Further, in order to improve the efficiency of gas-liquid mixing, the importing mechanism 8 is provided with a jet structure. This jet structure can pressurize the fluid imported into the importing mechanism 8, thereby achieving a better gas mixing effect when the gas and the fluid in the tank 2 are mixed with each other. Specifically, the jet structure may be a changed cross-sectional area portion 211 formed at the outlet of the importing mechanism 8. The cross-sectional area of the changed cross-sectional area portion 211 is smaller than the cross-sectional area of the entire pipe of the importing mechanism 8 as a whole.

As shown in FIG. 31A, the changed cross-sectional area portion 211 may be an oval opening formed at the outlet of the importing mechanism 8.

Alternatively, as shown in FIG. 31C, the changed cross-sectional area portion 211 may be a circular opening formed at the outlet 210 of the importing mechanism 8 having an aperture smaller than that of the pipe of the importing mechanism.

Alternatively, as shown in FIG. 31B, the changed cross-sectional area portion 211 may be a cross-shaped opening formed at the outlet of the importing mechanism 8.

Alternatively, as shown in FIG. 31D, the outlet end of the importing mechanism 8 is a closed end, and the changed cross-sectional area portion 211 may be a plurality of openings formed in the pipe wall near the outlet 210 of the importing mechanism 8.

In addition, that changed cross-sectional area portion 211 can be other forms, the application is not particularly limit here, and the skilled person in the art may make other changes under the technical essence of the application, However, they shall be covered by the scope of this application as long as the functions and effects achieved are the same or similar to the present application.

Referring to FIG. 32, in the embodiment of the present application, based on the water heater system, there is provided a method for controlling the water heater system, wherein the method may include the steps of:

in step S10: controlling the gas supply unit to communicate with the tank for inputting the gas into the tank from the gas supply unit, and discharging the water in the tank at the same time;

in step S12: controlling the importing mechanism to communicate with the water supply pipe when the discharged water or the supplied gas reaches a predetermined amount, the importing mechanism importing the fluid flowed into the tank into a region of the tank where the gas is stored and performs gas-liquid mixing with the gas in the tank, while the pressurizing source applying a predetermined pressure to the gas-liquid mixing of the gas and water in the tank.

The pressurizing source applying a predetermined pressure to gas-liquid mixing of gas and water in the tank comprises: applying a predetermined pressure to gas-liquid mixing of gas and water in the tank with a pressure of water of a predetermined pressure; Or, activating a pressurizer to apply a predetermined pressure to the water entering the tank while applying a predetermined pressure to the gas-liquid mixing of the gas and water in the tank.

In this embodiment, the functions and the like of the respective structures described in the control method of the water heater system can refer to the detailed description of the water heater system embodiment, and the present application will not repeat here again. In addition, the control method of the water heater system can achieve the same technical effect as that of the water heater system, which could be referred to the detailed description of the embodiment of the hot water system, and the application is not repeated here.

In that wat heater system provide by the invention, gas-liquid mixing can be realized to generate microbubble water for use by the user, which not only can save water and environmental protection, offer strong clean performance of water supply, but also requires less space required by the whole structure, and preferably meets various needs of the user.

Referring to FIG. 33, a water heater system provided in an embodiment of the present application may include an inner container 2; a tank 1 connected to the inner container 2; a pressurizing source; and a heating element 20. The inner container 2 is capable of storing a predetermined amount of gas and water, and the tank 1 is capable of storing a predetermined amount of gas and water. The inner container 2 can communicate with the tank 1 to form a gas storage mechanism. The pressurizing source is connected to the gas storage mechanism, and the pressurizing source is capable of compressing the gas in the gas storage mechanism and providing a pressure for mixing the gas and the water in the gas storage mechanism.

In this embodiment, the inner container 2 may be used to contain water, or gas, or a mixture of water and gas. The inner container 2 may be a hollow cylindrical shell as a whole. Of course, the inner container 2 may have other forms, and the present application is not particularly limited herein. In addition, according to the installation mode of the inner container 2, the inner container 2 may be a horizontal inner container 2 or a vertical inner container 2, etc., and the present application is not particularly limited herein.

The inner container 2 may be further provided with a heating member 20 capable of heating the water in the inner container 2. Specifically, the form of the heating element 20 may be different according to the actual use scenario, and is not particularly limited in this application. For example, when the water heater is a water storage type electric water heater, the heating member 20 may be an electric heating rod. One end of the electric heating rod can be fixed to the inner container 2, and the other end extends into the water of the inner container 2. The electric heating rod contacts the water in the inner container 2, and the heat generated by the electric heating is transferred to the water in the inner container 2, thereby heating the water in the inner container 2.

The inner container 2 may be provided with a first pipe 21 and a second pipe 22. The first pipe 21 has a first port 210 extending into the inner container 2, and the second pipe 22 has a second port 220 extending into the inner container 2. The first pipe 21 and the second pipe 22 are respectively communicated with the inner container 2, one of which can be used for water inlet, and the other can be used for water discharge. The height of the first port 210 and the second port 220 may be different, for example, the height of the first port 210 of the first pipe 21 may be higher than the height of the second port 220.

In the present embodiment, the tank 1 may be used to contain water, or gas, or a mixture of water and gas. The tank 1 can communicate with the inner container 2. The tank 1 may be in the shape of a hollow cylinder having opposed top and bottom ends. The top end and the bottom end may be provided with arc transitions. The tank 1 is in the use position with its top end on the top and the bottom end on the bottom. Of course, the shape of the tank 1 may be other forms, and the present application is not particularly limited herein.

The tank 1 is provided with an input pipe 31 capable of communicating with a gas storage region of the inner container 2 and an output pipe 31 capable of communicating with a water terminal, the input pipe 31 having an inlet communicating with the inside of the tank 1, and the outlet pipe 31 has an outlet communicating with the tank 1.

As shown in FIGS. 34A to 34B, the tank 1 may be provided with one input pipe 31, that is, at least one inlet. One of the inlets may be connected to the inner container 2 by a pipe so as to allow at least one of the gas and water in the inner container 2 to enter the tank 1. When the tank 1 is provided with an inlet, the inlet can be used for gas and water. When the tank 1 is provided with a plurality of inlets, each inlet can perform a different function, for example one for gas intake, one for water inlet, etc. In addition, the number of outlet pipes on the tank 1 may be at least one, and correspondingly, the number of outlets may be one or more, and the present application is not particularly limited herein. When the number of the outlets is one, it can communicate with the drain port 12 or the water terminal.

Further, the inlet and the outlet have a positional difference, the inlet is located higher than the outlet, so that the inlet extends into the tank 1 and is higher than the fluid level in the tank 1, and the outlet is below the fluid level in the tank 1.

Further, in order to improve the efficiency of gas-liquid mixing, a jet structure may be provided at the inlet near the inner wall surface of the tank 1 and/or at the inlet, which may pressurize the fluid imported into the inlet pipe 31. Therefore, when the gas and the liquid in the tank 1 are mixed with each other, a better mixing effect is achieved.

Referring to FIGS. 36A-36D, the jet structure may be a changed cross-sectional area portion 311 formed near the inlet 310 of the inlet pipe 31.

As shown in FIG. 36A, the changed cross-sectional area portion 311 may be an elliptical opening formed at the inlet 310 of the input pipe 31.

Alternatively, as shown in FIG. 36C, the changed cross-sectional area portion 311 may be a circular opening formed at the inlet 310 of the input pipe 31 having a smaller diameter than that of the pipe of the input pipe 31.

Alternatively, as shown in FIG. 36B, the changed cross-sectional area portion 311 may be a cross-shaped opening formed at the inlet 310 of the input pipe 31.

Alternatively, as shown in FIG. 36D, the inlet 310 is a closed end, and the changed cross-sectional area portion 311 may be a plurality of openings formed in the pipe wall of the inlet pipe 31 near the inlet 310.

In addition, that changed cross-sectional area portion 311 can be other forms, the application is not particularly limit here, and the skilled person in the art may make other changes under the technical essence of the application, However, they shall be covered by the scope of this application as long as the functions and effects achieved are the same or similar to the present application.

In the present embodiment, the inner container 2 can communicate with the tank 1 to form a gas storage mechanism for storing gas used for preparing microbubble water. Specifically, in addition to the inner container 2 and the tank 1 that can communicate with each other, the gas storage mechanism may include a pipe for connecting the inner container 2 and the tank 1.

Specifically, the inner container 2 and the tank 1 may be connected in series along the fluid flow direction. A predetermined amount of gas may be stored in the inner container 2 after draining the gas storage mechanism and refilling it with gas. Specifically, the predetermined amount of gas may be set as needed. Generally, when the water demand is large, the predetermined amount of gas stored in the inner container 2 may be relatively large, or even the entire container may be full of the gas. When the water demand is small, the predetermined amount of gas stored in the inner container 2 may be relatively small, and in particular, the present application is not quantitatively limited herein. In a preferred case, the microbubble water prepared by using the gas stored in the inner container 2 in combination with the gas in the tank 1 may be used once by the user. When performing the draining and refilling to the gas storage mechanism, the tank 1 can then be supplied with air after the completion of the gas supply to the inner container 2. In addition, the tank 1 is filled with air, and the draining and refilling to the connecting pipe between the inner container 2 and the tank 1 is also completed.

The gas in the gas storage mechanism can be compressed by a pressurizing source after the completion of the draining and refilling of the gas storage mechanism. Specifically, a predetermined amount of gas in the inner container 2 may be compressed into the tank 1, and a pressure is provided for mixing the gas and the water in the gas storage mechanism and the tank 1 for preparing microbubble water.

In the present embodiment, the pressurizing source can compress the gas in the gas storage mechanism and provide a pressure for mixing the gas and the water in the gas storage mechanism. Specifically, the pressurizing source may include at least one of, or a combination thereof, a pump 3, a liquid having a predetermined pressure. The pump 3 may be a water pump, which may pressurize the water flowing therethrough when the water pump is turned on, and may also pressurize the tank 1 in communication therewith, that is, when the microbubble water is prepared, the water pump is capable of providing the pressure required for the mixing of gas and water. In addition, the water pump may also serve as a power device for water circulation of the water heater system. Generally, a water pump may be provided in the water heater system to provide power for water circulation.

In this embodiment, when the pressurizing source is a water pump, it can utilize the existing water pump in the water heater system without adding the water pump additionally, thereby saving the cost, saving the space of the whole water heater system, and optimizing the product structure. Of course, the pressurizing source may also be in the form of other pressurization devices capable of providing pressure, and will not be particularly limited herein.

In addition, the pressurizing source may be a liquid having a predetermined pressure, such as water having a certain pressure, which may compress the gas in the gas storage mechanism when the pressurized water flows into the gas storage mechanism. And when the pressurized water collides with the compressed air, the gas-liquid mixing can be better achieved.

In the present embodiment, the water heater system may include a first state in which water is drained and gas is refilled for the gas storage mechanism and a second state in which gas in the gas storage mechanism is compressed and then gas and water are mixed in the gas storage mechanism. Accordingly, in the first state, the inner container 2 and the tank 1 can communicate with each other to form the gas storage mechanism. In the second state, the pressurizing source is capable of compressing the gas in the gas storage mechanism and providing pressure for mixing the gas and water within the gas storage mechanism.

Specifically, the first state of the water heater system at the time of use is such a state that the water in the gas storage mechanism is drained and the gas is refilled, and the gas required for preparing the micro bubbles is supplied to the gas storage mechanism of the water heater system by the draining and refilling of the gas storage mechanism. The second state of the water heater system in use is a gas-liquid mixing state in which gas in the gas storage mechanism is compressed and gas-liquid mixing is performed in the gas storage mechanism.

In the process of gas-liquid mixing, a predetermined amount of gas in the inner container 2 may be compressed into the tank 1, and then water under the action of the pressurizing source may be injected into the tank 1 through the inlet to be mixed with the gas in the tank 1. In the tank 1, gas-liquid mixture is carried out to prepare the microbubble water and supply to the water terminal.

As shown in FIG. 34B, in particular, the tank 1 has opposed top and bottom ends, with the tank 1 generally has the top end on top and the bottom end on bottom in use. A pipe extending from the bottom end to the top end is provided in the tank 1, and the inlet is formed by a port of the pipe near the top end. In use, when the gas is stored in the tank, the pressurized water being pressurized by the pressurizing source is ejected upward through the pipe, and comes into preliminary contact with the gas in the tank to achieve a certain gas dissolving effect. Further, after colliding with the inner wall near the top of the tank, the pressurized water is diffused in all directions to form droplets and liquid films, and the air is entrained when the water collides with the water to achieve better secondary gas dissolution. In that above embodiment, the pressurized water can strike the inner wall of the tank and then generate secondary gas dissolution with the gas, so that the gas dissolving efficiency is relatively high, thereby shortening the preparation time of the micro bubbles.

Of course, it is also possible to compress the gas in the tank 1 into the inner container 2, and then perform gas-liquid mixing in the inner container 2. Or the gas-liquid mixing may be performed in the inner container 2 and the tank 1, respectively. A specific manner of the gas-liquid mixing and the position of the mixing are not particularly limited in the present application.

The water heater system may further comprise a pressure regulating device 4 arranged downstream of the gas storage mechanism.

The pressure regulating device 4 for maintaining the pressure between the gas storage mechanism and itself within a predetermined range may be provided at a position downstream of the entire water heater system. Specifically, the pressure regulating device 4 may be in the form of one of pressure regulating valves, such as a self-operated pressure regulating valve such as a gas releasing device or the like, or may be a hydraulic pressure control valve such as an overflow valve. It may also be an electronic expansion valve, a thermal expansion valve or the like whose pressure can be controlled, or may also be in other forms, and in particular, the control principle of the pressure regulating device 4 may be different depending on the specific structure of the pressure regulating device 4. This application is not specifically limited herein.

Referring to FIG. 35A, for example, in the direction of fluid flow, at least one changed aperture structure is provided, and the pressure regulating device 4 comprises a hollow pipe in which at least one throttle member is disposed. The throttle member may be a structure having an aperture smaller than the inner diameter of the pipe. In addition, the flow holes may be sequentially opened in order along the fluid flow direction in the throttle plate, so that the flow cross-sectional area is gradually increased along the fluid flow direction as a whole. When the fluid flows through the throttle mechanism, since the flow cross-sectional area suddenly decreases, the pressure of the fluid increases accordingly, so that the function of maintaining the pressure can be realized.

Referring to FIG. 35B, the pressure regulating device 4 may be further provided with a back-pressure spring or other throttle mechanism with changed flow cross-sectional area, and the application is not particularly limited herein. Those skilled in the art may make other changes under the technical essence of this application, and they shall be covered by the scope of this application as long as the functions and effects achieved are the same or similar to the present application.

The predetermined pressure is a pressure required for gas-liquid mixing in the gas storage mechanism, and is favorable for generation and maintenance of micro bubbles. For example, when the pressurizing source is a water pump, the water pump is disposed upstream of the inner container 2. When the water pump is in operation, the pressure regulating device 4 is capable of maintaining the pressure between the water pump and the pressure regulating device 4 at 0.2 MPa or more. When the pressure between the water pump and the pressure regulating device 4 is controlled by the pressure regulating device 4 to be at or more than 0.2 MPa, the predetermined pressure is a pressure required for gas-liquid mixing in the inner container 2, which facilitates generation and maintenance of micro bubbles. Specifically, on one hand, when the pressure is at or above 0.2 MPa, it is advantageous for more air to be dissolved in water to form microbubble water having a higher solubility. On the other hand, when the microbubble water flows in the pipeline, the state of the microbubble water is maintained, and the bubble in the water is prevented from gradually becoming large.

Of course, the range of the predetermined pressure is not limited to the above list, and the person skilled in the art may make other changes under the inspiration of the technical essence of the application, and shall be covered by the scope of this application as long as the functions and effects achieved are the same or similar to the present application.

The water heater system may further comprise a pressure detection device for detecting the pressure of the water heater system.

When the gas-liquid mixing is performed in the tank 1, the pressure detecting means may include: a first pressure detecting device 81 for detecting whether the pressure in the tank 1 reaches a predetermined operating pressure; and a second pressure detecting device 82 for detecting whether the pressure in the tank 1 is lower than a predetermined holding pressure.

The first pressure detecting device 81 and the second pressure detecting device 82 may be disposed on a pipe communicating with the tank 1, for example, may be disposed on a pipe between the tank 1 and the pressure regulating device 4. The first pressure detecting device 81 and the second pressure detecting device 82 may be electrically connected to a controller. When the pressure of the tank 1 detected by the first pressure detecting device 81 reaches a predetermined operating pressure, it is possible for the controller to control the water heater system to enter a second state of gas-liquid mixing to perform gas-liquid mixing. The controller can control the water heater system to stop the second state of gas-liquid mixing when the pressure of the tank 1 detected by the second pressure detecting device 82 is lower than the holding pressure. Thus, it is possible to ensure that the water heater system can stably produce microbubble water.

The microbubbles refer to bubbles that are several or several tens of microns in size. The surface of the microbubbles has a weak negative charge in the water, which can adsorb substances such as fat and protein, so as to carry them away from the skin, hair and so on. When using microbubble water with microbubbles for bathing, a large number of microbubbles can penetrate into the root of hair and other parts of the hair that are difficult to clean, thus thoroughly remove the accumulated dirt such as sebum and grease.

In addition, the microbubble water also has an outstanding performance in terms of sterilization. Specifically, the sterilization process of the microbubble water includes two processes of absorbing and exterminating. The microbubbles carry static electricity, which can adsorb bacteria and viruses in the water. Then, as the bubble bursts, a large amount of free radicals are excited around the bubble and the super high temperature and pressure generated by the burst exterminates the adsorbed bacterial virus. The above exterminating process is a complete physical exterminating process, which is essentially different from the conventional sterilization method, so that it is more environment-friendly and healthy than the conventional chemical sterilization method.

The water heater system described herein can form a gas storage mechanism when the inner container 2 communicates with the tank 1 by storing a predetermined amount of gas in the inner container 2 and combining the inner container 2 and the tank 1. The gas for preparing the microbubble water in the gas storage mechanism includes a predetermined amount of gas stored in the inner container 2 and a gas in the tank 1 and also gas present in a connecting pipe between the inner container 2 and the tank 1. Because the gas storage mechanism stores air by means of the inner container 2 and the pipeline between the inner container 2 and the tank 1, the volume of the tank 1 can be greatly reduced, so that the space required for the overall structure of the water heater system is smaller. The requirement for installation position is low, and the purpose of saving the indoor space of the user while satisfying the normal microbubble water use demand of the user can be realized.

In addition, the predetermined amount of gas stored in the inner container 2 can be adaptively adjusted according to the water demand of the user. The amount of the gas stored in the inner container 2 can be adjusted to be larger when the user needs more water, and the amount of gas stored in the inner container 2 can be adjusted to be smaller when the user needs less water, thereby meeting various needs of different users.

In one embodiment, as shown in FIG. 33, the inn container 2 and the tank 1 are connected in series along the direction of fluid flow. The pressurizing source is capable of providing necessary pressure for compressing the gas in the inner container 2 of the gas storage mechanism into the tank 1 and providing a pressure for mixing the gas and the liquid in the tank 1 of the gas storage mechanism.

In this embodiment, the inner container 2 and the tank 1 form the gas storage mechanism in series along the fluid flow direction, and the fluid includes water or gas which can enter the inner container 2 and then enter the tank 1 through the pipeline between the inner container 2 and the tank 1. After the gas storage mechanism composed of the inner container 2 and the tank 1 in series completes water discharging and gas refilling, the pressurizing source is capable of providing a pressure for compressing the gas in the inner container 2 of the gas storage mechanism into the tank 1 and providing a pressure for mixing the gas and the water in the tank 1 of the gas storage mechanism. However, the volume of the tank 1 can be greatly reduced compared to the case in which the gas is dissolved solely by means of the tank 1. For example, when 6 liters of gas is required, 4 liters or more of gas may be stored in the inner container 2. When gas-liquid mixing is performed, the gas in the inner container 2 may be compressed into the tank 1 to perform gas-liquid mixing.

In this embodiment, the water heater system may further include a gas intake port 11, a water supply port 13, and a drain port 12 that can communicate with the gas storage mechanism. The gas intake port 11 is used for flowing gas supplied to the gas storage mechanism, the water supply port 13 is used for flowing water supplied to the gas storage mechanism, and the drain port 12 is used for discharging predetermined water inside the gas storage mechanism when gas is refilled. The positions and the number of the gas intake ports 11, the water supply ports 13, and the drain ports 12 are not particularly limited in this application. For example, the number of the gas intake ports 11 may be one or two or more, and the number of the drain ports 12 may be one or two or more.

In one embodiment, the gas intake port 11 may be provided upstream of the inner container 2 and the drain 12 may be provided downstream of the tank 1.

When the water heater system performs water discharging and gas refilling, the gas can be sequentially supplied into the inner container 2 and the tank 1 via the gas intake port 11. The water in the inner container 2 and the tank 1 can be sequentially discharged from the drain port 12. The number of the gas intake ports 11 may be one, and the number of the drain ports 12 may be one, thereby reducing unnecessary openings of the water heater system as a whole, optimizing the structure, and reducing the cost. In addition, that leakage point of the pressure during the subsequent gas-liquid mixing can be reduced as much as possible.

In one embodiment, the gas intake port 11 comprises a first intake disposed upstream of the inner container 2 and a second intake disposed upstream of the tank 1. The drain port 12 includes a first outlet and a second outlet, the first outlet is disposed downstream of the inner container 2, and the second outlet is disposed downstream of the tank 1.

In the present embodiment, the number of the gas intake ports 11 may be more than one, for example, the gas intake ports 11 may include a first intake and a second intake, wherein the first intake may be disposed upstream of the inner container 2 for supplying gas to the inner container 2, and the second intake may be provided upstream of the tank 1 for supplying gas to the tank 1. The number of the drain ports 12 may also be more than one, for example, the drain port 12 may include a first outlet and a second outlet, wherein the first outlet may be disposed downstream of the inner container 2 for discharging a predetermined amount of water from the inner container 2, and the second outlet may be provided downstream of the tank 1 for discharging the water in the tank 1.

In one embodiment, that water heater system may further include a detecting member for controlling an amount of the amount of water discharging and gas refilling of the gas storage mechanism; a controller electrically connected to the detection member; and a switching device electrically connected to the controller for controlling the opening/closing of the gas intake port 11, the drain port 12, and the water supply port 13.

In this embodiment, the switching device and the detecting member are electrically connected to the controller, and the controller can control the opening and closing of the switching device to realize the on/off of the gas intake port 11, the drain port 12 and the water supply port 13 according to the electric signal obtained by the detecting member. The switching device may be in the form of a solenoid valve capable of controlling pipeline connection or disconnection, for example, a pneumatic switching valve or an electric switching valve, and the present application is not particularly limited herein. Specifically, the switching device includes a plurality of solenoid valves capable of controlling the gas intake port 11 to open, controlling the drain port 12 to open, and controlling the water supply port 13 to close when in the first state. In the second state, it is controlled that the gas intake port 11 is closed, the drain port 11 is closed, and the water supply port 13 is opened.

Specifically, the detecting member may be any one of the following or a combination thereof: a flow rate detecting member, a fluid level detecting member.

When the detecting member is a flow detecting member, the specific flow detecting member may be a flow sensor 83 capable of acquiring flow information in the pipeline. The flow sensor 83 may be disposed on a water supply pipe upstream of the inner container 2. After obtaining the flow signal of the flow sensor 83, the controller can determine the flow rate of the fluid in connection with the timing signal, and in turn determine whether the required predetermined fluid level is reached in the inner container 2. If so, the controller sends a corresponding control signal to the switching device to change the opening and closing state of the switching device.

When the detecting member is a fluid level detecting member, the specific liquid detecting member may be a level gauge capable of acquiring a fluid level signal in the inner container 2. The level gauge is arranged in the inner container 2, and can be used for acquiring the fluid level signal in the inner container 2 and providing the fluid level signal to the controller. The controller may determine the fluid level in the inner container 2 according to the fluid level signal, and determine whether the fluid level has reached the desired predetermined fluid level, and if reached, send a corresponding control signal to the switching device to change the opening and closing state of the switching device.

In addition, when the injected gas flow rate is a known flow rate value, the detecting member may also be a timer capable of counting the time of the gas input into the gas storage mechanism. Of course, the specific form of the detecting element is not limited to the above examples, and the person skilled in the art may make other changes under the inspiration of the technical essence of the application, and shall be covered by the scope of this application as long as the functions and effects achieved are the same or similar to the present application.

As shown in FIG. 33, in a specific embodiment, the water heater system may further include a first switching valve 5 capable of communicating with the first pipe 21, the second pipe 22, the upstream pipe of the system, and the tank 1. The upstream pipe of the system is located upstream of the inner container 2, and can communicate with the gas intake port 11 and the water supply port 13. The first switching valve 5 is used for changing the communication relationship between the first pipe 21, the second pipe 22 and the upstream pipe of the system and the tank 1, so as to switch the operating state of the water heater system.

The operating state of the water heater system may include a first state in which water is drained and gas is refilled to the gas storage mechanism and a second state in which gas in the gas storage mechanism is compressed and gas and liquid are mixed in the gas storage mechanism.

The first state may include a first sub-state of water discharging and gas refilling the inner container 2 and a second sub-state of water discharging and gas refilling the tank 1.

In that first sub-state, the switch device controls the gas intake port 11 and the drain port 12 to open, controls the water supply port 13 to close. At the same time, the first switching valve 5 switches to allow the gas intake port 11 to communicate with the first pipe 21 and allow the second pipe 22 to communicate with the tank 1. The gas can pass through the gas intake port 11 and the first pipe 21 in the above turn and then enter the inner container 2 and is stored therein.

The controller sends a control signal to the first switching valve 5 to cause the water heater system to enter a second sub-state for water discharging and gas refilling in the tank 1 when the controller detects that the gas filling in the inner container 2 is completed and the fluid level drops to a predetermined level.

In that second sub-state, the first switch valve 5 allows the gas intake port 11 to communicate with the second pipe 22 and allow the first pipe 21 to communicate with the tank 1. The gas can pass through the gas intake port 11, the second pipe 22 and the inner container 2 in the above turn and then enter the tank 1 and is stored therein. The water heater system may enter a second state of gas-liquid mixing after the completion of the water discharging and gas refilling in the tank 1. The activation of the second state may be triggered by the user after opening the water terminal, or may be triggered by other trigger signals, for example, after a predetermined time period after completion of water discharging and gas refilling in the tank 1 has elapsed, or may indicate that the fluid level in the tank 1 is zero, or may be a time before a predetermined time period before the user needs water according to learning on the water usage habits of the user. In addition, the triggering conditions for the water heater system entering the second state may be other conditions, and the application is not particularly limited herein.

In that second state, the switch device controls the closure of the gas intake port 11 and the drain port 12, controls the closure of the water supply port 13. At the same time, the first switching valve 5 allows the water supply port 13 to communicate with the second pipe 22 and allows the first pipe 21 to communicate with the tank 1, and the pressurizing source provides a preset working pressure for the water heater system.

When the inner container 2 and the tank 1 are sequentially communicated along the fluid direction, if the water heater system is up and run, the inner container 2 and the tank 1 can be drained and refilled with gas in sequence. The first pipe 21 may be used as a gas intake pipe and the second pipe 22 may be used as a water outlet pipe when the inner container 2 is drained and refilled with gas. A height of the first port 210 of the first pipe 21 extending into the inner container 2 is higher than a predetermined fluid level of the inner container 2. This predetermined level corresponds to the amount of gas to be refilled into the inner container or the amount of water to be discharged from the inner container 2. When the amount of gas refilled in the inner container 2 reaches the predetermined fluid level, the first switching valve 5 can be switched so that the second pipe 22 communicates with the gas intake port 11, and air is supplied through the second pipe 22. The first pipe 21 communicates with the tank 1. The gas entering from the gas intake port 11 enters the inner container 2 via the second pipe 22, comes into contact with the water contained in the inner container 2, and then flows into the tank 1 via the first port 210 of the first pipe 21, so that the tank 1 is free of water and filled with air. In this process, the gas of the inner container 2 entered from the air intake port 11 can be mixed with the water in the inner container 2, so that the water in the inner container 2 is mixed with a certain amount of air.

Further, after the draining and refilling of the gas storage mechanism is completed, the second pipe 22 may be communicated with the water supply port 13 to supply the pressurized water into the inner container 2. After the pressurized water enters the inner container 2 via the second pipe 22, the gas above the predetermined fluid level of the inner container 2 can be compressed into the tank 1. After the fluid level reaches the first port 210 of the first pipe 21, water mixed with gas could be forced into the tank 1 via the first port 210 of the first pipe 21 to perform gas-liquid mixing for preparing microbubble water for the water terminal.

In the present embodiment, the first switching valve 5 may include a first interface 51 in communication with an upstream pipe of the system, a second interface 52 in communication with the second pipe 22, a third interface 53 in communication with the tank 1, and a fourth interface 54 in communication with the first pipe 21. Specifically, the first switching valve 5 may be a four-way valve having four interfaces capable of communicating in pairwise. Of course, the first switching valve 5 may also be in the form of other valves, and the present application is not particularly limited herein.

In the first state, the first interface 51 and the fourth interface 54 of the first switching valve 5 communicate with each other, and the second interface 52 and the third interface 53 communicate with each other. At this time, an end of the first pipe 21 distant from the first port 210 communicates with the fourth interface 54, and an end of the second pipe 22 distant from the second port 220 communicates with the second interface 52. Gas can enter the system upstream pipe via the gas intake port 11, the first to fourth interfaces 51 to 54 of the first switching valve 5, and then enters the inner container 2 via the first pipe 21, and the water in the inner container 2 is discharged via the second pipe 22, the second interface 52 to the third interface 53 of the first switching valve 5, the tank 1 and the drain port 12 in the above order.

When the predetermined fluid level is reached, the first interface 51 and the second interface 52 of the first switching valve 5 communicate with each other, and the third interface 53 and the fourth interface 54 communicate with each other. At this time, one end of the second pipe 22 remote from the second port 220 communicates with the second interface 52, and an end of the first pipe 21 remote from the first port 210 communicates with the fourth interface 54. Gas can enter the system upstream pipe via the gas intake port 11, the first interface 51 to the second interface 52 of the first switching valve 5, enters the inner container 2 via the second pipe 22, and then enters the tank 1 via the first pipe 21, the fourth interface 54 to the third interface 53 of the first switching valve 5. At the meantime, the water in the tank 1 is discharged from the drain port 12.

In the second state, the first interface 51 and the second interface 52 of the first switching valve 5 communicate with each other, and the third interface 53 and the fourth interface 54 communicate with each other. In the second state, the interface communication relationship of the first switching valve 5 can be maintained unchanged. The water from the water supply port 13 can enter the inner container 2 via the second pipe 22. The gas in the inner container 2 is forced into the tank 1 via the first pipe 21, and then the water in the inner container 2 is also forced into the tank 1 so as to undergo gas-liquid mixing with the gas in the tank 1.

In that embodiment, the gas stored in the inner container 2 and the pipeline connected between the inner container 2 and the tank 1 is fully utilized at the time of gas-liquid mixing, and the water in the inner container 2 is mixed with a certain amount of gas since the water collides with the gas in the inner container 2 at the time of gas refilling of the inner container. Therefore, the volume of the tank 1 can be greatly reduced, the cost can be saved, and the entire water heater system can be downsized, compared with the method of simply using the tank 1 for gas storage and gas-liquid mixing.

In another embodiment, a fluid level limit mechanism for controlling the fluid level in the inner container 2 may be provided in the inner container 2.

Specifically, the fluid level limit mechanism may be a third pipe 23 separately disposed in the inner container 2, the third pipe 23 having a third port 230 extending into the inner container 2. The position of the third port 230 is flush with a predetermined fluid level in the inner container 2. Alternatively, the fluid level limit mechanism may also be an opening provided on the first pipe 21 of the inner container 2, the opening being located flush with a predetermined fluid level in the inner container 2. Of course, the form of the fluid level limit mechanism is not limited to the above examples, and the person skilled in the art may make other changes under the inspiration of the technical essence of the present application, and shall be covered by the scope of this application as long as the functions and effects achieved are the same or similar to the present application.

After the fluid level limit mechanism is in position, the amount of gas to be refilled and the amount of water to be discharged in the inner container 2 can be directly controlled by the fluid level limit mechanism, and in this case, the detecting member can be omitted. The fluid level limit mechanism may be a third pipe 23 separately disposed in the inner container 2, and the port of the third pipe 23 extending into the inner container 2 may be at a predetermined fluid level, or may be an opening in the first pipe 21. The position of the opening is at a predetermined fluid level. The fluid level limit mechanism may be another structure capable of controlling the fluid level when the inner container 2 is drained and refilled with gas, and the present application is not particularly limited herein.

Referring to FIG. 37 or 38, in a specific embodiment, the water heater system may further include a third pipe 23 communicating with the inner container 2, the third pipe 23 having a third port 230 extending into the inner container 2. The height of the third port 230 is located at a predetermined fluid level of the inner container 2 and lower than the first port 210 but higher than the second port 220.

In the present embodiment, the amount of gas to be refilled and the amount of water to be discharged in the inner container 2 may be defined by the third pipe 23 provided with a third port 230 extending into the inner container 2. Specifically, the height of the third port 230 is located at a predetermined fluid level of the inner container 2 and lower than the first port 210 but higher than the second port 220.

In this embodiment, the second pipe 22 may communicate with the water supply port 13. The system may further comprise a second switching valve 6 which can communicate with the first pipe 21, the third pipe 23 and the tank 1. The second switching valve 6 is used to change the communication relationship between the first pipe 21, the third pipe 23 and the tank 1 for a purpose of switching the operating state of the water heater system.

The operation state of the water heater system is the same as that of the embodiments described above, and in particular, may include a first state in which the gas storage mechanism is discharged of water and refilled of gas and a second state in which the gas and liquid are mixed. The first state may include a first sub-state of discharging and refilling for the inner container 2 and a second sub-state of discharging and refilling for the tank 1.

In the first sub-state, the second switching valve 6 connects the third pipe 23 to the tank 1 so that gas can enter the inner container 2 via the gas intake port 11 and the second pipe 22 in sequence and be stored therein. In the second sub-state, the second switching valve 6 connects the first pipe 21 to the tank 1, so that gas can enter the tank 1 via the gas intake port 11, the second pipe 22 and the first pipe 21 in sequence and be stored therein. In the second state, the second switching valve 6 connects the first pipe 21 to the tank 1, so that the water from the water supply port 13 can enter the inner container 2 via the second pipe 22. The gas in the inner container can be forced into the tank 1, and the pressurized water is injected into the tank 1 to perform gas-liquid mixing for preparing microbubble water to be supplied to the water terminal.

In this embodiment, referring to FIG. 37, the second switching valve 6 includes a first valve port 61 communicating with the first pipe 21, a second valve port 62 communicating with the third pipe 23, and a third valve port 63 communicating with the tank 1. Specifically, the second switching valve 6 may be a three-way valve having three valve ports can be connected in pairwise. Or, the second switching valve 6 may be a four-way valve or the like similar to the first switching valve 5. Of course, the second switching valve 6 may also be in the form of other valves, and the present application is not particularly limited herein.

In the first sub-state of the first state, the first valve port 61 and the third valve port 63 are disconnected to prevent the gas injected into the inner container 2 from leaking out through the first pipe 21, the tank 1, and the drain port 12 in sequence. At the same time, the second valve port 62 communicates with the third valve port 63 so that the third pipe 23 can communicate with the tank 1. At the same time, the switching device controls the gas intake port 11 and the drain port 12 to be opened, and the water supply port 13 to be closed. The gas entered from the gas intake port 11 enters the inner container 2 via the second pipe 22, and discharges a predetermined amount of water in the inner container 2 to the tank 1 via the third pipe 23, and then discharged via the drain port 12.

In the second sub-state of the first state, the first valve port 61 and the third valve port 63 communicate with each other so that the first pipe 21 communicates with the tank 1. The gas entered from the gas intake port 11 enters the inner container 2 via the second pipe 22, and is then injected into the tank 1 via the first pipe 21. As a result, the tank 1 and the pipe connecting between the inner container 2 and the tank 1 are also filled with gas. Meanwhile, the second valve port 62 may communicate with the third valve port 63 so that the third pipe 23 communicates with the tank 1. At this time, gas entered the inner container 2 from the second pipe 22 may enter the tank 1 from the third pipe 23.

In the second sub-state of the first state, at least one of the first pipe 21 and the third pipe 23 communicates with the tank 1 so as to inject gas into the tank 1 while discharging water from the tank 1. When the tank 1 is discharged of water and refilled with gas, the first pipe 21 and the third pipe 23 are in communication with the tank 1 at the same time, so as to provide the efficiency of discharging and refilling.

In the second state, the first valve port 61 and the third valve port 63 communicate so as to compress the gas in the inner container 2 into the tank 1 through the first pipe 21. In addition, pressurized water may also be injected into the tank 1 through the first pipe 21 for gas-liquid mixing.

In one embodiment, the water heater system may also be provided with a temperature regulating mechanism disposed between the inner container 2 and the tank 1. The inlet of the temperature regulating mechanism can communicate with the water supply port 13 supplying cold water at one end, and communicate with the outlet of the inner container 2 at the other end, and the outlet of the temperature regulating mechanism communicates with the tank 1. That is, the temperature regulating mechanism can supply water of a suitable temperature to the tank 1 to prepare microbubble water by regulating the ratio of the cold water entering the inlet side and the hot water supplied from the inner container 2. When the user opens the water terminal, it is possible to directly obtain microbubble water having a suitable temperature and a relatively high concentration. That is, a problem that the temperature of the microbubble water is excessively high due to the excessively high temperature in the inner container 2 and in turn cold water has to be directly mixed into the microbubble water to obtain the microbubble water at an appropriate temperature, resulting in dilution of the microbubble water, is avoided.

Referring to FIG. 38, in a specific embodiment, the temperature regulating mechanism may be a second switching valve 6, and the second switching valve 6 may further include a fourth valve port 64 communicating with an upstream pipe of the inner container 2. In the second state, the first valve port 61 and the fourth valve port 64 of the second switching valve 6 communicate with the third valve port 63, and the opening degrees of the first valve port 61, the fourth valve port 64 and the third valve port 63 are adjusted according to a preset temperature.

In this embodiment, the second switching valve 6 can be used to realize the function of temperature regulation. Specifically, the second switching valve 6 may further include a fourth valve port 64 communicating with an upstream pipe of the inner container 2. When the water supply port 13 is opened in the second state, the water from the water supply port 13 can enter the fourth valve port 64 through the upstream pipe of the inner container 2, thereby entering the tank 1 communicating with the fourth valve port 64.

In the second state, the second valve port 62 of the second switching valve 6 is also in communication with the third valve port 63. The first valve port 61 is used for supplying hot water in the inner container 2 to the tank 1, and the fourth valve port 64 is used for supplying cold water flowing in the water supply port 13 to the tank 1. The water heater system may be set with a preset temperature according to a user's demand, wherein the preset temperature is a temperature which is desired by the user at the water terminal. At this time, the controller of the water heater system may determine a mixing ratio of the hot water and the cold water based on the water temperature in the inner container 2 and the temperature of water supplied from the water supply port 13, thereby determining the opening degrees of the first valve port 61, the fourth valve port 64 and the third valve port 63 of the second switching valve 6 to ensure that the microbubble water flowing out from the water terminal is at a suitable temperature.

Referring to FIG. 39, in a specific embodiment, the first pipe 21 further has an opening 211 extending into the inner container 2, and the opening 211 is located at a predetermined fluid level of the inner container 2.

In the present embodiment, the fluid level limit mechanism may be the first pipe 21 having the opening 211. The opening is smaller than the first port 210 of the first pipe 21, and specifically, the ratio of the flow area of the opening 211 and the flow area of the first port 210 may be within a predetermined range.

In use, water discharging and gas refilling of the inner container 2 can be performed through the second pipe 22. When the fluid level reaches the position of the opening 211, gas injection is continued for a period of time, and gas and a small amount of water can be injected into the tank 1 so that the tank 1 is filled with gas. The intake port 11 and the drain port 12 are then closed, the water supply port 13 is opened, so that water is injected into the inner container 2 through the second pipe 22, gas can be forced into the tank 1 through the first port 210 of the first pipe 21. And subsequently, pressurized water may be injected into the tank 1 through the first port 210 and the opening to achieve gas-liquid mixing to prepare microbubble water.

In this embodiment, a temperature regulating device 7 may be provided, and the temperature regulating device 7 may be provided between the inner container 2 and the tank 1, and the specific communication relationship and the realized function and role can refer to the above embodiment, which will not be repeated here.

Referring to FIG. 40, in another embodiment, the tank 1 may be located in the inner container 2, and correspondingly, the inlet pipe 31 is located in the inner container 2, and one end of the outlet pipe 32 extends out of the inner container 2. In this embodiment, the tank 1 may be located in the inner container 2, and accordingly, the serial arrangement of the inlet pipe 31, the tank 1 and the outlet pipe 32 can realize the function of the first pipe 21 in the above embodiment.

In addition to the function of preparing microbubble water, the above embodiment has a compact structure, which can save the space occupied by the tank 1 and further reduce the space occupied by the water heater system.

Each of the above-described embodiments in this specification is described in a progressive manner, and the same and similar parts among the embodiments may be referred to each other, and each of the embodiments is emphasized to be different from the other embodiments.

The above description is only a few embodiments of the present invention, and although the embodiments disclosed in the present invention are as above, the contents are used only for convenience of understanding of the present invention, and are not intended to limit the present invention. Any person skilled in the art to which the present invention pertains may make any modifications and variations in the form and details of the embodiments without departing from the spirit and scope of the invention, but the scope of the patent protection of the present invention shall still be subject to the scope defined in the appended claims.

What is claimed is:

1. A water heater system, comprising:
    a heating unit capable of heating water, the heating unit comprising an inner container capable of containing water, and a heating member for heating the water contained in the inner container;
    a tank capable of communicating with the heating unit, the tank is provided with at least one inlet and outlet, the inlet is capable of supplying at least one of gas and water into the tank; and a pressurizing source capable of pressurizing the tank, the pressurizing source is capable of providing a pressure at which the gas and water in the tank are mixed, wherein the pressurizing source includes a pressurizing device which is a water pump communicating with the inner container and the tank, and a pressure regulating device arranged downstream of the tank, wherein the water pump drives the water to flow into the tank and provides in the tank the pressure required for mixing water and gas;

characterized in that the inner container is provided with an inlet pipe for water inflow and an outlet pipe for water outflow, the inner container capable of storing a predetermined amount of gas, and the inner container and the tank can communicate to form a gas storage mechanism, wherein the pressurizing source is capable of providing a predetermined pressure for compressing the gas in the gas storage mechanism so that the compressed gas is mixed with the water in the gas storage mechanism to form gas-liquid mixture.

2. A water heater system, comprising:

a heating unit capable of heating water;

a tank capable of communicating with the heating unit;

an importing mechanism capable of communicating with the tank, for importing water that flows in the tank into a region of the tank where a gas is stored, and having the imported water and the gas in the tank mixed;

a pressurizing source capable of pressurizing the tank, the pressurizing source is capable of providing a pressure at which the gas and water in the tank are mixed; and a control device, wherein the tank is provided with at least one inlet and outlet, and the at least one inlet is provided with the importing mechanism, and the importing mechanism can supply at least one of the gas and the water into the tank, a water supply pipe and a gas supply pipe are provided upstream of the importing mechanism of the tank, the importing mechanism being capable of communicating with the water supply pipe and the gas supply pipe, wherein the pressurizing source is a pressurizing device which is in communication with the water supply pipe and the gas supply pipe, wherein the water heater system has at least a first operating state enabling the tank to provide microbubble water to a water terminal and a second operating state capable of draining the tank and refilling the tank with gas, wherein in the second operating state, the control device can control the importing mechanism of the tank to communicate with a gas passage, and control the outlet of the tank to communicate with a drain pipe to discharge the water in the tank while filling in gas, wherein in the first operating state, the control device can control the importing mechanism of the tank to communicate with the water supply pipe, control the outlet of the tank to communicate with the water terminal, the gas and water in the tank are gas-liquid mixed under the pressure from the pressurizing source.

3. A method of controlling a water heater system, characterized in that the method comprises:

controlling a gas supply unit to communicate with a tank to input gas from the gas supply unit into the tank, and to simultaneously drain water from the tank; and when the drained water or the supplied gas reaches a predetermined amount, controlling an importing mechanism to communicate with a water supply pipe, and the importing mechanism imports water that flows therein into a region of the tank where the gas is stored so that the water is gas-liquid mixed with the gas in the tank, while the pressurizing source applies a predetermined pressure to the gas and water in the tank for the gas-liquid mixing.

4. The control method according to claim 3, characterized in that the pressurizing source applies a predetermined pressure to the gas-liquid mixing of the gas and water in the tank comprising:

applying a predetermined pressure to gas-liquid mixing of gas and water in the tank utilizing a pressure of pressurized water with a predetermined pressure, or activating a pressurizing device to apply a predetermined pressure to the water entered the tank while applying a predetermined pressure to the gas-liquid mixing of the gas and water in the tank.

* * * * *